(12) United States Patent
Hosaka et al.

(10) Patent No.: US 8,107,755 B2
(45) Date of Patent: Jan. 31, 2012

(54) INFORMATION PROCESSING APPARATUS AND METHOD

(75) Inventors: Kazuhisa Hosaka, Tokyo (JP);
Takahiro Fukuhara, Kanagawa (JP);
Junya Araki, Tokyo (JP)

(73) Assignee: Sony Corporation, Tokyo (JP)

( * ) Notice: Subject to any disclaimer, the term of this patent is extended or adjusted under 35 U.S.C. 154(b) by 1025 days.

(21) Appl. No.: 11/968,469

(22) Filed: Jan. 2, 2008

(65) Prior Publication Data

US 2008/0181522 A1 Jul. 31, 2008

(30) Foreign Application Priority Data

Jan. 31, 2007 (JP) ................................. 2007-020527

(51) Int. Cl.
*G06K 9/36* (2006.01)
*H04N 7/12* (2006.01)
(52) U.S. Cl. ..................... 382/251; 382/232; 348/398.1; 375/240.03; 375/240.19; 375/240.24
(58) Field of Classification Search .................. 382/248, 382/232, 251, 250; 375/240.03, 240.18, 375/240.19, 240.23, 240.24, 240.26, 240.27, 375/240.28, E7.211, E7.255, E7.181, E7.226, 375/240.2, E7.148, E7.004, E7.193, E7.135, 375/E7.176, E7.159, E7.281, E7.224, E7.277, 375/240.02, E7.15, E7.162; 348/395.1, 396.1, 348/397.1, 398.1, 403.1, 408.1; 704/207, 704/E11.006; 357/240.03, 240.19, 240.24
See application file for complete search history.

(56) References Cited

U.S. PATENT DOCUMENTS

| 5,489,943 | A | 2/1996 | Kutner |
| 5,703,646 | A | 12/1997 | Oda |
| 5,870,145 | A | 2/1999 | Yada et al. |
| 5,880,856 | A | 3/1999 | Ferriere |
| 6,198,769 | B1 | 3/2001 | Mihara |
| 6,259,735 | B1 | 7/2001 | Aono et al. |
| 6,393,060 | B1 * | 5/2002 | Jeong ...................... 375/240.19 |

(Continued)

FOREIGN PATENT DOCUMENTS

CN 1784008 A 6/2006

(Continued)

OTHER PUBLICATIONS

Wim Sweldens, "The Lifting Scheme: A Custom-Design Construction of Biorthogonal Wavelets", Applied and Computational Harmonic Analysis, vol. 3, No. 2, Article No. 0015, 1996, pp. 186-200.

(Continued)

*Primary Examiner* — Sheela Chawan
(74) *Attorney, Agent, or Firm* — Oblon, Spivak, McClelland, Maier & Neustadt, L.L.P.

(57) ABSTRACT

An information processing apparatus for encoding image data includes: a rearranging unit for rearranging coefficient data divided for each frequency band in order of executing synthesis processing for synthesizing the coefficient data of multiple sub-bands divided into frequency bands to generate image data for each line block including image data equivalent to the number of lines necessary for generating coefficient data equivalent to one line of the sub-band of the lowest frequency components; a control unit for calculating a new quantization step size at the time of encoding the image data for each coding unit using the ratio between the generated code amount at the time of encoding with a known quantization step size and a target code amount at the time of encoding the image data; and an encoding unit for encoding the coefficient data for each coding unit to generate encoded data using the calculated quantization step size.

28 Claims, 32 Drawing Sheets

U.S. PATENT DOCUMENTS

| | | | |
|---|---|---|---|
| 6,693,963 B1 * | 2/2004 | Taniguchi | 375/240.11 |
| 6,707,948 B1 | 3/2004 | Cosman et al. | |
| 6,813,314 B2 | 11/2004 | Aono et al. | |
| 6,847,468 B2 | 1/2005 | Ferriere | |
| 6,917,384 B1 * | 7/2005 | Fukushima | 348/333.03 |
| 7,277,489 B1 * | 10/2007 | Andrew | 375/240.19 |
| 7,701,365 B2 * | 4/2010 | Fukuhara et al. | 341/50 |
| 2001/0003554 A1 | 6/2001 | Mori et al. | |
| 2004/0141652 A1 | 7/2004 | Fukuhara et al. | |
| 2006/0228034 A1 * | 10/2006 | Mizuno et al. | 382/251 |
| 2009/0274378 A1 * | 11/2009 | Fukuhara et al. | 382/232 |

FOREIGN PATENT DOCUMENTS

| | | |
|---|---|---|
| JP | 10-136354 | 5/1998 |
| JP | 2004-166254 | 6/2004 |

OTHER PUBLICATIONS

Christos Chrysafis, et al., "Line-Based, Reduced Memory, Wavelet Image Compression", IEEE Transactions on Image Processing, vol. 9, No. 3, Mar. 2000, pp. 378-389.

U.S. Appl. No. 11/937,173, filed Nov. 8, 2007, Hosaka, et al.

Extended European Search Report issued Oct. 14, 2010, in Application No. 08250272.5-1522 / 1954058.

Pamela Cosman, et al., "Memory Constrained Wavelet Based Image Coding", IEEE Signal Processing Letters, vol. 5, No. 9, XP011060058A, Sep. 1, 1998, 3 pages.

Kai Hwang, et al., "Pipelining : An Overlapped Parallelism", Computer Architecture and Parallel Processing, (McGraw-Hill Book Company), XP002601121, Jan. 1, 1984, pp. 145-146.

U.S. Appl. No. 12/293,551, filed Sep. 19, 2008, Fukuhara, et al.

* cited by examiner

DIVISION LEVEL = 3
(H: HIGH FREQUENCY, L: LOW FREQUENCY)

DIVISION LEVEL = 3

DIVISION LEVEL = 1

IMAGE INPUT

WAVELET TRANSFORM RESULT (ANALYSIS)

IMAGE OUTPUT

FIG. 14

| | CALCULATION METHOD 1 | CALCULATION METHOD 2 | CALCULATION METHOD 3 |
|---|---|---|---|
| STEP IN FIG. 11 | STEP S57 AND STEP S58 | STEP S59 THROUGH STEP S61 | STEP S62 AND STEP S63 |
| Status | STEADY STATE (HAVING CORRELATION WITH PREVIOUS PICTURE) | STEADY STATE (HAVING CORRELATION WITH PREVIOUS PICTURE) | UNSTEADY STATE (HAVING NO CORRELATION WITH PREVIOUS PICTURE) |
| CODE AMOUNT STORED IN BUFFER OF SMOOTHING UNIT 17 | SMALL | MIDDLE TO LARGE | SMALL TO LARGE |
| QUANTIZATION STEP SIZE | SAME IN ALL CODING UNITS | DIFFERENT FOR EACH CODING UNIT | DIFFERENT FOR EACH CODING UNIT |
| GENERATED CODE AMOUNT | DIFFERENT FOR EACH CODING UNIT | EQUIVALENT IN ALL CODING UNITS (*) | EQUIVALENT IN ALL CODING UNITS (*) |
| IMAGE QUALITY | DETERIORATION IS NOT PERCEIVED EASILY | DETERIORATION IS NOT PERCEIVED EASILY AT A PORTION WHERE ENCODING IS DIFFICULT | DETERIORATION IS NOT PERCEIVED EASILY AT A PORTION WHERE ENCODING IS DIFFICULT |

(*) IN THE CASE IN WHICH THE CODE AMOUNT STORED IN THE BUFFER OF THE SMOOTHING UNIT 17 IS LARGE, DIFFERENCE DUE TO A CODING UNIT OCCURS.

▨ CODING UNIT 1
▥ CODING UNIT 2
▭ CODING UNIT 3
⋯ CODING UNIT 4

NUM: NUMBER OF LINE BLOCK
LEN: COMPRESSED DATA LENGTH OF LINE BLOCK

FIG. 31
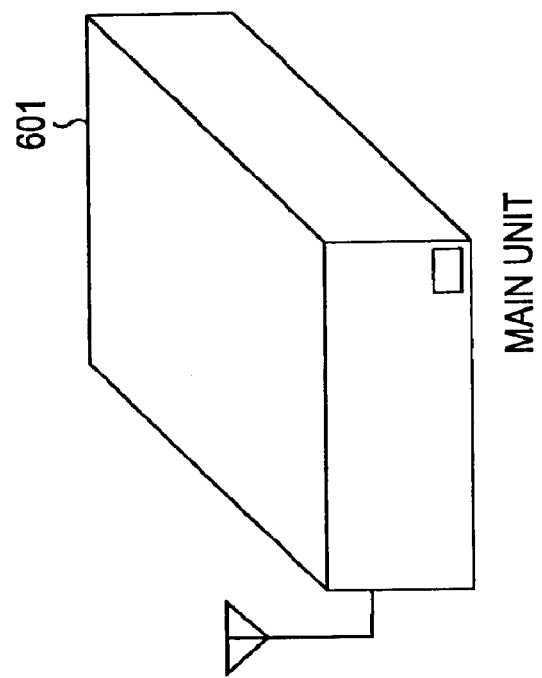
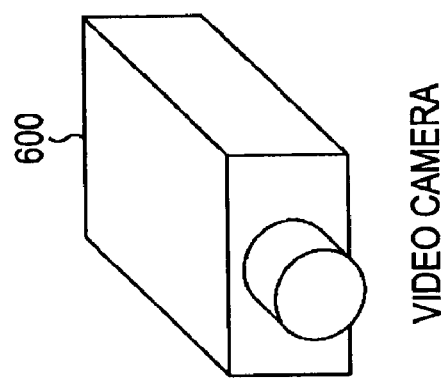

INFORMATION PROCESSING APPARATUS AND METHOD

CROSS REFERENCES TO RELATED APPLICATIONS

The present invention contains subject matter related to Japanese Patent Application JP 2007-020527 filed in the Japanese Patent Office on Jan. 31, 2007, the entire contents of which are incorporated herein by reference.

BACKGROUND OF THE INVENTION

1. Field of the Invention

The present invention relates to an information processing apparatus and method, and particularly relates to an information processing apparatus and method, whereby the control of a generated code amount at encoding processing can be performed readily and suitably.

2. Description of the Related Art

Heretofore, with encoding of moving image data, there has been a method for appropriately controlling the assignment of a generated code amount according to the moving image data thereof.

In order to appropriately encode moving image data so as to reduce the deterioration of image quality of the image thereof (such that a decoded image has high image quality), there has been a method for taking the statistics of the entire moving image, and determining whether to assign how much generated code amount to which portion of which picture (e.g., see Japanese Patent No. 3268306 and Japanese Patent No. 3358620).

Incidentally, in order to encode a moving image with little delay, there has been a method for encoding a part of an image each time it is input, and in this case, there has been a method for determining the assignment of a generated code amount based on the partial statistics of a moving image (e.g., see Japanese Unexamined Patent Application Publication No. 10-136354, Japanese Unexamined Patent Application Publication No. 9-261633, and International Publication WO 96/28937).

For example, with code amount control proposed as a test model in MPEG2 (Moving Picture Experts Group 2), feedback control is performed based on the remaining available amount of virtual buffer, and the relation between the quantization index at the time of previous encoding and a generated code amount.

With regard to such a technique for determining the assignment of a generated code amount based on the partial statistics of a moving image, there have been conceived various types of techniques. For example, there has been a method for assigning a generated code amount of a current picture based on the generated code amount of the past picture, employing the fact that normally, with moving images, the degree of correlation of contents if images is high between temporally adjacent pictures.

SUMMARY OF THE INVENTION

However, in the case of changing the quantization step size using the code amount remaining in the buffer, or the like, as with known arrangements, the quantization step size may be changed many times within a single picture, which could appear as conspicuous image deterioration where the maximum quantization step size has been applied. On the other hand, portions where the quantization step size is small might show image deterioration less than other portions, resulting in the image deterioration of other portions actually being brought to attention.

There has been recognized a need for facilitating the control of generated code amount at the encoding processing suitably.

According to an embodiment of the present invention, an information processing apparatus configured to encode image data includes: a rearranging unit configured to rearrange coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components; a control unit configured to calculate a new quantization step size at the time of encoding the image data for each coding unit which is the processing increment of the encoding using the ratio between the generated code amount at the time of encoding with a known quantization step size and a target code amount at the time of encoding the image data; and an encoding unit configured to encode the coefficient data rearranged by the rearranging unit for each coding unit to generate encoded data using the quantization step size calculated by the control unit.

The control unit may further include: a calculating unit configured to multiply the known quantization step size by the ratio between the generated code amount and the target code amount; and a setting unit configured to set the multiplication result calculated by the calculating unit as the new quantization step size.

The known quantization step size may be a quantization step size which has been employed for encoding of the picture which is one picture ahead of the image data; with the generated code amount being a code amount generated at the encoding of the picture.

The calculating unit may calculate the multiplication result in increments of pictures.

The setting unit may set the multiplication result as the new quantization step size, in the event that the correlation between the pictures of the image data is higher than a predetermined reference, and also the data occupied ratio of a buffer for storing the encoded data is lower than a predetermined reference.

The coding unit may be the line block.

The rearranging unit may rearrange the coefficient data in order from low frequency components to high frequency components for each line block.

The control unit may perform control so as to operate each of the rearranging unit and the encoding unit in parallel for each line block.

The rearranging unit and the encoding unit may perform each processing in parallel.

According to an embodiment of the present invention, an information processing method for encoding image data includes the steps of: rearranging coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components; calculating a new quantization step size at the time of encoding the image data for each coding unit which is the processing increment of the encoding using the ratio between the generated code amount at the time of encoding with a known quantization step size and a target code amount at the time of encoding the image data; and encoding the coefficient data rearranged in the rearranging step for each coding unit to generate encoded data using the quantization step size calculated in the calculating step.

According to an embodiment of the present invention, an information processing apparatus configured to encode image data includes: a rearranging unit configured to rearrange coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components; a control unit configured to calculate a quantization step size at the time of encoding the image data for each coding unit which is the processing increment of encoding using the correlation within the current picture, in the event that the image correlation between the current picture and the picture which is one picture ahead of the image data is low; and a encoding unit configured to encode the coefficient data rearranged by the rearranging unit for each coding unit to generate encoded data using the quantization step size calculated by the control unit.

The information processing apparatus may further include: a determining unit configured to determine the height of the correlation between the pictures of the image data; with the control unit calculating the quantization step size using the correlation within the current picture, in the event of the determining unit determining that the correlation is low.

The determining unit may determine that the correlation is low, in the event that the normalization code amount obtained by normalizing the code amount generated at the current coding unit is greater than the normalization code amount of the coding unit at the same position as the picture which is one picture ahead, and also the difference thereof is greater than the value obtained by multiplying a target code amount per coding unit by a half of the quantization step size which is currently set.

The calculating unit may calculate a new quantization step size by dividing the normalization code amount of the past coding unit within the current picture by a target code amount per coding unit, in the event that the determining unit have determined that the correlation is low.

The calculating unit may calculate the quantization step size using the correlation between the current picture and the picture which is one picture ahead, in the event that the determining unit have determined that the correlation is high.

The coding unit may be the line block.

The rearranging unit may rearrange the coefficient data in order from low frequency components to high frequency components for each line block.

The control unit may perform control so as to operate each of the rearranging unit and the encoding unit in parallel for each line block.

The rearranging unit and the encoding unit may perform each processing in parallel.

According to an embodiment of the present invention, an information processing method for encoding image data includes the steps of: rearranging coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components; calculating a quantization step size at the time of encoding the image data for each coding unit which is the processing increment of encoding using the correlation within the current picture, in the event that the image correlation between the current picture and the picture which is one picture ahead of the image data is low; and encoding the coefficient data rearranged in the rearranging step for each coding unit to generate encoded data using the quantization step size calculated in the control step.

According to an embodiment of the present invention, an information processing apparatus configured to encode image data to generate encoded data, includes: a rearranging unit configured to rearrange coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components; a determining unit configured to determine the data occupied amount of a buffer for storing the encoded data based on the value obtained by dividing the code amount of the encoded data stored in the buffer by a target code amount per coding unit which is the processing increment of encoding; a control unit configured to calculate a quantization step size at the time of encoding the image data by dividing the code amount generated at the coding unit of the same position as the picture which is one picture ahead by the target code amount per coding unit, in the event that the determining unit have determined that the code amount of the encoded data stored in the buffer is great; and an encoding unit configured to encode the coefficient data rearranged by the rearranging unit for each coding unit to generate encoded data using the quantization step size calculated by the control unit.

The control unit may calculate the quantization step size by dividing the normalization code amount obtained by normalizing the code amount generated at the coding unit of the same position as the picture which is one picture ahead by the target code amount per coding unit.

The information processing apparatus may further include a correcting unit configured to perform correction to further increase the value of the quantization step size calculated by the calculating unit so as to reduce the code amount generated at the encoding as much as the code amount of the encoded data stored in the buffer is.

The correcting unit may perform correction by dividing the value of the quantization step size calculated at the calculating unit by any smaller value of the value obtained by subtracting the value obtained by dividing a half of the code amount of the encoded data stored in the buffer by the target code amount per coding unit from a value "4", and a value "1".

According to an embodiment of the present invention, an information processing method for encoding image data to generate encoded data includes the steps of: rearranging coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components; determining the data occupied amount of a buffer for storing the encoded data based on the value obtained by dividing the code amount of the encoded data stored in the buffer by a target code amount per coding unit which is the processing increment of encoding; calculating a quantization step size at the time of encoding the image data by dividing the code amount generated at the coding unit of the same position as the picture which is one picture ahead by the target code amount per coding unit, in the event that determination is made in the determining step that the code amount of the encoded data stored in the buffer is great; and encoding the coefficient data rearranged in the rearranging step for each coding unit to generate encoded data using the quantization step size calculated in the calculating step.

According to embodiments of the present invention, the control of a generated code amount at the encoding processing can be performed. Particularly, control of generated code amount at the encoding processing can be performed readily and suitably.

BRIEF DESCRIPTION OF THE DRAWINGS

FIG. 14 is a table summarizing the features for each calculation method of a quantization step size;

FIG. 31 is a diagram illustrating a configuration example of a home gaming console to which an embodiment of the present invention is applied.

DESCRIPTION OF THE PREFERRED EMBODIMENTS

Description will be made below regarding embodiments of the present invention.

Figure 1:
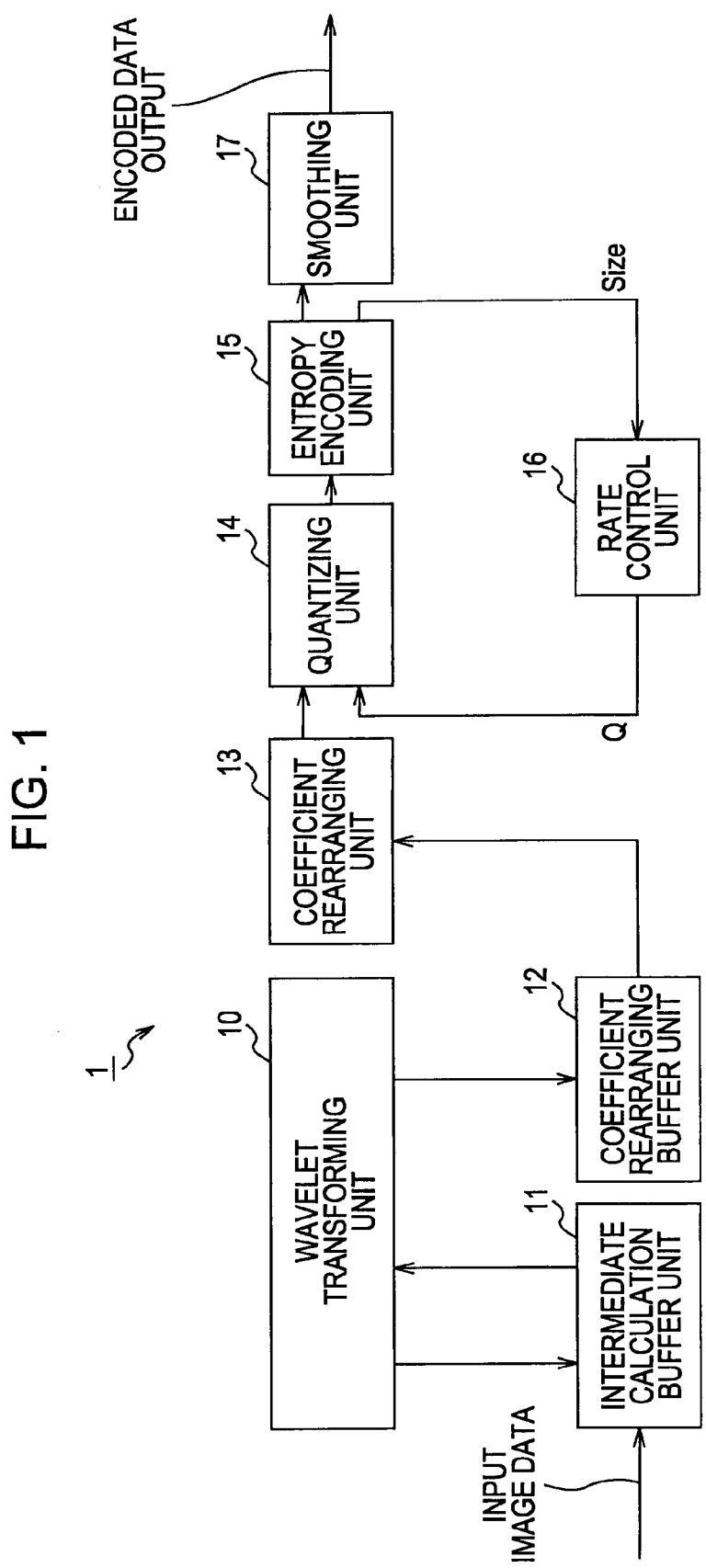
FIG. 1 is a block diagram illustrating a configuration example of an encoding apparatus to which an embodiment of the present invention is applied.

FIG. 1 is a block diagram illustrating a configuration example of an encoding apparatus to which an embodiment of the present invention is applied.

In FIG. 1, an encoding apparatus 1 is an apparatus for encoding image data at an arbitrary bit rate, and includes a wavelet transforming unit 10, an intermediate calculation buffer unit 11, a coefficient rearranging buffer unit 12, a coefficient rearranging unit 13, a quantizing unit 14, an entropy encoding unit 15, a rate control unit 16, and a smoothing unit 17.

Image data input to the encoding apparatus 1 is temporarily pooled in the intermediate calculation buffer unit 11. The wavelet transforming unit 10 subjects the image data pooled in the intermediate calculation buffer unit 11 to wavelet transformation. That is to say, the wavelet transforming unit 10 reads out the image data from the intermediate calculation buffer unit 11, subjects the image data to filtering processing using analysis filters to generate coefficient data of a low frequency component and high frequency component, and stores the generated coefficient data in the intermediate calculation buffer unit 11. The wavelet transforming unit 10 includes a horizontal analysis filter and a vertical analysis filter, and subjects an image data group to analysis filter processing in both of the screen horizontal direction and the screen vertical direction. The wavelet transforming unit 10 reads out the coefficient data of a low frequency component stored in the intermediate calculation buffer unit 11 again, subjects the readout coefficient data to filter processing using analysis filters to further generate the coefficient data of a high frequency component and low frequency component. The generated coefficient data is stored in the intermediate calculation buffer unit 11.

Upon repeating the above-mentioned processing, and the division level reaching a predetermined level, the wavelet transforming unit 10 reads out the coefficient data from the intermediate calculation buffer unit 11, and writes the readout coefficient data in the coefficient rearranging buffer unit 12.

The coefficient rearranging unit 13 reads out the coefficient data written in the coefficient rearranging buffer unit 12 in a predetermined order, and supplies this to the quantizing unit 14. The quantizing unit 14 subjects the coefficient data supplied from the coefficient rearranging unit 13 to quantization. As for this quantizing method, what kind of method may be employed, for example, a common technique, i.e., such as shown in the following Expression (1), a technique for dividing coefficient data W by a quantization step size Q may be employed.

$$\text{Quantization Coefficient}=W/Q \tag{1}$$

Note that this quantization step size Q is supplied from the rate control unit 16. The quantizing unit 14 supplies the quantized coefficient data to the entropy encoding unit 15. The entropy encoding unit 15 encodes the supplied coefficient data in a predetermined increment using a predetermined entropy encoding method, for example, such as Huffman encoding or arithmetic encoding. Note that hereafter, the increment of encoding of coefficient data will be referred to as a coding unit. How to section coefficient data, which makes up a coding unit, may be determined beforehand, or may be variable. Also, this section method is arbitrary, but in a common case, the coding unit is set to an increment smaller than a picture increment to reduce delay time due to the encoding processing. That is to say, in this case, the coding unit is set so as to divide one picture into multiple pieces using a predetermined method. In other words, multiple coding units are formed within one picture such that the entropy encoding unit 15 encodes the coefficient data of one picture divided into multiple times.

The entropy encoding unit 15 supplies the encoded data obtained by the encoding to the smoothing unit 17. Also, the entropy encoding unit 15 supplies the code amount (the data amount of encoded data) Size generated at the encoding to the rate control unit 16 to the rate control unit 16 for each coding unit.

The smoothing unit 17 embeds a buffer therein, and reads out the encoded data stored in the buffer to output this to the outside of the encoding apparatus 1 so as to temporarily pool the encoded data supplied from the entropy encoding unit 15 and output this at a constant transmission rate (encoded data output). In the case of a system wherein a transmission rate may be changed vertically as long as an average code amount through one picture is identical to a target code amount, the smoothing unit 17 can be omitted.

Next, description will be made in more detail regarding processing performed at the wavelet transforming unit 10. First, description will be made schematically regarding wavelet transformation. With wavelet transformation as to image data, as shown schematically in FIG. 2, processing for dividing image data into a band where spatial frequency is high and a band where spatial frequency is low is repeated recursively as to the data of the band where spatial frequency is low obtained as a result of division. Thus, the data of the band where spatial frequency is low is driven into a smaller region, thereby enabling effective compression encoding.

Figure 2:
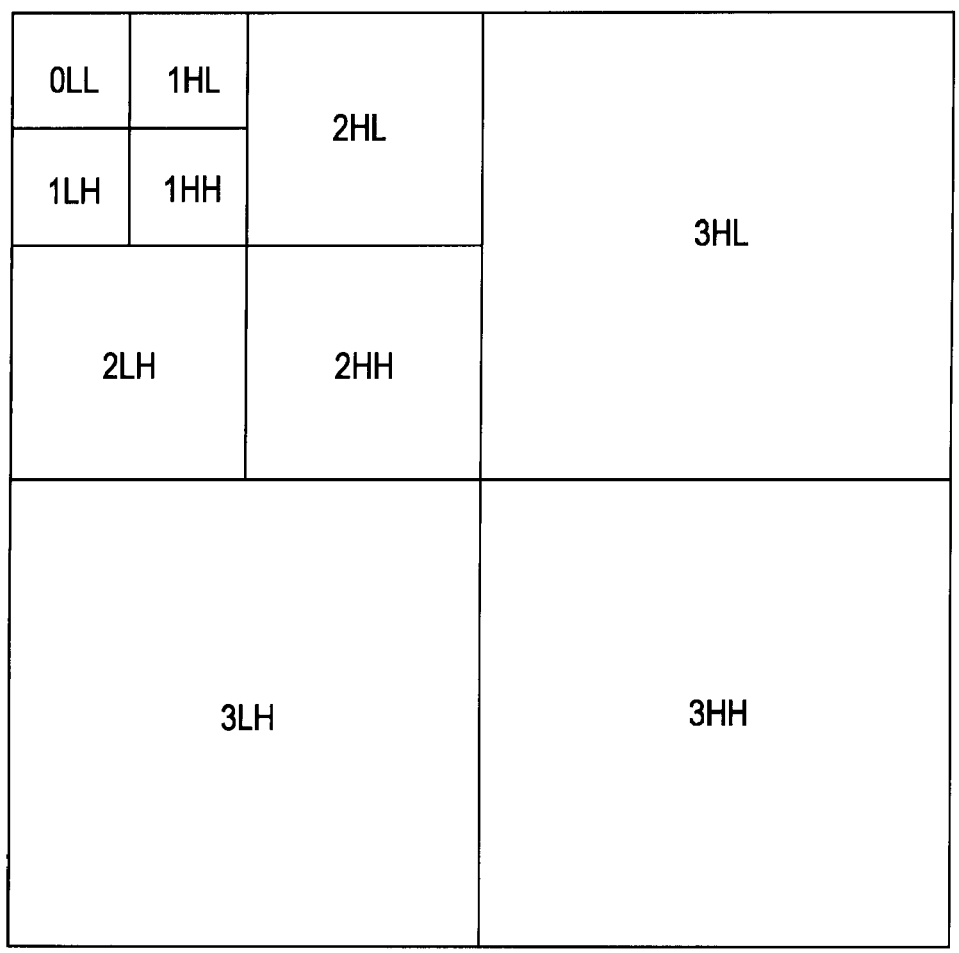
FIG. 2 is a schematic diagram for schematically describing wavelet transformation.

Note that FIG. 2 is an example in a case in which dividing processing for dividing the lowest frequency component region of image data into a low-frequency component region L and a high-frequency component region H is repeated three times to realize division level 3. In FIG. 2, "L" and "H" represent a low-frequency component and high-frequency component respectively. With the order of "L" and "H", the front side indicates the band as a result of being divided in the horizontal direction, and the rear side indicates the band as a result of being divided in the vertical direction. Also, a number before "L" and "H" indicates the division level of that region.

Also, as can be understood from the example in FIG. 2, processing is performed in a stepwise manner from the lower right region to the upper left region of the screen, whereby low-frequency components are driven into a smaller region. That is to say, in the example in FIG. 2, the lower right region of the screen is set to a region 3HH including the least low-frequency components (including the most high-frequency components), the upper left region where the screen was divided into four is further divided into four, and of the region divided into four, the upper left region is further divided into four. The region at the most upper left corner is set to a region 0LL including the most low-frequency components.

Figure 3B:
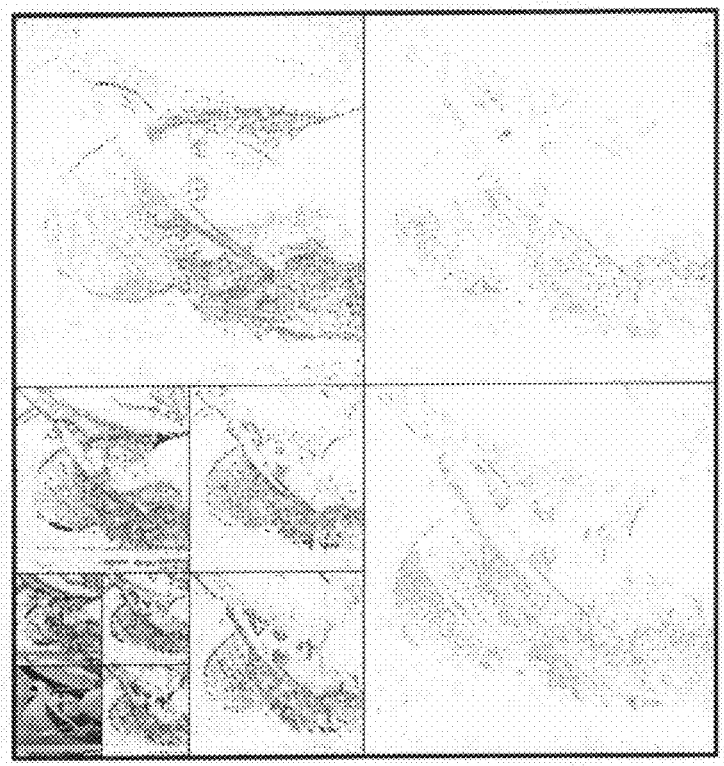
FIGS. 3A and 3B are schematic diagrams for schematically describing wavelet transformation.
Figure 3A:
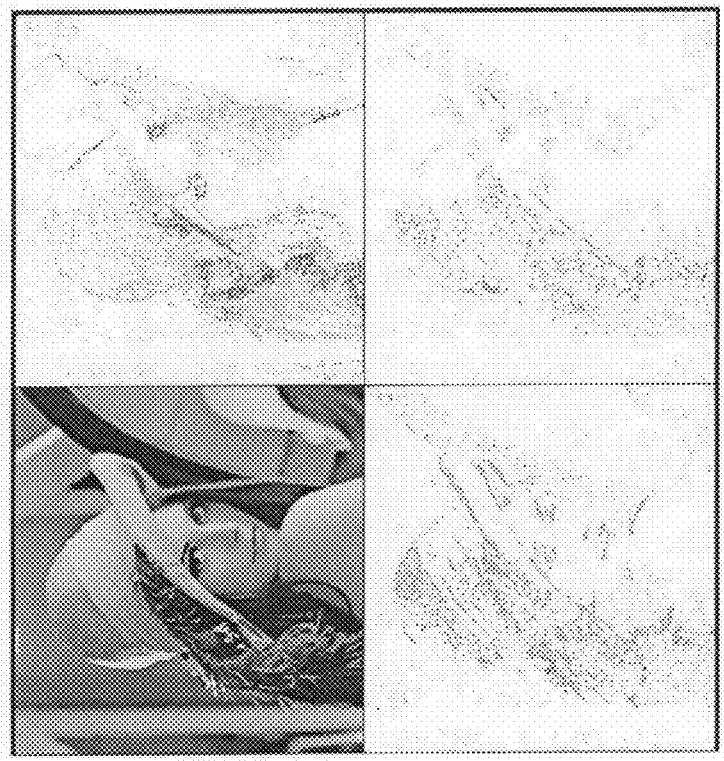

The reason why low-frequency components are subjected to transformation and division repeatedly is because the energy of an image concentrates on low-frequency components. This can be understood from a situation in which as a division level is advanced from a state of division level 1 of which an example is shown in FIG. 3A to a state of division level 3 of which an example is shown in FIG. 3B, sub bands are formed as shown in FIG. 3B. For example, the division level of the wavelet transformation in FIG. 2 is 3, and as a result thereof 10 sub bands are formed.

The wavelet transforming unit 10 usually performs processing such as described above using a filter bank made up of a low-pass filter and a high-pass filter. Note that a digital filter usually has the impulse response of multiple tap lengths, i.e., a filter coefficient, so it is necessary to perform buffering of input image data or coefficient data beforehand. Similarly, even in the case of performing wavelet transformation in multiple stages, it is necessary to perform buffering of the wavelet transformation coefficients generated at the previous stages as many as the number which can be subjected to filter processing.

Description will be made regarding a method employing 5×3 filters as a specific example of this wavelet transformation. This method employing 5×3 filters is employed for the JPEG (Joint Photographic Experts Group) 2000 standard already described in the related art, and is an excellent method in that wavelet transformation can be performed with the small number of filter taps.

The impulse response (Z transform expression) of 5×3 filters is, as shown in the following Expression (2) and Expression (3), made up of a low-pass filter $H_0(z)$, and a high-pass filter $H_1(z)$. It can be found from Expression (2) and Expression (3) that the low-pass filter $H_0(z)$ is five taps, and the high-pass filter $H_1(z)$ is three taps.

$$H_0(z)=(-1+2z^{-1}+6z^{-2}+2z^{-3}-z^{-4})/8 \tag{2}$$

$$H_1(z)=(-1+2z^{-1}-z^{-2})/2 \tag{3}$$

According to these Expressions (2) and (3), the coefficients of low-frequency components and high-frequency components can be directly calculated. Now, employing a lifting technique enables calculation of filter processing to be reduced.

Figure 4:
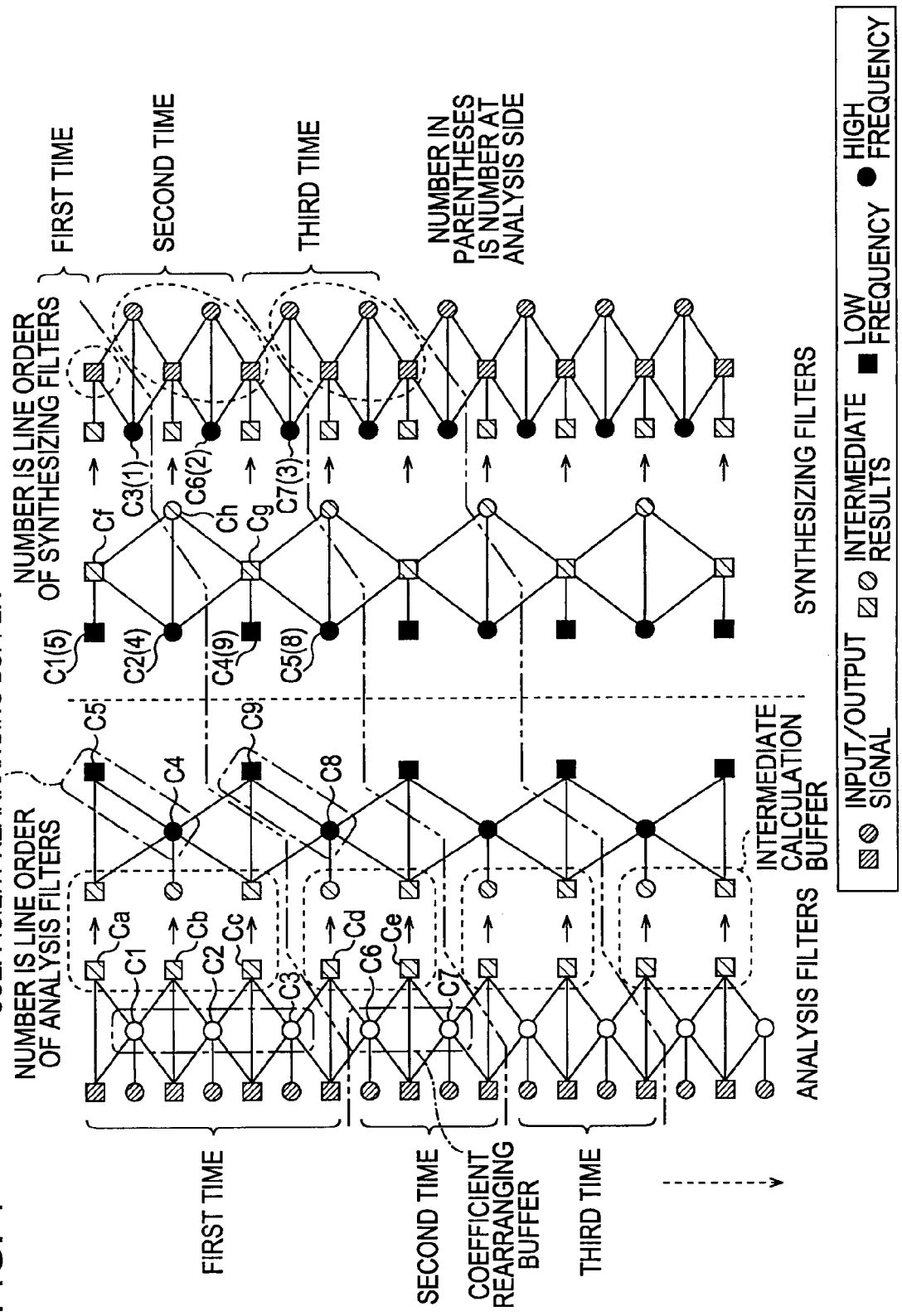
FIG. 4 is a schematic diagram illustrating an example wherein filtering by lifting of 5×3 filters has been performed until division level 2.

Next, description will be made further specifically regarding this wavelet transforming method. FIG. 4 illustrates an example in which filter processing employing lifting of 5×3 filters is performed until division level 2. Note that in FIG. 4, the portion indicated as analysis filters at the left side of the drawing is the filters of the wavelet transforming unit 10. Also, the portion indicated as synthesis filters at the right side of the drawing are the filters of a wavelet inverse transforming unit in a later-described decoding apparatus.

Note that in the following description, for example, let us say that with a display device or the like, one line is configured by pixels being scanned from the left edge to the right edge of the screen with the pixel at the upper left corner of the screen as the headmost, and one screen is configured by scanning for each line being performed from the upper end to the lower end of the screen.

In FIG. 4, the leftmost column illustrates pixel data disposed in corresponding positions on a line of original image data being arrayed in the vertical direction. That is to say, the filter processing at the wavelet transforming unit 10 is performed by pixels on the screen being scanned vertically using a vertical filter. The first through third columns from the left edge illustrate filter processing of division level 1, and the fourth through sixth columns illustrate filter processing of division level 2. The second column from the left edge illustrates high-frequency component output based on the pixel of the original image data at the left edge, and the third column from the left edge illustrates low-frequency component output based on the original image data and high-frequency component output. The filter processing of division level 2 is, as shown in the fourth through sixth from the left edge, performed on the output of the filter processing of division level 1.

With the filter processing of division level 1, the coefficient data of high-frequency components is calculated based on the pixels of the original image data as filter processing of a first state, and the coefficient data of low-frequency components is calculated based on the coefficient data of high-frequency components calculated at the filter processing of the first stage, and the pixels of the original image data. The filter processing of an example of division level 1 is shown in the first through third columns at the left side (analysis filter side) in FIG. 4. The calculated coefficient data of high-frequency components is stored in the coefficient rearranging buffer unit 12 in FIG. 1. Also, the calculated coefficient data of low-frequency components is stored in the intermediate calculation buffer unit 11 in FIG. 1.

In FIG. 4, the data surrounded with a dashed dotted line is temporarily stored in the coefficient rearranging buffer unit 12, and the data surrounded with a dotted line is temporarily stored in the intermediate calculation buffer unit 11.

The filter processing of division level 2 is performed based on the result of the filter processing of division level 1 held in the intermediate calculation buffer unit 11. With the filter processing of division level 2, the same filter processing as that of division level 1 is performed by regarding the coefficient data calculated as the coefficients of the low-frequency components at the filter processing of division level 1 as coefficient data including low-frequency components and high-frequency components. The coefficient data of high-frequency components and the coefficient data of low-frequency components calculated at the filter processing of division level 2 is stored in the coefficient rearranging buffer unit 12.

The wavelet transforming unit 10 performs the filter processing such as described above both in the horizontal direction and in the vertical direction of the screen. For example, first, the wavelet transforming unit 10 performs the filtering processing of division level 1 in the horizontal direction, and stores the generated coefficient data of high-frequency components and low-frequency components in the intermediate calculation buffer unit 11. Next, the wavelet transforming unit 10 subjects the coefficient data stored in the intermediate calculation buffer unit 11 to the filter processing of division level 1 in the vertical direction. According to the processing in the horizontal and vertical directions of division level 1, a region HH and a region HL due to each of the coefficient data high-frequency components and low-frequency components into which the high-frequency components are further divided, and a region LH and a region LL due to each of the coefficient data high-frequency components and low-frequency components into which the low-frequency components are further divided, are formed.

Subsequently, with division level 2, the coefficient data of low-frequency components generated at division level 1 is subjected to filter processing both in the horizontal and vertical directions. That is to say, with division level 2, the region LL divided and formed at division level 1 is further divided into four, and consequently, regions HH, HL, LH, and LL are further formed within the region LL.

The wavelet transforming unit 10 is configured so as to perform the filter processing using wavelet transformation in a stepwise manner by dividing the filter processing into processing for each several lines in the vertical direction of the screen, i.e., dividing into multiple times. In the example in FIG. 4, with first processing which is processing from the first line on the screen, seven lines are subjected to filter processing, and with second processing and thereafter which is processing from the eighth line, filter processing is performed every four lines. This number of lines based on the number of lines necessary for generating the lowest frequency components equivalent to one line after dividing into high-frequency components and low-frequency components.

Note that hereafter, a group of lines, which includes other sub bands, necessary for generating the lowest frequency components equivalent to one line (coefficient data equivalent to one line of sub bands of the lowest frequency components) will be referred to as a line block (or precinct). The "line" as stated here means pixel data or coefficient data equivalent to one line formed within a picture or field corresponding to image data before wavelet transformation, or within each sub band. That is to say, the "line block (precinct)" as stated here means a pixel data group equivalent to the number of lines necessary for generating coefficient data equivalent to one line of the sub band of the lowest frequency components after wavelet transformation with the original image data before wavelet transformation, or the coefficient data group of each sub band obtained by subjecting the pixel data group thereof to wavelet transformation.

According to FIG. 4, a coefficient C5 obtained as a result of the filter processing of division level 2 is calculated based on a coefficient C4, and a coefficient Ca stored in the intermediate calculation buffer unit 11, and the coefficient C4 is calculated based on the coefficients Ca, Cb, and Cc stored in the intermediate calculation buffer unit 11. Further, the coefficient Cc is calculated based on coefficients C2 and C3 stored in the coefficient rearranging buffer unit 12, and the pixel data of the fifth line. Also, the coefficient C3 is calculated based on the pixel data of the fifth through seventh lines. Thus, in order to obtain the coefficient C5 of the low-frequency components at division level 2, there is a need to obtain the pixel data of the first line through the seventh line.

On the other hand, with the second processing and thereafter, the coefficient data already calculated at the filter processing up to last time and stored in the coefficient rearranging buffer unit 12 can be employed, and accordingly the number of lines necessary for the filter processing can be kept small.

That is to say, according to FIG. 4, of the coefficients of low-frequency components obtained as a result of the filter processing at division level 2, a coefficient C9 which is the next coefficient of the coefficient C5 is calculated based on the coefficients C4 and C8, and the coefficient Cc stored in the intermediate calculation buffer unit 11. The coefficient C4 has been already calculated by the above-mentioned first filter processing, and stored in the coefficient rearranging buffer unit 12. Similarly, the coefficient Cc has been already calculated by the above-mentioned first filter processing, and stored in the intermediate calculation buffer unit 11. Accordingly, with this second filter processing, only the filter processing for calculating the coefficient C8 is newly performed. This new filter processing is performed by further employing the eighth through eleventh lines.

Thus, with each of the second processing and thereafter, the data calculated by the filter processing up to last time and stored in the intermediate calculation buffer unit 11 and the coefficient rearranging buffer unit 12 can be employed, and accordingly, all that is necessary is to perform processing every four lines.

Note that in the event that the number of lines on the screen is not identical to the number of lines for encoding, the lines of the original image data are copied with a predetermined method such that the number of lines on the screen is identical to the number of lines for encoding, and then the filter processing is performed.

Thus, the filter processing is performed in a stepwise manner by dividing the lines of the whole screen into multiple times (in increments of line block) as many as the coefficient data equivalent to one line of the lowest frequency components can be obtained, thereby enabling a decoded image to be obtained with little delay at the time of transmitting encoded data.

In order to perform wavelet transformation, there is a need to provide a first buffer employed for executing wavelet transformation itself, and a second buffer for storing a coefficient generated while executing the processing up to a predetermined division level. The first buffer corresponds to the intermediate calculation buffer unit 11, and in FIG. 4, the data surrounded with a dotted line is temporarily saved. Also, the second buffer corresponds to the coefficient rearranging buffer unit 12, and in FIG. 4, the data surrounded with a dashed dotted line is temporarily saved. The coefficient stored in the second buffer is employed at the time of decoding, and accordingly becomes an object of the entropy encoding processing of the subsequent stage.

Next, description will be made regarding the processing of the coefficient rearranging unit 13 in FIG. 1. As described above, the coefficient data calculated at the wavelet transforming unit 10 is stored in the coefficient rearranging buffer unit 12, of which the order is rearranged and read by the coefficient rearranging unit 13, and transmitted to the quantizing unit 14 in increments of coding units.

As already described above, with wavelet transformation, a coefficient is generated from high-frequency component side to low-frequency component side. With the example in FIG. 4, at the first time, the coefficients C1, C2, and C3 of high-frequency components are sequentially generated at the filter processing of division level 1 from the pixel data of an original image. Subsequently, the coefficient data of low-frequency components obtained at the filter processing of division level 1 is subjected to the filter processing of division level 2, and the coefficients C4 and C5 of low-frequency components are sequentially generated. That is to say, at the first time, the coefficient data is generated in order of the coefficients C1, C2, C3, C4, and C5. The generating order of coefficient data always becomes this order (order from high frequency to low frequency) on the principle of wavelet transformation.

On the other hand, at the decoding side, in order to immediately perform decoding with little delay, there is a need to perform generation and output of an image from low-frequency components. Therefore, it is desirable to rearrange the coefficient data generated at the encoding side from the lowest frequency component side toward the high-frequency component side and supply to the decoding side.

Description will be made more specifically with reference to the example in FIG. 4. The right side in FIG. 4 illustrates the synthesis filter side for performing wavelet inverse transformation. The 1st synthesizing processing including the first line of output image data (wavelet inverse transforming processing) at the decoding side is performed by employing the coefficients C4 and C5 of the lowest frequency components generated at the 1st filter processing at the encoding side, and the coefficient C1.

That is to say, with the 1st synthesizing processing, the coefficient data is supplied in order of the coefficients C5, C4, and C1 from the encoding side to the decoding side, and at the decoding side, with the processing of synthesizing level 2 which is synthesizing processing corresponding to division level 2, the coefficients C5 and C4 are subjected to synthesizing processing to generate a coefficient Cf, and this is stored in the buffer. Subsequently, with the processing of synthesizing level 1 which is synthesizing processing corresponding to division level 1, the coefficients Cf and C1 are subjected to synthesizing processing to output the result to the first line.

Thus, with the 1st synthesizing processing, the coefficient data generated in order of the coefficients C1, C2, C3, C4, and C5 at the encoding side and stored in the coefficient rearranging buffer unit 12 is rearranged in order of the coefficients C5, C4, C1, and so on and supplied to the decoding side.

Note that with the synthesis filter side illustrated at the right side in FIG. 4, a coefficient number at the encoding side is described in parentheses as to the coefficient supplied from the encoding side, and the line order of a synthesis filter is described outside the parentheses. For example, a coefficient C1 (5) indicates that the analysis filter side at the left side of FIG. 4 is a coefficient C5, which is the first line at the synthesis filter side.

The synthesizing processing at the decoding side of the coefficient data generated at the second filter processing and thereafter at the encoding side can be performed by employing the coefficient data supplied from the synthesis or encoding side at the time of the previous synthesizing processing. In the example in FIG. 4, with the 2nd synthesizing processing at the decoding side which is performed by employing the coefficients C8 and C9 of low-frequency components generated at the 2nd filter processing at the encoding side, there is a need to further employ the coefficients C2 and C3 generated at the 1st filter processing at the encoding side, and the second through fifth lines are decoded.

That is to say, with the 2nd synthesizing processing, the coefficient data is supplied in order of the coefficients C9, C8, C2, and C3 from the encoding side to the decoding side. At the decoding side, with the processing of synthesizing level 2, a coefficient Cg is generated by employing the coefficients C8 and C9, and the coefficient C4 supplied form the encoding side at the time of the 1st synthesizing processing, and stored in the buffer. A coefficient Ch is generated by employing the above-mentioned coefficient C4, and the coefficient Cf generated at the 1st synthesizing processing and stored in the buffer, and stored in the buffer.

Subsequently, with the processing of synthesizing level 1, synthesizing processing is performed by employing the coefficients Cg and Ch generated at the processing of synthesizing level 2 and stored in the buffer, and the coefficients C2 (shown as coefficient C6 (2) at synthesis filters) and C3 (shown as coefficient C7 (3) at synthesis filters) supplied from the encoding side, and the second through fifth lines are decoded.

Thus, with the 2nd synthesizing processing, the coefficient data generated in order of the coefficients C2, C3, (C4, C5), C6, C7, C8, and C9 at the encoding side is rearranged in order of the coefficients C9, C8, C2, C3, and so on, and supplied to the decoding side.

With the 3rd synthesizing processing and thereafter as well, the coefficient data stored in the coefficient rearranging buffer unit 12 is rearranged in a predetermined order and supplied to the decoding side, and decoded ever four lines, in the same way.

Note that with the synthesizing processing at the decoding side corresponding to the filter processing including the lower edge line of the screen at the encoding side (hereafter, referred to as last time), all of the coefficient data generated at the processing so far and stored in the buffer is output, so the number of output lines increases. With the example in FIG. 4, eight lines are output at the last time.

Note that the rearranging processing of coefficient data by the coefficient rearranging unit 13 is performed, for example, by setting a read address at the time of reading out the coefficient data stored in the coefficient rearranging buffer unit 12 in a predetermined order.

Figure 5A:
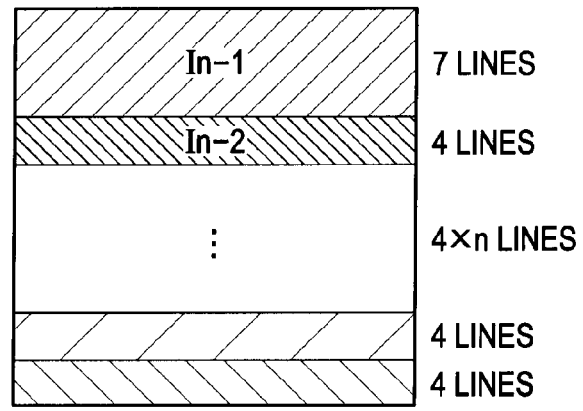
FIGS. 5A through 5C are schematic diagrams illustrating the flows of wavelet transformation and wavelet inverse transformation according to an embodiment of the present invention.

The above-mentioned processing will be described more specifically with reference to FIG. 5. FIG. 5 is an example of subjecting filter processing by wavelet transformation until division level 2 using the 5×3 filters. With the wavelet transforming unit 10, as shown in an example in FIG. 5A, the first through seventh lines of input image data are subjected to the 1st filter processing both in the horizontal and vertical directions (In-1 in FIG. 5A).

Figure 5B:
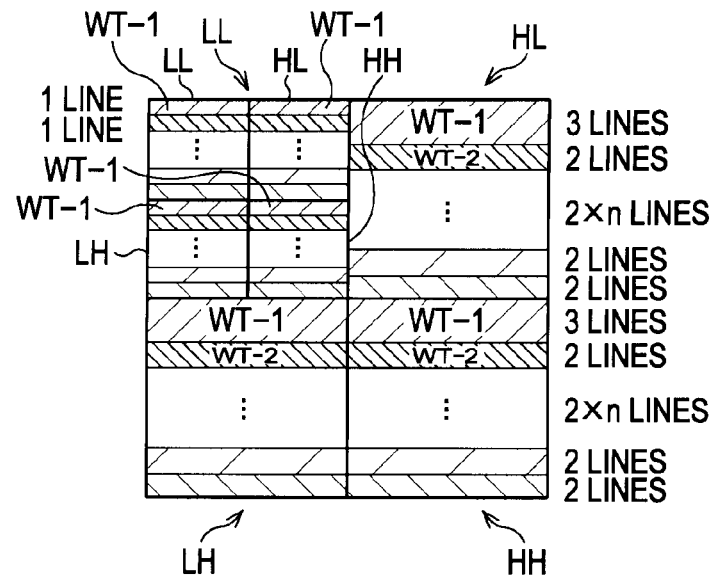

With the processing of division level 1 of the 1st filter processing, the coefficient data equivalent to the three lines of the coefficients C1, C2, and C3 is generated, and as shown in an example in FIG. 5B disposed in the regions HH, HL, and LH which are formed at division level 1, respectively (WT-1 in FIG. 5B).

Also, the region LL formed at division level 1 is further divided into four at the filter processing in the horizontal and vertical directions according to division level 2. With regard to the coefficients C5 and C4 generated at division level 2, within the region LL according to division level 1, one line according to the coefficient C5 is disposed in the region LL, and one line according to the coefficient C4 is disposed in each of the regions HH, HL, and LH.

With the 2nd filter processing and thereof by the wavelet transforming unit 10, the filter processing is performed every four lines (In-2 and so on in FIG. 5A), the coefficient data of every two lines is generated at division level 1 (WT-2 in FIG. 5B), and the coefficient data of every one line is generated at division level 2.

With the 2nd example in FIG. 4, the coefficient data equivalent to the two lines of the coefficients C6 and C7 is generated at the filter processing of division level 1, and as shown in an example in FIG. 5B disposed from the next of the coefficient data generated at the 1st filter processing in the regions HH, HL, and LH formed at division level 1. Similarly, within the region LL according to division level 1, the coefficient C9 equivalent to one line generated at the filter processing of division level 2 is disposed in the region LL, the coefficient C8 equivalent to one line is disposed in each of the regions HH, HL, and LH.

Figure 5C:
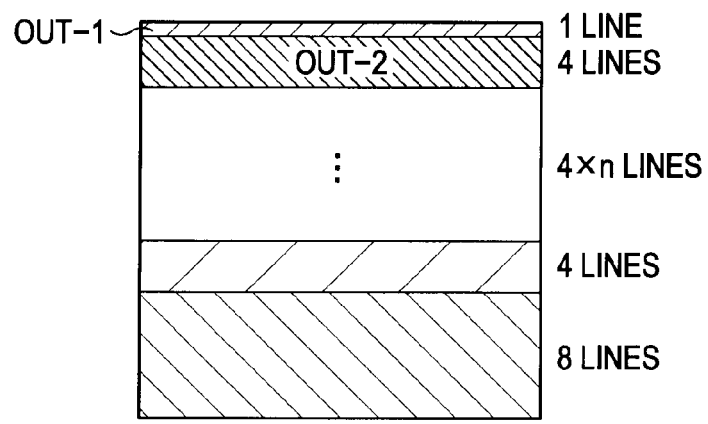

When the data subjected to wavelet transformation is decoded like FIG. 5B, as shown in an example in FIG. 5C, the first line by the 1st synthesizing processing at the decoding side is output (Out-1 in FIG. 5C) as to the 1st filter processing according to the first through seventh lines at the encoding side. Thereafter, every four lines are output at the decoding side (Out-2 and so on in FIG. 5C) as to the filter processing from the second time to the last time at the encoding side. Subsequently, eight lines are output as to the last filter processing at the encoding side.

The coefficient data generated from the high-frequency component side to the low-frequency component side at the wavelet transforming unit 10 is sequentially stored in the coefficient rearranging buffer unit 12. Upon the coefficient data being stored in the coefficient rearranging buffer unit 12 as much as the above-mentioned rearranging of coefficient data can be performed, the coefficient rearranging unit 13 rearranges the coefficient data in order necessary for the synthesizing processing and reads out from the coefficient rearranging buffer unit 12. The readout coefficient data is sequentially supplied to the quantizing unit 14.

Note that the coding unit in the entropy encoding unit 15 is not identical to a line block in some cases, but the coefficient rearranging unit 13 reads out coefficient data for each coding unit. That is to say, upon coefficient data being stored in the coefficient rearranging buffer unit 12 as much as the coefficient data of at least one coding unit can be read out while performing the above-mentioned rearranging, the coefficient rearranging unit 13 starts readout of the coefficient data. Description will be made below assuming that the coding unit at the entropy encoding unit 15 is identical to a line block.

Figure 6:
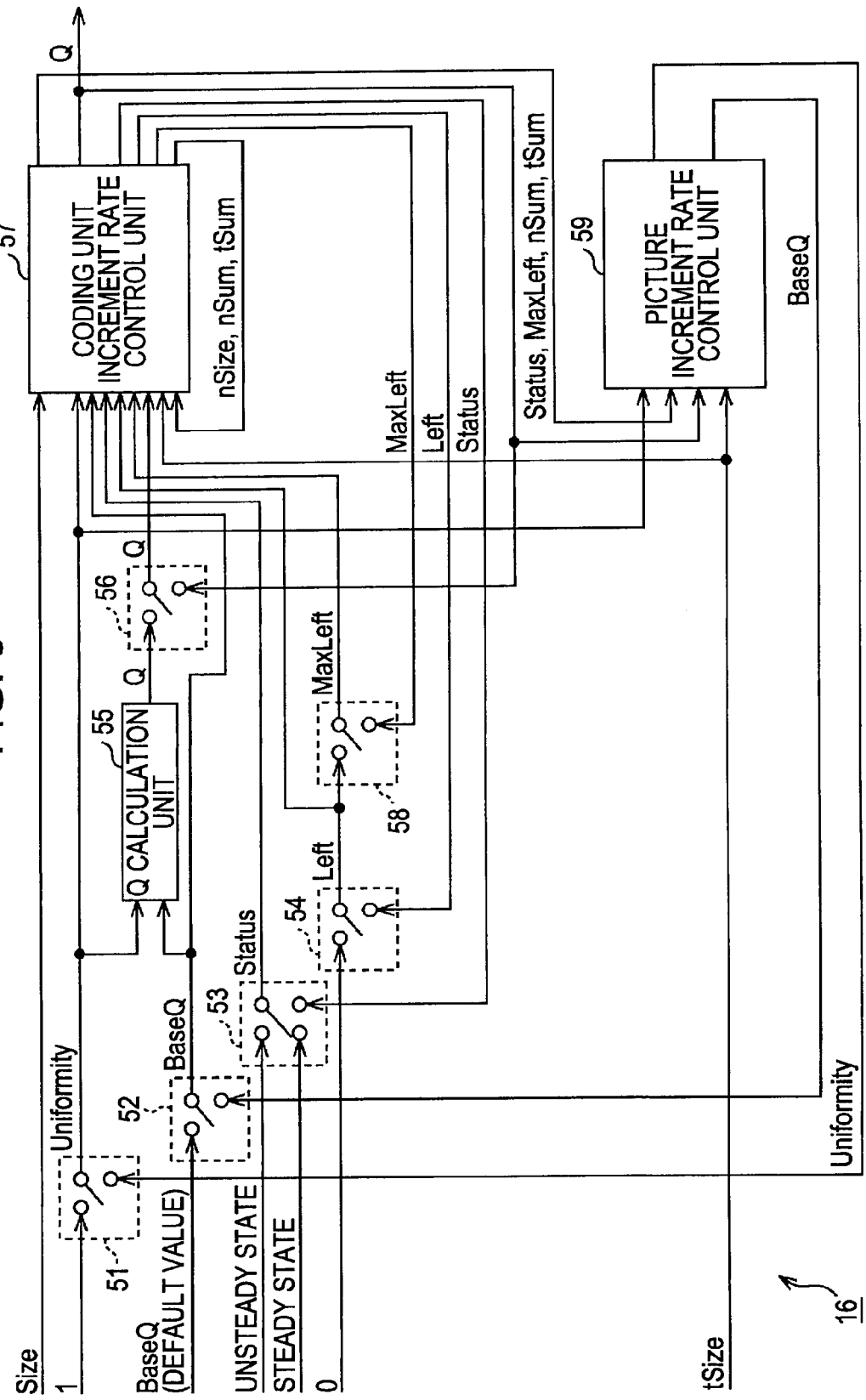
FIG. 6 is a block diagram illustrating a configuration example of the rate control unit in FIG. 1.

Next, description will be made regarding the rate control unit 16. FIG. 6 is a diagram describing an internal configuration example of the rate control unit 16. In FIG. 6, the rate control unit 16 includes switching units 51 through 54, a Q calculation unit 55, a switching unit 56, a coding-unit increment rate control unit 57, a switching unit 58, and a picture increment rate control unit 59.

The switching unit 51 sets the value of Uniformity which is a variable for learning evenness within one picture of an image, which is employed by the coding-unit increment rate control unit 57. The switching unit 51 selectively sets the value of Uniformity based on either "1" which is a predetermined value, or the value calculated at the picture increment rate control unit 59. The switching unit 51 selects "1" when initializing the entire system, and when Status which is a flag showing the state of the image of image data to be encoded is in an unsteady state, and selects the value calculated at the picture increment rate control unit 59 at the time of others. The switching unit 51 supplies the selected value thereof to the coding-unit increment rate control unit 57. Also, the switching unit 51 supplies the set value of Uniformity to the Q calculation unit 55 and the picture increment rate control unit 59.

The switching unit 52 sets the value of BaseQ representing a basic quantization step size which is the reference value (default value) for each picture of quantization step sizes employed by the coding-unit increment rate control unit 57.

Note that the "basic quantization step size" as stated here means a quantization step size which becomes a target code amount through the entire picture. The switching unit 52 selectively sets the value of BaseQ based on either the default value of BaseQ which is a predetermined value, or the value calculated at the picture increment rate control unit 59. The switching unit 52 selects the default value of BaseQ at the time of initializing, and selects the value calculated at the picture increment rate control unit 59 at the time of others. The switching unit 52 supplies the selected value thereof to the coding-unit increment rate control unit 57 and the Q calculation unit 55.

The switching unit 53 sets the value of Status which is a flag indicating the state of the image of image data to be encoded, which is employed by the coding-unit increment rate control unit 57. The coding-unit increment rate control unit 57 switches a rate control method depending on the case of encoding an image with few motions, i.e., image data having high correlation between pictures, or the case of encoding an image with many motions, or an image at the time of a scene change, i.e., image data having low correlation between pictures. The switching unit 53 provides Status which is a flag employed for switching thereof. The switching unit 53 selects, as the value of Status, any one of the value indicating an unsteady state serving as a default value, the value indicating a steady state serving as a default value, or the value set by the coding-unit increment rate control unit 57, and supplies the selected value to the coding-unit increment rate control unit 57.

Note that the status value set by the coding-unit increment rate control unit 57 is either the value indicating an unsteady state, or the value indicating a steady state. That is to say, Status takes only the two types of an unsteady state and a steady state.

This Status is initialized to the value indicating a steady state for each picture, and is updated to the value indicating an unsteady state as necessary at the updating processing in increments of coding unit. That is to say, the switching unit 53 selects the value indicating a steady state serving as a default value when a picture to be processed is changed, and selects the value set by the coding-unit increment rate control unit 57 at the time of others.

Note however that in the case of setting the picture of the top of image data to an object to be processed, there is no picture before that picture, so Status is set to the value indicating an unsteady state. That is to say, the switching unit 53 selects the value indicating an unsteady state serving as a default value until the processing as to the top picture is completed from when initializing the entire system. Note that the switching unit 53 may select the value indicating an unsteady state serving as a default value when initializing the entire system, and may select the value set by the coding-unit increment rate control unit 57 when performing updating processing in increments of coding unit as to the top picture.

According to such control, the coding-unit increment rate control unit 57 can determine the correlation as to the picture which is one picture ahead for each picture, and can perform rate control appropriately by correctly detecting an unsteady state which suddenly appears, for example, such as a scene change. Also, the coding-unit increment rate control unit 57 can determine the correlation as to the picture which is one picture ahead in increments of coding unit, whereby rate control can be performed appropriately even in the case of the correlation at a part of an image deteriorating.

The switching unit 54 sets the value of Left which is a variable representing the data amount (code amount) of encoded data stored in the buffer of the smoothing unit 17, which is employed by the coding-unit increment rate control unit 57. The switching unit 54 selectively sets the value of Left based on either "0" which is a predetermined value or the value calculated at the coding-unit increment rate control unit 57. Though the details will be described later, the switching unit 54 selects the value "0" when initializing the entire system, and selects the value output from the coding-unit increment rate control unit 57 at the time of others. The switching unit 54 supplies the selected value of Left to the coding-unit increment rate control unit 57. Also, the switching unit 54 supplies the selected value of Left to the switching unit 58.

The Q calculation unit 55 calculates a quantization step size based on BaseQ supplied from the switching unit 52, and Uniformity supplied from the switching unit 51, and supplies the value thereof to the switching unit 56. The switching unit 56 sets the value of the quantization step size Q employed by the coding-unit increment rate control unit 57. The switching unit 56 selects as the value of the quantization step size Q either the value calculated at the Q calculation unit 55 or the value calculated at the coding-unit increment rate control unit 57. The switching unit 56 selects the value calculated at the Q calculation unit 55 when a picture to be processed is changed, and selects the value calculated at the coding-unit increment rate control unit 57 at the time of others. The switching unit 56 supplies the selected quantization step size Q to the coding-unit increment rate control unit 57.

The coding-unit increment rate control unit 57 performs processing relating to rate control in increments of coding unit by employing various variables, such as Size which is a variable indicating a generated code amount for each coding unit, supplied from the entropy encoding unit 15, Uniformity supplied from the switching unit 51, BaseQ supplied from the switching unit 52, Status supplied from the switching unit 53, Left supplied from the switching unit 54, MaxLeft indicating the maximum value in increments of picture of Left, supplied from the switching unit 58, tSize which is a target code amount per coding unit, nSize which is a variable indicating a normalization code amount obtained by normalizing the code amount generated at the coding unit which is one coding unit ahead, calculated by the coding-unit increment rate control unit 57 itself, nSum which is a variable indicating the sum in increments of picture of the normalization code amount thereof, and tSum indicating the sum in increments of picture of a target code amount per coding unit.

While description will be made later regarding the details of the processing executed by the coding-unit increment rate control unit 57, the coding-unit increment rate control unit 57 calculates the quantization step size Q for each coding unit, and supplies the result thereof to the quantizing unit 14. Also, the coding-unit increment rate control unit 57 supplies the quantization step size Q thereof to the switching unit 56 and the picture increment rate control unit 59. Further, the coding-unit increment rate control unit 57 supplies the calculated various values such as Status, MaxLeft, nSum, and tSum to the picture increment rate control unit 59. Also, the coding-unit increment rate control unit 57 supplies the calculated Status to the switching unit 53, Left to the switching unit 54, and MaxLeft to the switching unit 58, respectively.

The switching unit 58 sets the value of MaxLeft, which is employed by the coding-unit increment rate control unit 57. The switching unit 58 selects as MaxLeft either the value of Left supplied from the switching unit 54 or the value of MaxLeft calculated at the coding-unit increment rate control unit 57. The switching unit 58 selects the value supplied from the switching unit 54 at the time of initialization in increments of picture, and selects the value output from the coding-unit increment rate control unit 57 at the time of others. The switching unit 58 supplies the selected value of MaxLeft to the coding-unit increment rate control unit 57.

The picture increment rate control unit 59 performs processing relating to rate control to be performed in increments of picture based on various variables such as the quantization step size Q, Status, MaxLeft, nSum, and tSum which are supplied from the coding-unit increment rate control unit 57, tSize which is a target code amount per coding unit, Uniformity supplied from the switching unit 51, and so forth.

Though description will be made later regarding the details of the processing executed by the picture increment rate control unit 59, the picture increment rate control unit 59 performs updating of Uniformity supplied from the switching unit 51, and calculation of BaseQ for each picture. The picture increment rate control unit 59 supplies the updated Uniformity to the switching unit 51, and supplies the calculated BaseQ to the switching unit 52.

Though not illustrated in order to avoid complication, with regard to nSum and tSum also, the same switching units as the switching units 51 through 54 are actually provided. Each of these switching units initializes the value of the corresponding variable to "0" at the beginning of encoding of a picture, and selects the value calculated at the coding-unit increment rate control unit 57 at the time of others, and returns this to the coding-unit increment rate control unit 57.

Figure 7:
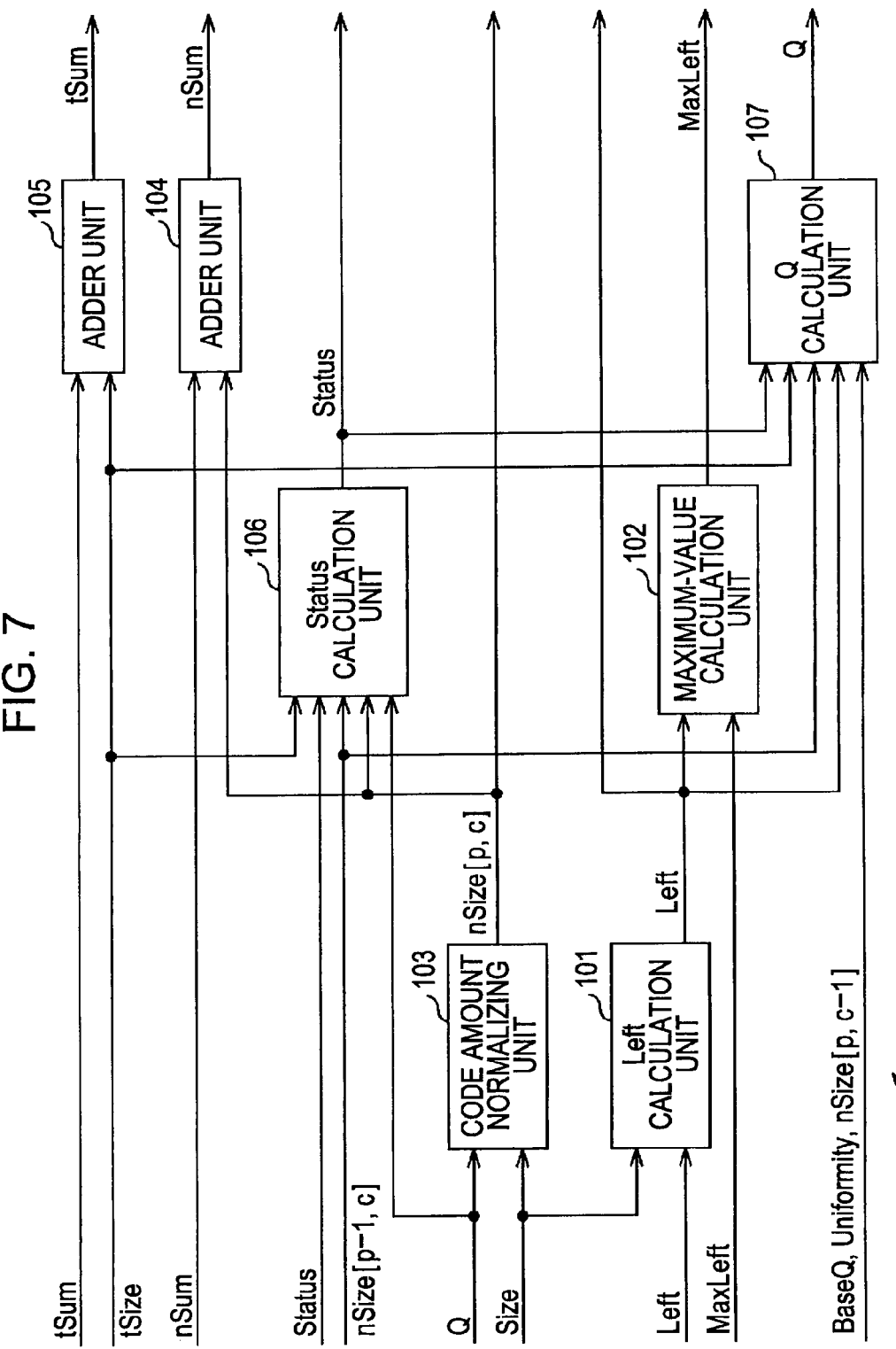
FIG. 7 is a block diagram illustrating a detailed configuration example of the coding-unit increment rate control unit in FIG. 6.

FIG. 7 is a block diagram illustrating a detailed configuration example of the coding-unit increment rate control unit 57.

As shown in FIG. 7, the coding-unit increment rate control unit 57 includes a Left calculation unit 101, a maximum-value calculation unit 102, a code amount normalizing unit 103, an adder unit 104, an adder unit 105, a Status calculation unit 106, and a Q calculation unit 107.

The Left calculation unit 101 calculates new Left (updates the value of Left) based on Size which is a variable indicating a generated code amount for each coding unit, supplied from the entropy encoding unit 15, and Left which is a variable indicating the data amount (code amount) of encoded data stored in the buffer of the smoothing unit 17, supplied from the switching unit 54. The Left calculation unit 101 supplies the calculated Left to the switching unit 54, maximum-value calculation unit 102, and Q calculation unit 107.

The maximum-value calculation unit 102 calculates new MaxLeft (updates the value of MaxLeft) based on Left supplied from the Left calculation unit 101, and MaxLeft indicating the maximum value in increments of picture of Left, supplied from the switching unit 58. The maximum-value calculation unit 102 supplies the calculated MaxLeft to the switching unit 58 and the picture increment rate control unit 59.

The code amount normalizing unit 103 normalizes Size supplied from the entropy encoding unit 15 based on the quantization step size Q supplied from the switching unit 56, and obtains nSize which is a variable indicating the normalization code amount obtained by normalizing the code amount generated at a coding unit. Description will be made later regarding the details of normalization.

Note that nSize[p, c] in the drawing indicates the normalization code amount of the c'th coding unit of the p'th picture. The code amount normalizing unit 103 supplies the obtained nSize to the adder unit 104 and the Status calculation unit 106.

Also, the code amount normalizing unit 103 further supplies the normalization code amount nSize[p−1, c] of the coding unit at the same position as the picture which is one picture ahead to the Status calculation unit 106 and the Q calculation unit 107. That is to say, nSize[p, c] output from the code amount normalizing unit 103 is returned to the inside of the coding-unit increment rate control unit 57, and with processing as to the coding unit (c'th coding unit) at the same position as the next picture, supplied to the Status calculation unit 106 and the Q calculation unit 107 as nSize[p−1, c].

Further, the code amount normalizing unit 103 supplies the normalization code amount nSize[p, c−1] of the coding unit which is one coding unit ahead of the same picture to the Q calculation unit 107. That is to say, nSize[p, c] output from the code amount normalizing unit 103 is returned to the inside of the coding-unit increment rate control unit 57, and with the processing as to the next coding unit, supplied to the Q calculation unit 107 as nSize[p, c−1].

The adder unit 104 calculates new nSum (updates the value of nSum) by adding the normalization code amount nSize supplied from the code amount normalizing unit 103 to nSum which is a variable indicating the sum in increments of picture of the normalization code amount nSize. The adder unit 104 supplies the calculated nSum to the picture increment rate control unit 59. Also, the adder unit 104 returns the calculated nSum to itself and employs this for the processing as to the next coding unit. Note that nSum is a variable indicating the sum in increments of picture of nSize, so the value thereof is initialized for each picture.

The adder unit 105 calculates new tSum (updates the value of tSum) by adding tSize which is a target code amount per coding unit to tSum indicating the sum in increments of picture of a target code amount per coding unit. The adder unit 105 supplies the calculated tSum to the picture increment rate control unit 59. Also, the adder unit 105 returns the calculated tSum to itself and employs this for the processing as to the next coding unit. Note that tSum is a variable indicating the sum in increments of picture of tSize, so the value thereof is initialized for each picture.

The Status calculation unit 106 updates the value of Status supplied from the switching unit 53 by calculating the new value (steady state or unsteady state) of Status which is a flag indicating the state of image of image data to be encoded based on tSize, the normalization code amount nSize[p−1, c] of the coding unit at the same position as the picture which is one picture ahead and the newest normalization code amount nSize[p, c] supplied from the code amount normalizing unit 103, and the quantization step size Q supplied from the switching unit 56. The Status calculation unit 106 supplies the updated value of Status to the switching unit 53 and the picture increment rate control unit 59, and also supplied to the Q calculation unit 107.

The Q calculation unit 107 calculates the quantization step size Q based on Status supplied from the Status calculation unit 106, tSize, the normalization code amount nSize[p−1, c] of the coding unit at the same position as the picture which is one picture ahead, supplied from the code amount normalizing unit 103, the newest Left supplied from the Left calculation unit 101, BaseQ indicating the basic quantization step size which is the reference value (default value) for each picture of quantization step sizes, supplied from the switching unit 52, Uniformity which is a variable for learning evenness within one picture of an image, and the normalization code amount nSize[p, c−1] of the coding unit which is one coding unit ahead of the same picture supplied from the code amount normalizing unit 103. The Q calculation unit 107 supplies the calculated quantization step size Q to the quantizing unit 14 and the picture increment rate control unit 59.

Figure 8:
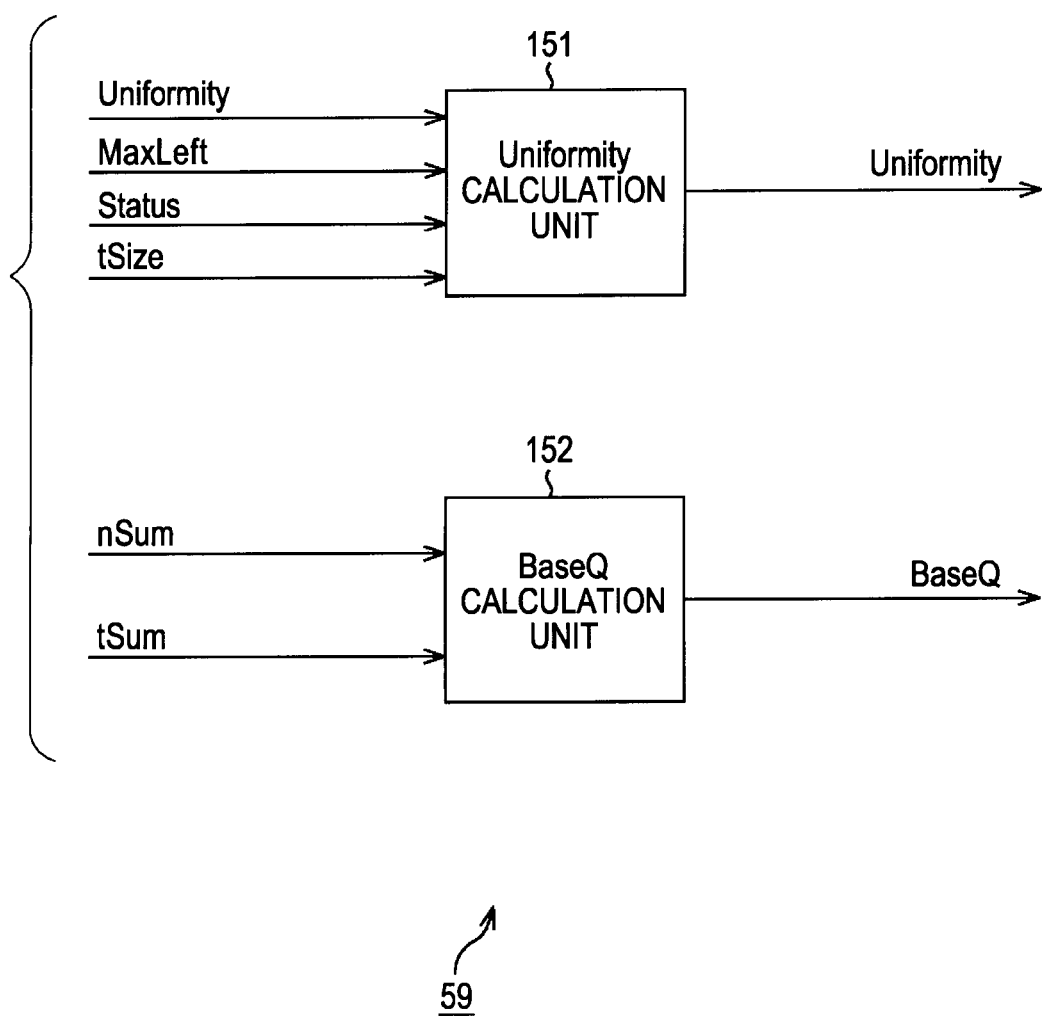
FIG. 8 is a block diagram illustrating a detailed configuration example of the picture increment rate control unit in FIG. 6.

FIG. 8 is a block diagram illustrating a detailed configuration example of the picture increment rate control unit 59.

As shown in FIG. 8, the picture increment rate control unit 59 includes a Uniformity calculation unit 151 and a BaseQ calculation unit 152.

The Uniformity calculation unit 151 calculates the new value of Uniformity (updates the value of Uniformity, supplied from the switching unit 51) based on Status which is a flag indicating the state of image of image data to be encoded, and MaxLeft indicating the maximum value in increments of picture of Left which is a variable indicating the data amount (code amount) of encoded data stored in the buffer of the smoothing unit 17, supplied from the coding-unit increment rate control unit 57, and tSize which is a target code amount per coding unit. The Uniformity calculation unit 151 supplies the calculated new value of Uniformity to the switching unit 51.

The BaseQ calculation unit 152 calculates BaseQ indicating the basic quantization step size which is the reference value (default value) for each picture of quantization step sizes based on nSum which is a variable indicating the sum in increments of picture of a normalization code amount, and tSum indicating the sum in increments of picture of a target code amount per coding unit, supplied from the coding-unit increment rate control unit 57. The BaseQ calculation unit 152 supplies the calculated BaseQ to the switching unit 52.

Next, description will be made regarding the flow of the encoding processing by the encoding apparatus 1 in FIG. 1, and the details thereof.

First, description will be made regarding a flow example of the encoding processing by the encoding apparatus 1 in FIG. 1 with reference to the flowchart in FIG. 9.

Upon the encoding processing being started, in step S1 the wavelet transforming unit 10 sets a line block number A to be processed to a default. Normally, the number A is set to "1". Upon the setting being completed, in step S2 the wavelet transforming unit 10 acquires image data equivalent to the number of lines necessary for generating one line at the A'th from the top at the lowest frequency sub band (i.e., one line block), and subjects the image data thereof to vertical analysis filtering for subjecting image data arrayed in the vertical direction of the screen to analysis filtering in step S3, and to horizontal analysis filtering for subjecting image data arrayed in the horizontal direction of the screen to analysis filtering in step S4.

In step S5, the wavelet transforming unit 10 determines whether or not the analysis filtering has been performed up to the final level. In the event that determination is made that the division level has not reached the final level, the processing is returned to step S3, the analysis filtering in steps S3 and S4 is repeated as to the current division level.

In step S5, in the event that determination is made that the analysis filtering processing has reached the final level, the processing proceeds to step S6.

In step S6, the coefficient rearranging unit 13 rearranges the coefficients of the line block A (the A'th line block from the top of the picture (field in the case of the interlace method)) which is the current coding unit in order from low frequency to high frequency.

In step S7, the quantizing unit 14 subjects the line block A of which the order has been rearranged in step S6 to quantization. In step S8, the entropy encoding unit 15 subjects the coefficient thereof to entropy encoding.

Note that as described later, the rate control unit 16 executes rate control processing for this encoding processing. In step S7, the quantizing unit 14 performs quantization by employing the quantization step size Q set in this rate control processing. Also, in step S8, the rate control unit 16 performs rate control processing by employing the code amount (the data amount of encoded data) generated in the entropy encoding processing performed by the entropy encoding unit 15. Description will be made later in detail regarding this rate control processing with reference to the flowchart in FIG. 10.

In step S9, the smoothing unit 17 temporarily stores the encoded data of the line block A obtained with the entropy encoding in step S9, and reads out the stored encoded data at a predetermined rate, thereby performing smoothing of a transmission rate, and in step S10 externally outputs the read encoded data.

In step S11, the wavelet transforming unit 10 takes the next line block as an object to be processed by incrementing the value of the number A by one, and in step S12 determines whether or not there is an unprocessed image input line regarding the picture (field in the case of the interlace method) to be processed. In the event that determination is made that there is an unprocessed image input line, the processing is returned to step S2, the processing and thereafter is repeated as to a new line block to be processed.

As described above, the processing from steps S2 through S12 is repeatedly executed, whereby each of the line blocks is encoded. Subsequently, in step S12, in the event that determination is made that there is no unprocessed image input line, the encoding processing as to the picture thereof is completed. The encoding processing will be newly started as to the next picture.

Thus, the wavelet transforming unit 10 consecutively performs the vertical analysis filtering and horizontal analysis filtering in increments of line block until the final level, so there is little quantity of the data which needs to be held (subjected to buffering) at once (at the same time) as compared with an existing method, whereby the memory amount of the buffer to be prepared can be reduced greatly. Also, the analysis filtering is performed until the final level, whereby each of the processing at the subsequent stages (i.e., processing such as coefficient rearranging, rate control, quantization, entropy encoding, and smoothing can be performed in increments of line block) can be performed. Accordingly, delay time can be reduced greatly as compared with a method for subjecting the entire screen to wavelet transformation.

Also, as described above, in step S6 rearranging of coefficients is performed, whereby the decoding apparatus for decoding this encoded data can readily perform decoding processing with little delay.

Next, description will be made regarding a detailed flow example of the rate control processing executed by the rate control unit 16 with reference to the flowchart in FIG. 10.

Figure 10:
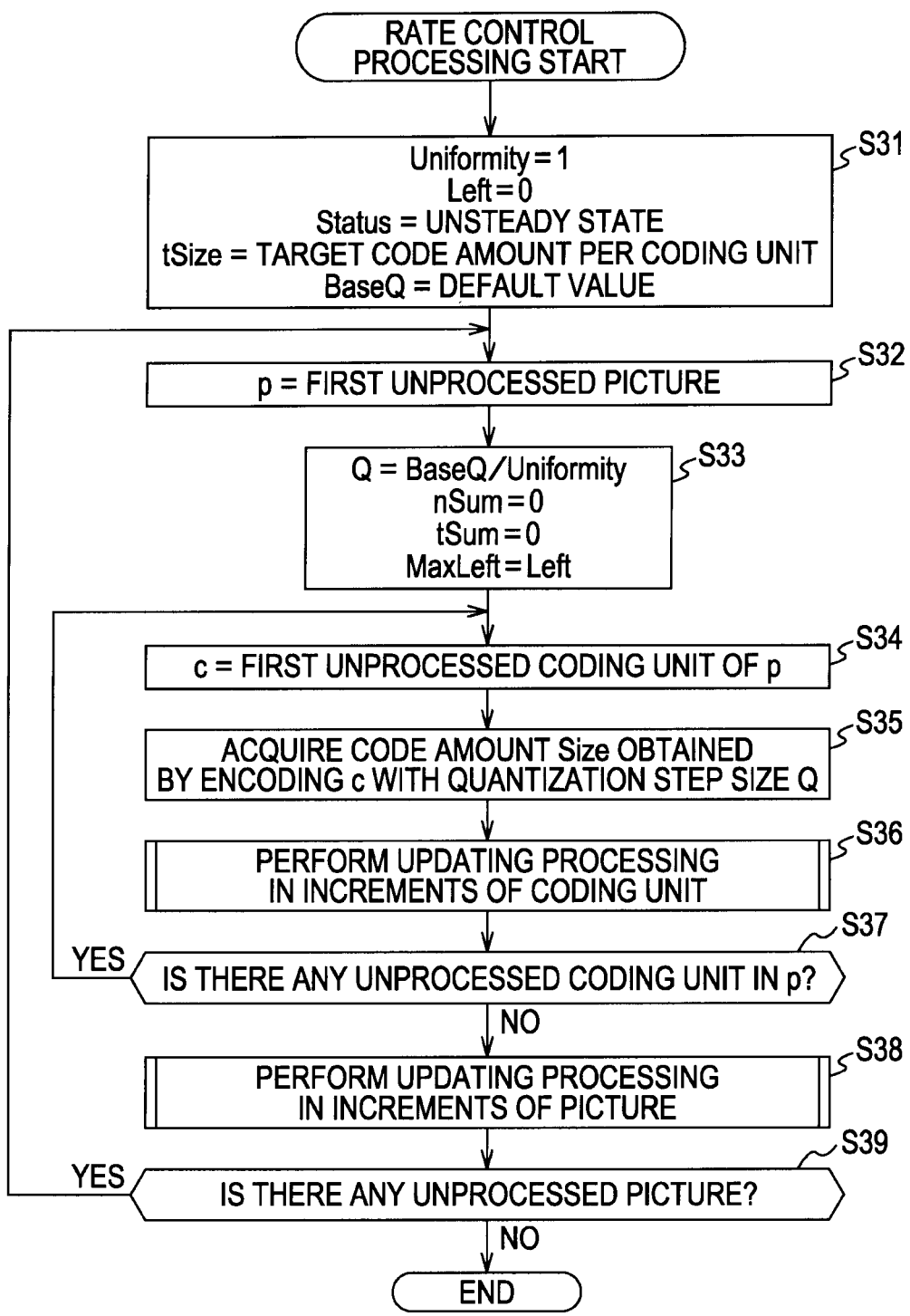
FIG. 10 is a flowchart for describing a flow example of rate control processing.

As shown in FIG. 10, the flow of this rate control processing forms a double loop. The entirety is initialized before entering the flow of the outside loop. In step S31, the switching unit 51 of the rate control unit 16 sets the value of Uniformity which is a variable for learning evenness within one picture of an image to a default value "1", the switching unit 54 sets the value of Left which is a variable indicating the data amount (code amount) of encoded data stored in the buffer of the smoothing unit 17 to a default value "0", the switching unit 53 initializes the value of Status which is a flag indicating the state of image of image data to be encoded to the value indicating an unsteady state, and the switching unit 52 sets a predetermined default value to BaseQ indicating the basic quantization step size which is the reference value (default value) for each picture of quantization step sizes. Further, the coding-unit increment rate control unit 57 and the picture increment rate control unit 59 set a target code amount per coding unit to tSize.

Note that the most appropriate value of the default value of BaseQ differs depending on a target code amount or an image to be input. However, the quantization step size Q to be used is updated for each coding unit, so no big problem is caused no matter what the default value of BaseQ may be.

With the outside loop of the rate control processing, processing in increments of picture is performed, and with the inside loop, processing in increments of coding unit within a picture is performed.

In step S31 upon initializing processing as to the entire rate control processing being performed, in steps S32 and S33 initialization at the outside loop, i.e., initialization in increments of picture is performed. In step S32, of unprocessed pictures at this time, the picture number of the first picture is set to a variable p.

In step S33, the Q calculation unit 55 divides the value of BaseQ by the value of Uniformity, thereby setting the quantization step size Q. The Q calculation unit 55 divides the value of BaseQ supplied from the switching unit 52 by the value of Uniformity supplied from the switching unit 51, and supplies the division result to the switching unit 56 as the quantization step size Q.

Also, in step S33, nSum which is a variable indicating the sum in increments of picture of the normalization code amount nSize obtained by normalizing the code amount generated at a coding unit, and tSum indicating the sum in increments of picture of the target code amount tSize per coding unit are each initialized to a value "0".

Further, in step S33, the switching unit 58 sets the value of MaxLeft indicating the maximum value in increments of picture of Left to Left. The switching unit 58 sets the value of MaxLeft to Left supplied from the switching unit 54, and supplies the MaxLeft thereof to the coding-unit increment rate control unit 57.

Upon the processing in step S33 being completed, the processing proceeds to the inside loop (steps S34 through S37).

In step S34, of unprocessed coding units (e.g., line blocks) at this time within the picture of a picture number p, the coding unit number of the first coding unit is set to a variable c.

Figure 9:
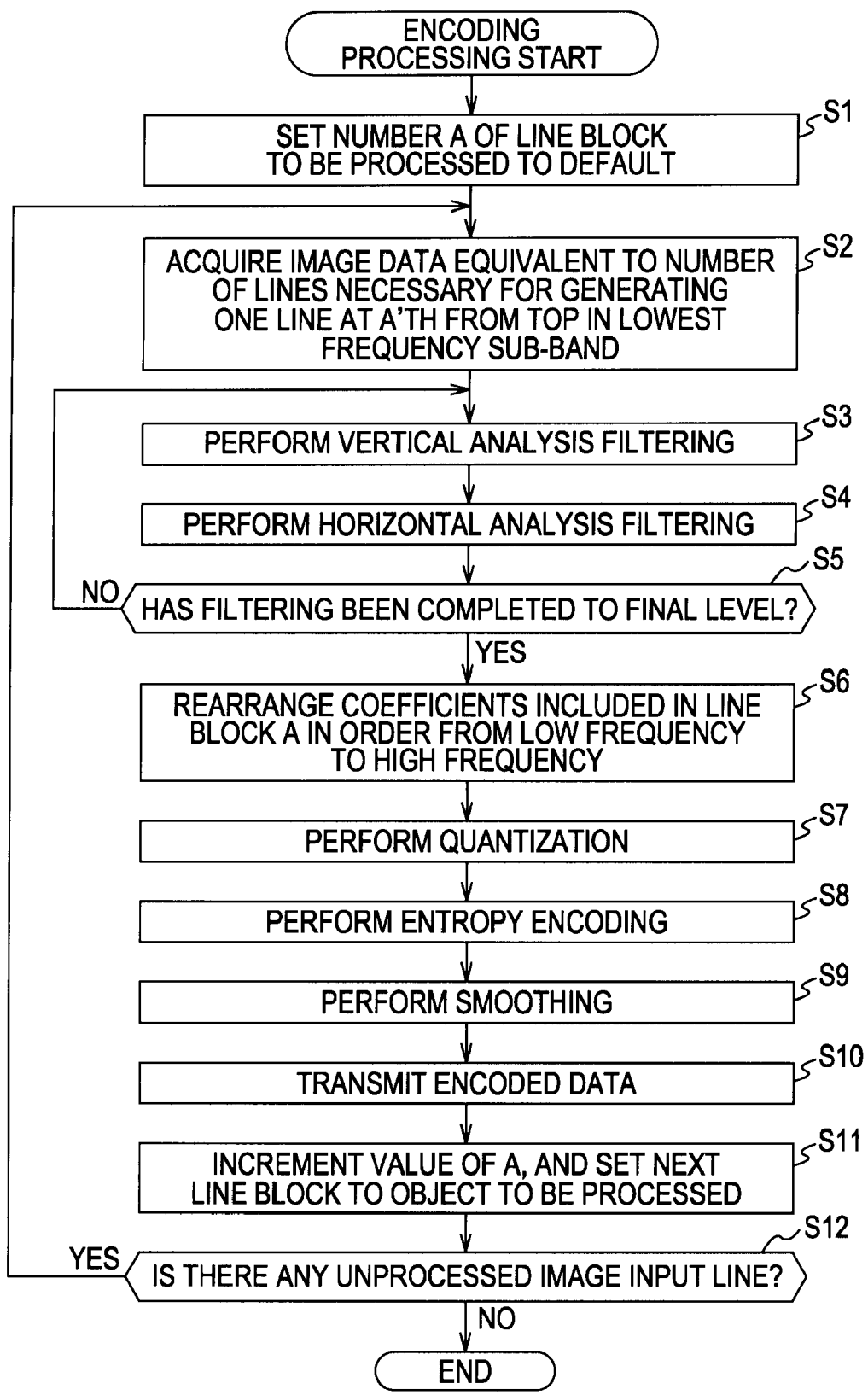
FIG. 9 is a flowchart for describing a flow example of encoding processing.

In step S7 in FIG. 9, the quantizing unit 14 subjects the coding unit of a coding unit number c within the picture of the picture number p of image data (coefficient data) to quantization based on the quantization step size Q. Also, the entropy encoding unit 15 subjects the quantized coefficient data to entropy encoding.

In step S35, the coding-unit increment rate control unit 57 acquires the generated code amount Size which is the data amount of encoded data obtained with the entropy encoding thereof from the entropy encoding unit 15, and in step S36 performs rate control processing (rate updating processing) in increments of coding unit. Description will be made later regarding the details of the updating processing in increments of coding unit with reference to the flowchart in FIG. 11.

Upon the processing in step S36 being completed, the processing proceeds to step S37. In step S37, the coding-unit increment rate control unit 57 determines whether or not there is an unprocessed coding unit within the current picture, i.e., within the picture of the picture number p. In the event that determination is made that there is an unprocessed coding unit within the current picture, the processing is returned to step S34, where the processing in steps S34 through S37 is repeated as to the next unprocessed coding unit. Also, in step S37, in the event that determination is made that there is no unprocessed coding unit within the current picture, the processing of the inside loop is completed, and the processing proceeds to step S38 to return to the outside loop.

In step S38, the picture increment rate control unit 59 performs rate control processing (rate updating processing) in increments of picture. Description will be made later regarding the details of the updating processing in increments of picture with reference to the flowchart in FIG. 15.

Upon the processing in step S38 being completed, the processing proceeds to step S39. In step S39, the picture increment rate control unit 59 determines whether or not there is an unprocessed picture within image data to be processed. In the event that determination is made that there is an unprocessed picture, the processing is returned to step S32, where the processing in steps S32 through S39 is repeated as to the next unprocessed picture. Also, in step S39, in the event that determination is made that there is no unprocessed picture, the processing of the outside loop is completed, and also the rate control processing is completed.

Next, description will be made regarding a detailed flow example of the updating processing in increments of coding unit to be executed in step S36 in FIG. 10 with reference to the flowchart in FIG. 11.

Upon the updating processing in increments of coding unit being started, first in step S51 updating of Left which is a variable indicating the data amount (code amount) of encoded data stored in the buffer of the smoothing unit 17, and MaxLeft indicating the maximum value in increments of picture of Left is performed.

That is to say, in step S51 the Left calculation unit 101 calculates new Left by adding Size which is the code amount generated at the current coding unit to Left, and subtracting the code amount transmitted from the buffer of the smoothing unit 17 (transmitted code amount) from completion of encoding of the coding unit which is one coding unit ahead to completion of encoding of the current coding unit from Left. That is to say, the Left calculation unit 101 adds the value of Size supplied from the entropy encoding unit 15 to the value of Left calculated by the Left calculation unit 101 itself as to the coding unit which is one coding unit ahead, and further subtracts the transmitted code amount from the value of Left. The value of Left is updated according to the above-mentioned calculation.

Also, in step S51, the maximum-value calculation unit 102 sets a greater value between MaxLeft and new Left to new MaxLeft. That is to say, the maximum-value calculation unit 102 compares the value of MaxLeft supplied from the switching unit 58 (MaxLeft updated by the maximum-value calculation unit 102 itself as to the coding unit which is one coding unit ahead), and the value of the newest Left calculated and supplied by the Left calculation unit 101, and selects a greater value thereof as new MaxLeft. The value of MaxLeft is updated according to the above-mentioned calculation, and the maximum value within the picture of the code amount pooled in the buffer of the smoothing unit 17 is created.

Upon the processing in step S51 being completed, in step S52 the code amount normalizing unit 103 calculates nSize[p, c] which is the normalization result of the code amount generated at the coding unit of the coding unit number c of the picture of the picture number p. The code amount normalizing unit 103 calculates nSize[p, c] by multiplying the value of Size supplied from the entropy encoding unit 15 by the quantization step size Q supplied from the switching unit 56.

Figure 12:
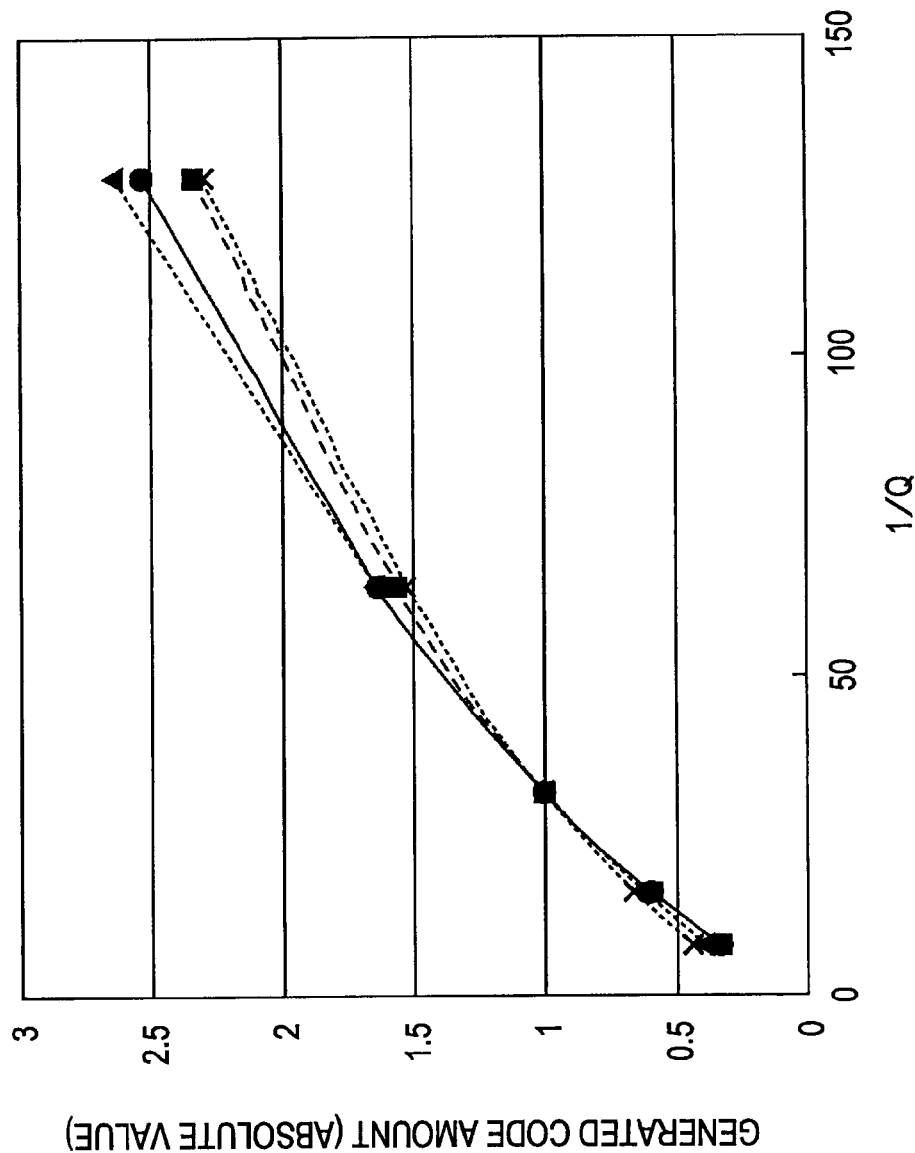
FIG. 12 is a graph illustrating an example of the relation between a quantization step size and a generated code amount.

Now, description will be made regarding the relation between the quantization step size Q and a generated code amount. An experiment has been performed wherein the state of change in a generated code amount is checked when changing the value of the quantization step size Q. FIG. 12 is a graph illustrating the experiment result thereof. In the graph in FIG. 12, the horizontal axis indicates the inverse number of the quantization step size Q, and the vertical axis indicates a generated code amount (relative value). Black dots and black squares are experiment results, which illustrate the relation between the inverse number of the quantization step size Q and a generated code amount when encoding images of which the contents differ mutually.

That is to say, as shown in the graph in FIG. 12, a generated code amount can be represented as $(1/Q)^k$ according to the inverse number (1/Q) of the quantization step size. In the graph in FIG. 12, a black triangle indicates the relation between a generated code amount and the quantization step size Q when setting the value of k to "0.7", and x-mark (x) indicates the relation between a generated code amount and the inverse number of quantization step size Q when setting the value of k to "0.6". As shown in the graph in FIG. 12, the above-mentioned experiment results are sandwiched between these two curves. That is to say, the value of k is set to the value of 0.6 through 0.7.

According to the above-mentioned experiment results, upon the range of change in the quantization step size Q being narrowed, the relation between the inverse number of the quantization step size Q and a generated code amount can be approximated to a straight line. That is to say, the product between the quantization step size Q and a generated code amount can be regarded as a generally constant value.

Therefore, if we say that the generated code amount when encoding a certain image with a quantization step size Q0 is S0, and the generated code amount when encoding the same image with a quantization step size Q1 is S1, the following Expression (4) holds.

$$Q0 \times S0 \text{ approx. equal to } Q1 \times S1 \quad (4)$$

This Expression (4) holds not only in encoding of the entire picture but also in encoding of a part of a picture, i.e., in increments of coding unit.

Subsequently, if we say that the generated code amount when the value of the quantization step size Q is "1" is S, the following Expression (5) holds.

$$Q0 \times S0 \text{ approx. equal to } Q1 \times S1 \text{ approx. equal to } 1 \times S \text{ equal to } S \quad (5)$$

That is to say, it also can be conceived that the normalization code amount nSize calculated in step S52 is the generated code amount when the value of the quantization step size Q is "1".

The value of a generated code amount tends to become small when the value of the employed quantization step size Q is great, and to become great when the value of the employed quantization step size Q is small. It can be conceived that the normalization of a generated code amount is to reduce the tendency thereof by multiplying the value of the employed quantization step size Q to correct the value of a generated code amount.

Also, in step S51, the adder unit 104 calculates new nSum (updates nSum) by adding the normalization code amount nSize[p, c] calculated at the code amount normalizing unit 103 to nSum indicating the sum in increments of picture of the normalization code amount calculated as to the coding unit which is one coding unit ahead.

Further, in step S51, the adder unit 105 calculates new tSum (updates tSum) by adding tSize which is a target code amount per coding unit to tSum indicating the sum in increments of picture of a target code amount per coding unit calculated as to the coding unit which is one coding unit ahead.

In step S53, the Status calculation unit 106 determines whether or not the value of the newest normalization code amount nSize[p, c] calculated at the code amount normalizing unit 103 in step S52 is greater than the value of the addition result between nSize[p−1, c] which is a normalization code amount as to the coding unit at the same position as the picture which is one picture ahead, and tSize×Q/2. In the event that determination is made that nSize[p, c] is greater than nSize[p−1, c]+tSize×Q/2, the processing proceeds to step S54. In step S54, the Status calculation unit 106 sets Status to an unsteady state. Upon the processing in step S54 being completed, the processing proceeds to step S55. Also, in step S53, in the event that determination is made that nSize[p, c] is not greater than nSize[p−1, c]+tSize×Q/2, the processing in step S54 is omitted, and the processing proceeds to step S55.

That is to say, the Status calculation unit 106 sets Status to an unsteady state only in the case of the newest nSize being greater than the nSize of the coding unit at the same position as the picture which is one picture ahead by tSize×Q/2 or more. The case of the newest nSize being greater than the nSize of the coding unit at the same position as the picture which is one picture ahead by tSize×Q/2 or more which is a determination condition in step S53 means that the value of the newest normalization code amount is clearly greater than the value of the normalization code amount of the coding unit at the same position as the picture which is one picture ahead. This determination condition is an example, so tSize×Q/2 may be changed to another value, and determination may be made in another format.

That Status is an unsteady state means that a great difference with the pattern of a generated code amount as to the picture which is one picture ahead is detected, and the correlation between the image (coefficient data) of the current picture and the image (coefficient data) of the picture which is one picture ahead is low, and that Status is a steady state means that a great difference with the pattern of a generated code amount as to the picture which is one picture ahead is not detected, and the correlation between the image (coefficient data) of the current picture and the image (coefficient data) of the picture which is one picture ahead is high.

With the processing in step S55 and thereafter, the Q calculation unit 107 performs calculation of the quantization step size Q. The Q calculation unit 107 performs classification of the case into three cases, and changes the calculation method of the quantization step size Q depending on each of the cases.

In step S55, the Q calculation unit 107 determines whether or not Status is a steady state. In the event that determination is made that Status is a steady state, the processing proceeds to step S56. In step S56, the Q calculation unit 107 determines whether or not the value of Left/tSize is smaller than 5.6. In the event that determination is made that the value of Left/tSize is smaller than 5.6, the processing proceeds to step S57. That is to say, the first classification of the case (first case) is a case in which Status is a steady state, and also Left/tSize is smaller than 5.6.

At the time of the first case, in step S57 the Q calculation unit 107 sets the quantization step size Q to BaseQ which is the basic quantization step size, and subsequently in step S58, divides the quantization step size Q thereof by Uniformity which is a variable for learning evenness within one picture of an image, thereby calculating a new quantization step size Q (updating the value of the quantization step size Q). That is to say, the Q calculation unit 107 performs correction so as to increase the quantization step size Q to reduce the code amount in the case in which the generated code amount within a picture is not even. If the above processing is put in another way, in this case, the Q calculation unit 107 sets the value of a new quantization step size to BaseQ/Uniformity.

Upon the processing in step S58 being completed, the updating processing in increments of coding unit is completed, the processing returns to step S36 in FIG. 10, where the processing proceeds to step S37.

Figure 11:
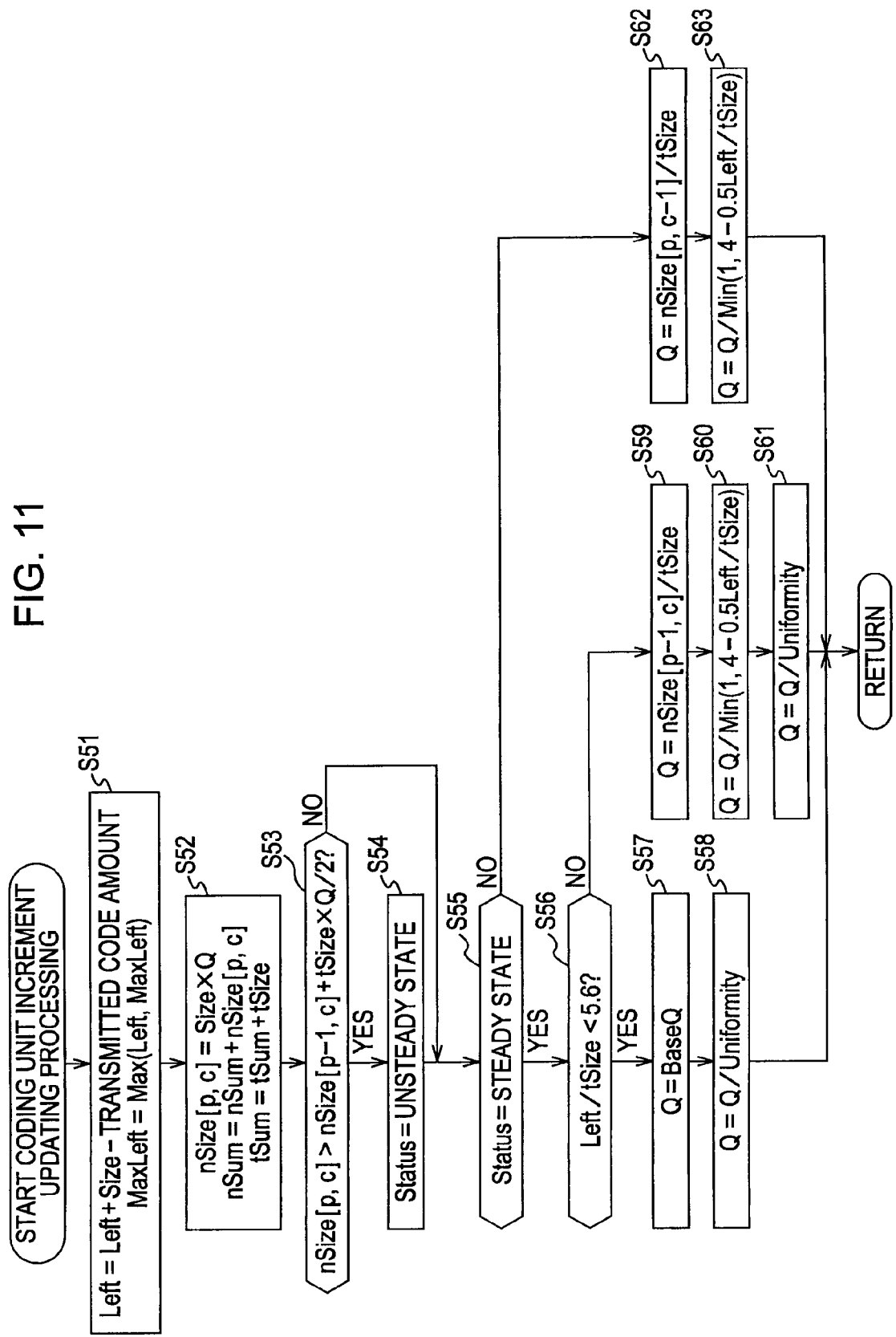
FIG. 11 is a flowchart for describing a flow example of coding unit increment updating processing.

In step S56 in FIG. 11, in the event that determination is made that the value of Left/tSize is not smaller than 5.6, the processing proceeds to step S59. That is to say, the second classification of the case (second case) is a case in which Status is a steady state, and also Left/tSize is not smaller than 5.6.

At the time of the second case, in step S59 the Q calculation unit 107 sets the quantization step size Q to nSize[p−1, c]/tSize. This is for obtaining the quantization step size Q by employing the following Expression (6) which is a relational expression corresponding to the above-mentioned Expression (5).

$$nSize[p-1,c] \times 1 = tSize \times Q \qquad (6)$$

nSize[p−1, c] is the normalization code amount of the coding unit at the same position as the picture which is one picture ahead (generated code amount when encoding with a quantization step size "1"). That is to say, in this case, it can be conceived that the obtained quantization step size Q is a quantization step size such as encoding the coding unit at the same position as the picture which is one picture ahead with the code amount tSize.

In the second case, Status is a steady state, so the Q calculation unit 107 determines that the correlation between the current picture and the picture which is one picture ahead is high, and readily sets the quantization step size Q by employing the correlation thereof and the information of the coding unit at the same position as the last picture.

In step S60, the Q calculation unit 107 calculates a new quantization step size Q by dividing the quantization step size Q set in step S59 by a smaller one of a value "1" and (4−0.5 Left/tSize). That is to say, in the event that Left is great, i.e., in the event that much of encoded data is stored in the buffer of the smoothing unit 17, the Q calculation unit 107 performs correction so as to increase the quantization step size Q to reduce the code amount. Note that the value of (4−0.5 Left/tSize) becomes zero or a negative value in some cases, but in this case, the Q calculation unit 107 sets the value of the quantization step size Q to the maximum value that the quantization step size Q can take.

In step S61, the Q calculation unit 107 divides the value of the quantization step size Q by Uniformity. That is to say, the Q calculation unit 107 performs correction so as to increase the quantization step size Q to reduce the code amount in the case in which the generated code amount within a picture is not even.

Figure 13:
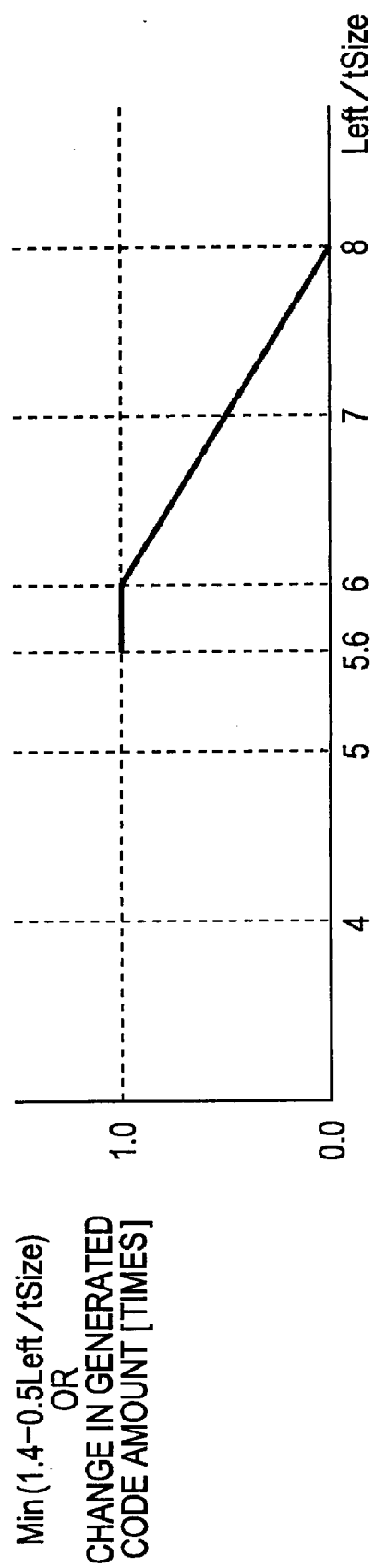
FIG. 13 is a graph illustrating an example of the relation between the code amount of a buffer and change in a generated code amount.

In the first case, the Q calculation unit 107 sets the quantization step size Q as means for encoding each of the coding units with tSize, assuming that this difficulty is the same as that of the last picture, but in the second case, much of encoded data is stored in the buffer of the smoothing unit 17, so the Q calculation unit 107 performs correction so as to increase the quantization step size Q to reduce the code amount. FIG. 13 is a graph illustrating the correlation between Min(1, 4−0.5 Left/tSize) and change in a generated code amount in step S60. Note that the second case is when Left/tSize is not smaller than 5.6, so in the graph in FIG. 13, a portion where Left/tSize is not smaller than 5.6 is illustrated.

As shown in FIG. 13, when Left/tSize is from 5.6 to 6, the value of (4−0.5 Left/tSize) is not smaller than "1", so the value of Min(1, 4−0.5 Left/tSize) is steady at "1". When Left/tSize exceeds 1611, the value of Min(1, 4−0.5 Left/tSize) decreases by 0.5 each time Left/tSize increments by "1".

In step S60, the quantization step size Q is divided by Min(1, 4−0.5 Left/tSize). According to the relation between a generated code amount and the quantization step size, the generated code amount increases Min(1, 4−0.5 Left/tSize) times due to this division as to the quantization step size Q. That is to say, the vertical axis of the graph in FIG. 13 also indicates change in a generated code amount in step S60. That is to say, upon Left/tSize becoming equal to or greater than "5.6", the Q calculation unit 107 performs control so as to generate the same code amount as a target code amount at each of the coding units, and further, upon Left/tSize becoming equal to or greater than "6", performs control so as to generate a code amount falling below the target code amount at each of the coding units to gradually reduce the code amount stored in the buffer of the smoothing unit 17.

Note that the quantization step size Q obtained in the first case is sometimes smaller than the quantization step size Q obtained in the second case. Basically, in the second case, i.e., in the case of Left/tSize being not smaller than 5.6, much encoded data is stored in the buffer of the smoothing unit 17, and it is desirable to set the quantization step size Q so as to reduce a generated code amount. Accordingly, in the event that the quantization step size Q obtained in the processing in steps S57 and 58 is greater than the quantization step size Q obtained in step S61, the quantization step size Q obtained in the processing in steps S57 and 58 may be employed.

Upon the processing in step S61 being completed, the updating processing in increments of coding unit is completed, and the processing returns to step S36 in FIG. 10, and proceeds to step S37.

In step S55 in FIG. 11, in the event that determination is made that Status is an unsteady state, the processing proceeds to step S62. That is to say, the third classification of the case is a case in which Status is an unsteady state.

At the time of the third case, in step S62 the Q calculation unit 107 sets the quantization step size Q to nSize[p, c−1]/tSize by employing nSize[p, c−1] which is the normalization code amount at the coding unit which is one coding unit ahead of the same picture. That is to say, the Q calculation unit 107 obtains the quantization step size Q such as encoding the coding unit which is one coding unit ahead at the same picture with the code amount tSize. That Status is an unsteady state means that the correlation with the last picture is low. Therefore, the Q calculation unit 107 uses the information of the coding unit which is one coding unit ahead at the same picture, thereby calculating the quantization step size by employing spatial correlation within the picture.

In step S63, as with step S60 at the time of the second case, the Q calculation unit 107 divides the quantization step size Q by a smaller value of a value "1" and (4−0.5 Left/tSize). In the event that Left is great, i.e., in the event that much encoded data is included in the buffer of the smoothing unit 17, the Q calculation unit 107 performs correction so as to increase the quantization step size Q to reduce the code amount.

Upon the processing in step S63 being completed, the updating processing in increments of coding unit is completed, and the processing returns to step S36 in FIG. 10, and proceeds to step S37.

Note that with the above description, the value of nSize[p, c−1] has been referred to employ the information of the coding unit which is one coding unit ahead within the same picture, but processing time is sometimes not in time after the information of the coding unit which is one coding unit ahead is settled. In such a case, the information of a coding unit which is more than two coding units ahead may be employed. For example, the quantization step size Q may be calculated by employing the nSize[p, c−2] of the coding unit which is two coding units ahead. Also, the information of several lines may be referred from a coding unit which is two or more coding units ahead, and the information of remaining lines may be referred from the last coding unit.

If we summarize the above-mentioned calculation methods of the quantization step size Q, a table such as shown in FIG. 14 can be obtained.

In the table in FIG. 14, the calculation method 1 of the quantization step size Q corresponds to steps S57 and S58 in FIG. 11. Also, the calculation method 2 corresponds to steps S59 through S61, and the calculation method 3 corresponds to steps S62 and S63. The calculation method 3 is employed when Status is an unsteady state, the calculation method 1 is employed when Status is a steady state, and also the code amount of encoded data stored in the buffer of the smoothing unit 17 is small, and the calculation method 2 is employed when the code amount of encoded data stored in the buffer of the smoothing unit 17 is not small. Here, that the code amount of encoded data stored in the buffer of the smoothing unit 17 is small means that Left/tSize is smaller than "5.6".

The case of the calculation method 1 being employed is a case in which Status is a steady state, and there is correlation between the current picture and the picture which is one picture ahead, and also a case in which the code amount of encoded data stored in the buffer of the smoothing unit 17 is small. Therefore, in this case, the Q calculation unit 107 sets the quantization step size Q to be steady, and executes encoding having features wherein a generated code amount varies for each coding unit, but the deterioration of the image quality is inconspicuous.

On the other hand, in the case of the calculation method 2, the code amount of encoded data stored in the buffer of the smoothing unit 17 is not small, so the Q calculation unit 107 attempts to make a generated code amount for each coding unit steady so as not to increase the code amount of encoded data stored in the buffer of the smoothing unit 17. However, in this case, in exchange for preventing the buffer of the smoothing unit 17 from overflowing, even where encoding is difficult, generated code amount becomes equivalent. Therefore, with a place where encoding is difficult, deterioration is conspicuous. However, Status is a steady state, so the correlation as to the picture which is one picture ahead is high. Therefore, the Q calculation unit 107 sets the quantization step size Q by utilizing such a situation, and has encoding executed so as to improve image quality.

On the other hand, in the case of the calculation method 3, Status is an unsteady state, so the correlation as to the picture which is one picture ahead is low. That is to say, it is difficult for the Q calculation unit 107 to determine whether or not encoding at the lower side of a screen is difficult when encoding the upper side of the screen, so it is desirable to perform the setting of the quantization step size Q, assuming that any place has the same difficulty. Therefore, in step S62 the Q calculation unit 107 determines the quantization step size Q by using the correlation as to the coding unit which is one coding unit ahead at the same picture.

In the cases of the calculation method 2 and the calculation method 3, when the code amount of encoded data stored in the buffer of the smoothing unit 17 is great (in the case of Left/tSize being not less than 6), in step S60 or step S63 the Q calculation unit 107 set the quantization step size Q such that a generated code amount becomes less than the same at all of the coding units, thereby reducing the code amount of encoded data stored in the buffer of the smoothing unit 17. Thus, the Q calculation unit 107 can reduce occasions wherein the buffer of the smoothing unit 17 overflows.

Next, description will be made regarding a detailed flow example of the updating processing in increments of picture executed in step S38 in FIG. 10 with reference to the flowchart in FIG. 15.

Upon the updating processing in increments of picture being started, in step S81 the Uniformity calculation unit 151 determines whether or not Status which is a flag indicating the state of image of image data to be encoded is a steady state. In the event that determination is made that Status is a steady state, the processing proceeds to step S82.

In step S82, the Uniformity calculation unit 151 multiplies Uniformity which is a variable for learning evenness within one picture of an image by (1.7−0.125 Maxleft/tSize) to calculate new Uniformity (update Uniformity). That is to say, the Uniformity calculation unit 151 updates Uniformity so as to decrease Uniformity when the maximum value MaxLeft in increments of the code amount Left stored in the buffer of the smoothing unit 17, which has been normalized by tSize which is a target code amount per coding unit, is great, and so as to increase Uniformity when the maximum value MaxLeft is small.

Further, in step S83, the Uniformity calculation unit 151 compares Uniformity and a value "1" to set a smaller value of both as new Uniformity such that Uniformity does not exceed "1" (performs clipping). Upon the processing in step S83 being completed, the processing proceeds to step S85.

Also, in step S81 in the event that determination is made that Status is an unsteady state, the processing proceeds to step S84. In step S84, the Uniformity calculation unit 151 sets the value of Uniformity to "1". Upon the processing in step S84 being completed, the processing proceeds to step S85.

In step S85, the BaseQ calculation unit 152 divides the sum nSum in increments of picture of the normalization code amount by the sum tSum in increments of picture of the target code amount per coding unit regardless of the value of Status, thereby calculating the basic quantization step size BaseQ. Upon BaseQ being calculated, following the switching unit 53 setting Status to a steady state in step S86, the updating processing in increments of picture is completed, the processing returns to step S38 in FIG. 10, and proceeds to step S39.

Now, let us consider Uniformity which is employed for the processing in step S58 in FIG. 11. First, in the event that Uniformity is "1", Q=Q holds in step S58, and consequently, BaseQ set in the processing in step S57 is employed as the quantization step size Q without change. BaseQ is a quantization step size such as becoming a target code amount through the entire one picture (basic quantization step size) in conformity to the solving method in step S85 in FIG. 15.

Next, in the event that Uniformity is "0.8", Q=Q/0.8 holds in step S58 in FIG. 11. The generated code amount in the case of employing this quantization step size Q becomes around 0.8 times of a case in which BaseQ is employed based on the above-mentioned relation between a generated code amount and a quantization step size.

Figure 15:
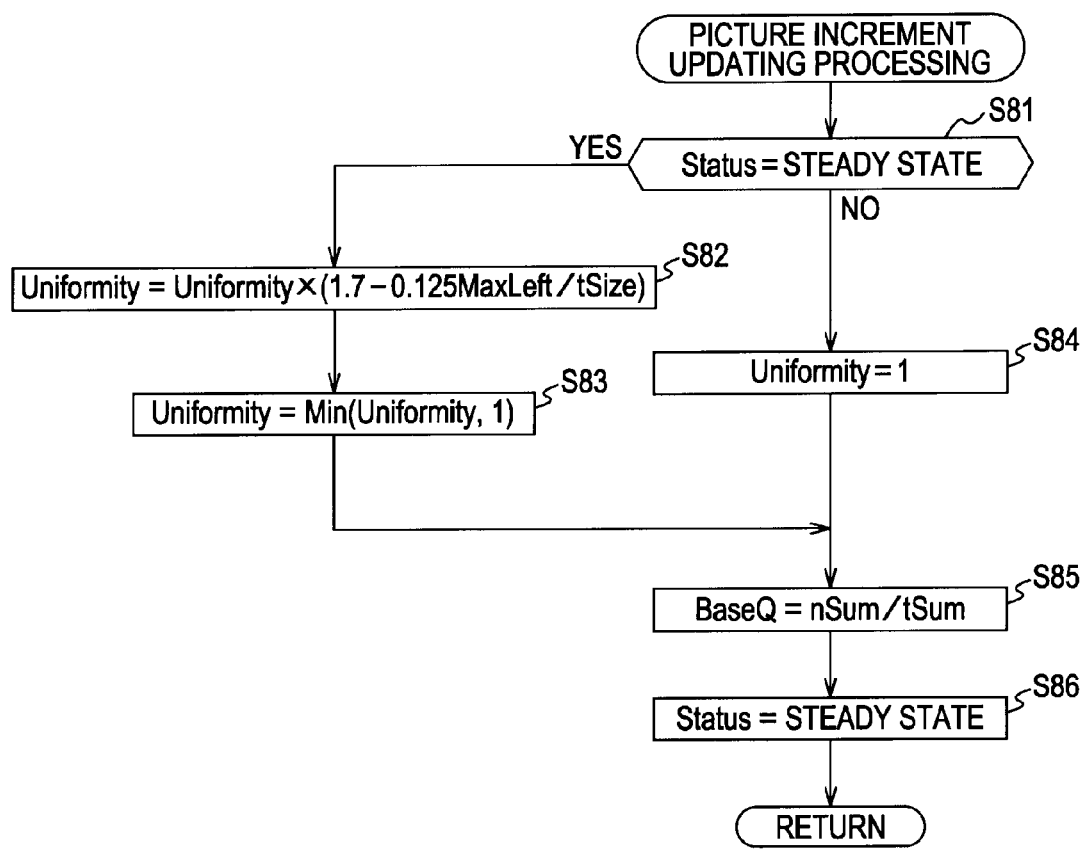
FIG. 15 is a flowchart for describing a flow example of picture increment updating processing.

The value of Uniformity is set to a value "1" as a default value in step S31 in FIG. 10, and updated at the time of completion of the processing of one picture in step S82, step S83, or step S84 in FIG. 15. At the time of this updating, if Status is a steady state, the processing in step S82 is performed first, whereby Uniformity is updated such as the following Expression (7).

$$\text{Uniformity} = \text{Uniformity}(1.7 - 0.125 \text{ MaxLeft/tSize}) \quad (7)$$

Figure 16:
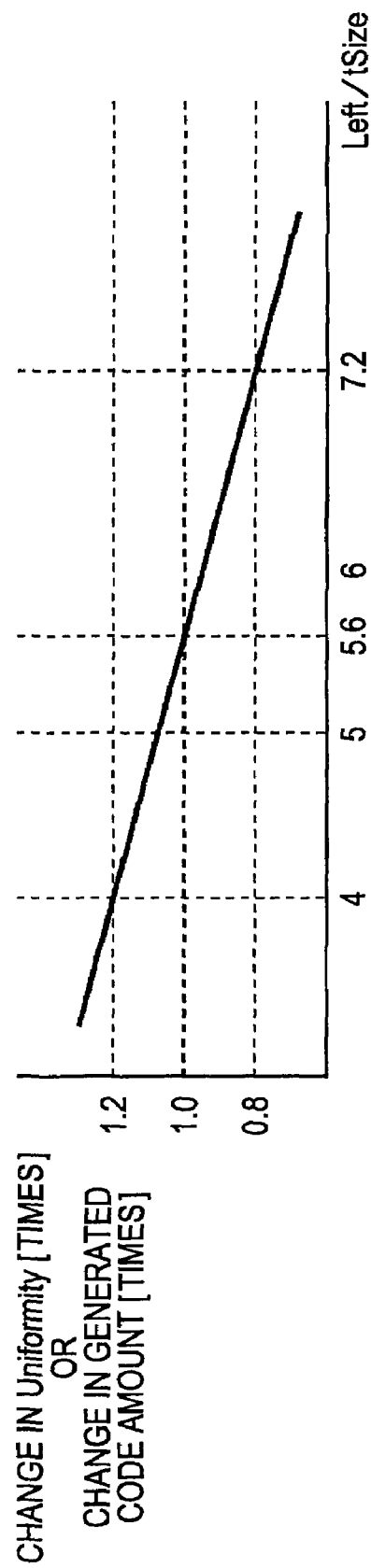
FIG. 16 is a graph illustrating an example of the relation between the code amount of a buffer and change in uniformity.

The graph shown in FIG. 16 is for graphing the relation of Expression (7), which illustrates change in Uniformity and change in a generated code amount. The horizontal axis illustrates FIG. 16 is Left/Size, and the vertical axis illustrates change in Uniformity using a scale factor. As shown in the graph in FIG. 16, Uniformity does not change when Left/tSize is "5.6". When Left/tSize is smaller than "5.6", Uniformity increases, and when Left/tSize is greater than "5.6", Uniformity decreases.

For example, in the event that many codes are generated not at the lower side of a picture but at the upper side, even if the code amount through the entire one picture is in the range of the target code amount, much of encoded data generated at the coding unit at the lower side of the picture is stored in the buffer of the smoothing unit 17, and consequently, Left/tSize becomes great in some cases. In such a case, there is a possibility that the buffer of the smoothing unit 17 may overflow, so the Uniformity calculation unit 151 reduces the value of Uniformity to adjust the generated code amount in the decreasing direction. As described above, upon the value of Uniformity becoming small, the quantization step size becomes great, and the generated code amount becomes small.

Note that in the case in which Status is an unsteady state, the Uniformity calculation unit 151 determines that the correlation between pictures is low, and returns the value of Uniformity to "1" which is a default value.

Next, let us consider the value of BaseQ. BaseQ is the basic quantization step size, and set to nSum/tSum at the BaseQ calculation unit 152. tSum is the sum of one picture worth of the target code amount tSize per coding unit, i.e., the target code amount at the entire one picture. This nSum is the sum of one picture worth of the normalization code amount obtained by normalizing the code amount generated at a coding unit, i.e., the normalization code amount of one picture worth. The normalization code amount nSize is obtained by Size×Q in step S52 in FIG. 11.

If we consider a simple case, when a condition that Status is a steady state, Uniformity is "1", and Left/tSize is smaller than "5.6" is satisfied, the quantization step size Q is set with the processing in steps S57 and S58 in FIG. 11, so the value of the quantization step size thereof is always the same as BaseQ. That is to say, nSize becomes Size×BaseQ, and nSum becomes a value obtained by multiplying the code amount generated at the entire one picture by BaseQ. If we say that the code amount generated at the entire one picture is taken as ΣSize, the quantization step size such as becoming the target code amount tSum is represented as tQ, the following Expression (8) holds based on the relation between a generated code amount and a quantization step size shown in Expression (4).

$$nSum = BaseQ \times \Sigma Size \approx tQ \times tSum \quad (8)$$

Upon tQ being obtained from Expression (8), tQ is approximately equal to nSum×tSum, and accordingly, this agrees with the calculation method of BaseQ at the BaseQ calculation unit 152. This BaseQ is employed as the basic quantization step size of the next picture. In general, with a moving image, the correlation between pictures adjacently in time is high, and the relation between a quantization step size and a generated code amount is generally the same, whereby the Q calculation unit 107 can readily the generated code amount of the next picture with precision in accordance with this procedure.

The rate control unit 16 performs rate control such as shown in the above. The features of this rate control will be summarized below.

First, with encoding processing, in the event of the difficulty of an image due to a scene change or the like changing greatly, there is a high possibility that the picture immediately after that change deviates from the target code amount. In the event of performing transmission using a system of which the transmission code amount has the maximum value, or the like, exceeding the target code amount causes a problem.

Therefore, as one of the features, the rate control unit 16 determines whether or not the generated code amount nSize increases greatly as compared with the picture which is one picture ahead (step S53 in FIG. 11), and in the event that determination is made that the generated code amount nSize increases greatly, the rate control unit 16 determines that the correlation as to the last picture is low, and determines this state as an unsteady state (step S54 in FIG. 11).

In the event that the code amount generated at a certain coding unit is clearly greater than that of the coding unit as the same position as the picture which is one picture ahead, the rate control unit determines that the image becomes difficult (a unsteady state) due to a scene change, and obtains the quantization step size of each of the subsequent coding units using the correlation within a picture (step S62 in FIG. 11).

Thus, the rate control unit 16 can, before the next coding unit is input, obtain the quantization step size Q of the coding unit thereof. In the event that there has been a scene change, it can be conceived that the correlation within an image is higher than the correlation between consecutive images, so according to such a feature, the rate control unit 16 can perform high-precision rate control.

Note that with the processing in step S86 in FIG. 15, Status has been set to a steady state beforehand, and in the event that determination is made that the correlation as to the picture which is one picture ahead is high, Status is kept in a steady state.

In the event of a steady state, determination is made that the correlation as to the picture which is one picture ahead is high, so unless much of encoded data is pooled in the buffer of the smoothing unit 17, according to the processing in step S57 in FIG. 11, the basic quantization step size BaseQ is set as the quantization step size Q. According to such control, the rate control unit 16 can make the image quality within a picture even, to reduce the deterioration of the image quality.

Also, in the event that much of coded data is pooled in the buffer of the smoothing unit 17, according to the processing in step S59 in FIG. 11, the rate control unit 16 obtains the quantization step size Q of the next coding unit by employing the target code amount tSize of the next coding unit, and the normalization code amount nSize[p−1, c] of the coding unit at the same position as the picture which is one picture ahead. According to such control, the rate control unit 16 can, before the next coding unit is input, obtain the quantization step size Q of the coding unit thereof.

As described above, in the event of performing the setting of a quantization step size by employing the information of another coding unit within the same picture, there is a high possibility that image quality will deteriorate as compared with the case of performing the setting of a quantization step size by employing the basic quantization step size BaseQ of the entire picture which is one picture ahead, which is disadvantageous. Therefore, as another feature, the rate control unit 16 performs the setting of the quantization step size Q by employing the information of another coding unit within the same picture only when the generated code amount is clearly greater (e.g., 1.5 times or greater) than the code amount of the coding unit at the same position of the picture which is one picture ahead. According to this feature, the rate control unit 16 can suppress the excess of the target code amount to reduce the overflow of the buffer of the smoothing unit 17 while suppressing the deterioration of image quality.

Note that "disadvantageous" regarding image quality means disadvantageous as compared with the case of employing the same quantization step size at all of the coding units. An image to be input due to a scene change or the like is not known, and actually, it is impossible originally to use the same quantization step size at all of the coding units. Also, in reality, instant image quality deterioration after a scene change is not easily visible to human eyes, and is inconspicuous. Therefore, as described above, even if a method for performing the setting of a quantization step size by employing BaseQ, and a method for performing the setting of a quantization step size by employing the information of another coding unit within the same picture are employed together, there is little deterioration of image quality from the perspective of the sense of sight.

Incidentally, even though in the same scene, a part of an image is changed, which causes a code amount to occur too much in some cases. In the event of performing transmission by employing a system of which the transmission code amount has the maximum value, or the like, exceeding the target code amount causes a problem. At this time, it can be conceived to apply the above-mentioned method for performing the setting of a quantization step size by employing the information of another coding unit within the same picture, but this method is disadvantageous regarding image quality, so multiple use of this method is not desirable.

Accordingly, as another feature, in the event that much (e.g., greater than 70) of encoded data is stored in the buffer of the smoothing unit 17, the code amount is not completely change from the previous image, and Status is a steady state, so the rate control unit 16 determines that the correlation as to the coding unit at the same position of the picture which is one picture ahead is high, and obtains the quantization step size Q[p, c] employed by a coding unit c (the c'th coding unit) of a picture p (the p'th picture) such as the following Expression (9) by employing the target code amount S[p, c] of the coding unit c of the picture p, the quantization step size Q[p−1, c] when the coding unit c of the picture p−1 which is one picture ahead is encoded, and the generated code amount S[p−1, c] thereof (step S59 in FIG. 11).

$$Q[p,c]=Q[p-1,c]\times(S[p-1,c]/S[p,c]) \qquad (9)$$

This method is also the same as the above-mentioned method for performing the setting of a quantization step size by employing the information of another coding unit within the same picture in that a quantization step size is selected for each coding unit.

Note however that in the case of this method, the information of the coding unit at the same position as the picture which is one picture ahead of which the correlation can be conceived as high is referenced, whereby the rate control unit 16 can perform higher precision rate control (can suppress the overflow of the buffer in a more sure manner).

Incidentally, even if the above-mentioned method is employed, the code amount generated at one coding unit cannot be controlled completely, it can be also conceived that the code amount of encoded data stored in the buffer of the smoothing unit 17 continues to increase.

Therefore, in the event that further much (e.g., more than 75) of encoded data is stored in the buffer of the smoothing unit 17, the rate control unit 16 sets the quantization step size Q rougher than the quantization step size Q[p, c] obtained with the above-mentioned method.

For example, in the event that a buffer activity ratio is 75%, the rate control unit 16 sets the quantization step size Q such that the target code amount becomes the code amount equivalent to 1.0 line block (precinct), and in the event that the buffer activity ratio is 80%, sets the quantization step size Q such that the target code amount becomes the code amount equivalent to 0.8 line block (precinct), and in the event that the buffer activity ratio is 85%, sets the quantization step size Q such that the target code amount becomes the code amount equivalent to 0.6 line block (precinct), and in the event that the buffer activity ratio is 90%, sets the quantization step size Q such that the target code amount becomes the code amount equivalent to 0.4 line block (precinct), and in the event that the buffer activity ratio is 95%, sets the quantization step size Q such that the target code amount becomes the code amount equivalent to 0.2 line block (precinct).

That is to say, as one of the features, the rate control unit 16 corrects the value of the quantization step size Q in accordance with the active ratio of the buffer of the smoothing unit 17 (step S60 and step S63).

Thus, in the event that much of encoded data is pooled in the buffer of the smoothing unit 17, the rate control unit 16 can reduce the generated code amount to suppress the occurrence of the buffer overflow.

Incidentally, for example, such as a case in which a movie is displayed on the monitor of a television receiver, in the case of an image such a so-called letter box image wherein a part of the vertical or horizontal direction of the screen becomes a black image all the time, there are a portion where code occurs as usual, and a portion where code hardly occurs.

Upon rate control being performed as to such an image by employing the above-mentioned method, the generated code amount is controlled so as to become the target code amount through one picture, so much code occurs concentrated in a part of coding units. Therefore, even if the generated code amount of the entire one picture can be controlled below the target code amount, according to the bias of occurrence of code, there is a high possibility that the overflow may occur at the buffer of the smoothing unit 17 in the middle of the picture.

On the other hand, as described above, a method for controlling the quantization step size Q for each coding unit can also be conceived, but as described above, there is a possibility that this method is disadvantageous to image quality. Also, it can also be conceived to increase the memory capacity of the buffer of the smoothing unit 17, but in this case, there is a possibility that not only circuit scale and costs increase, but also the delay time of the encoding processing increases.

Therefore, the rate control unit 16 employs a variable called Uniformity indicating the evenness of code occurrence within a picture. The smaller the bias of the code amount generated at each coding unit is, the greater value Uniformity takes. The maximum value of Uniformity is "1", and the minimum value is "0".

As one of the features, the rate control unit 16 initializes Uniformity to a default value "1" before the start of encoding (step S31 in FIG. 10), and updates Uniformity such as the following at the time of encoding of one picture being completed. In the event that Status is an unsteady state, the rate control unit 16 sets the value of Uniformity to "1" (step S84 in FIG. 15). Also, in the event that Status is a steady state, the rate control unit 16 checks the maximum value MaxLeft of the code amount (buffer active ratio) stored in the buffer of the smoothing unit 17 during encoding of the picture thereof, and corrects Uniformity in accordance with the value thereof (step S83 in FIG. 15).

For example, if MaxLeft (the maximum value of buffer active ratios) is 50%, the rate control unit 16 increase the value of Uniformity by 10%, and if MaxLeft is 65%, increases the value of Uniformity by 5%, and if MaxLeft is 70%, does not change the value of Uniformity, and if MaxLeft is 75%, decreases the value of Uniformity by 5%, and if MaxLeft is 80%, decreases the value of Uniformity by 10%. Of course, this is an example, as long as correction is made so as to reduce Uniformity when the value of MaxLeft is great if there is a possibility that overflow may occur at the buffer of the smoothing unit 17, an arrangement may be made wherein the value of Uniformity is be corrected in a certain manner when MaxLeft takes a certain kind of value.

Note that Uniformity thus calculated is employed for correction of the quantization step size Q (steps S58 and S61 in FIG. 11).

With this method, in the case of an image which is likely to overflow the buffer due to unevenness of code occurrence, the rate control unit 16 decreases the target code amount (quantization step size Q) beforehand. According to this feature, upon the buffer being likely to overflow, the rate control unit 16 can reduce the occurrence of the case of employing a method for calculating the quantization step size Q by using the information of another coding unit within the same picture, as described above. Simultaneously therewith, further, all of the coding units of one picture can be encoded with the same quantization step size Q, so the rate control unit 16 can improve the image quality of an image to be encoded.

According to this method, the generated code amount throughout one picture is smaller than the target code amount, but when comparing the quantization step size Q of the roughest coding unit within one picture, this method is stable as image quality since this method is finer than the above-mentioned other methods.

In the case of a so-called letter box image, image quality extremely deteriorates unless this method is employed. In reality, the deterioration of image quality is conspicuous with an image having a few actions, so in the case of encoding an image having a portion of a black image having almost no action such as a letter box image, suppressing the deterioration of image quality by this method results in a greater advantage.

To suppress an un-transmitted code amount to small levels as described above, i.e., memory for disposing unprocessed code can be saved. That is to say, memory at the side for receiving the transmitted code can be saved. Thus, an advantage can also be obtained, such that delay until an image is finally displayed following encoding, transmission, and decoding being performed sequentially can be shortened, or the like.

In other words, the rate control unit 16 advances the code amount control and the encoding processing for each coding unit without employing the information of the entire moving image or entire picture to obtain those advantages, whereby a memory use amount and delay time can be reduced, and further the processing can be facilitated, and the costs can be reduced.

Incidentally, unlike encoding employing a bit plane such as JPEG2000 or the like, in the case of JPEG or the like, in order to adapt the generated code amount to the target code amount, there is a need to repeat encoding many times while changing the quantization step size, and accordingly there is a possibility that the processing may become complex, delay time may increase, or circuit scale and costs may increase.

Therefore, as one of the features, the rate control unit 16 obtains a code amount S0 when performing encoding with a certain quantization step size Q0, and obtains the quantization step size Q which becomes a target code amount S by employing those values with the next proportional calculation such as the following Expression (10) (step S85 in FIG. 15).

$$Q = Q0 \times (S_0/S) \qquad (10)$$

According to such a feature, in the case of encoding a still image, the rate control unit 16 performs encoding once, thereby obtaining the appropriate quantization step size Q, and simply performs the quantization processing and thereafter again, thereby completing encoding with the target code amount. That is to say, the rate control unit 16 can readily obtain the appropriate quantization step size for suitable encoding.

Incidentally, for example, in the case of encoding a moving image, the rate control unit 16 has no knowledge regarding how difficult a picture to be input next is. A code amount can be controlled by performing encoding employing a bit plane such as JPEG2000 or the like, and transmitting data in order from MSB to LSB, but in the case of this method, encoding cannot be performed with little delay.

Therefore, as one of the features, the rate control unit 16 obtains the quantization step size Q to be employed for the next picture from the encoding result of the picture which is one picture ahead thereof (step S57 in FIG. 11). Note that how to obtain the quantization step size Q is the same as the method employing the above-mentioned Expression (10).

With a normal moving image, the correlation between adjacent pictures is high, and pictures having the same difficulty continue in many cases, encoding does not fail even in the event of obtaining the quantization step size with such a method. That is to say, the rate control unit 16 can readily perform appropriate rate control.

For example, with a picture where a scene change occurs, there is a possibility that difficulty may change greatly before and after the scene change (the correlation between pictures may become low), but even in such a case, if attention is given to what follows the scene change, pictures having the same difficulty continue, and accordingly, shifting between the generated code amount and the target code amount is restricted to only the picture immediately after the scene change. Accordingly, the great deterioration of image quality does not occur visually (is inconspicuous).

Also, for example, moving images of which the difficulty continues to change greatly and consecutively (i.e., of which pictures having low correlation continue) is hard on human eyes, so there are few occasions to handle such images, and also it is difficult to distinguish the deterioration of image quality visually (inconspicuous).

As described above, in the case of this method, the processing is simple, so which can be applied to encoding employing a bit plane such as JPEG2000, or encoding without employing a bit plane such as JPEG. With the rate control which activating encoding employing a bit plane such as JPEG2000, a code amount is adjusted with truncation for each code block, so the image quality within the screen is not even. There is a problem in which uneven noise is conspicuous within the screen when viewing with a moving image, but with this method, the image quality within the screen is even, so noise is inconspicuous.

Incidentally, as described above, in the case of the method for controlling the quantization step size Q in increments of coding unit, there is a possibility that the quantization step size may change for each coding unit, and accordingly, there is a possibility that an error may occur when controlling the basic quantization step size BaseQ in increments of picture.

Therefore, as one of the features, the rate control unit 16 arbitrarily selects a reference quantization step size Qn (step S31 in FIG. 10). Let us say that the c'th coding unit (coding unit c) of the p'th picture (picture p) is encoded with quantization step size Q[p, c], and the generated code amount at that time is S[p, c].

The code amount in the case of encoding with Qn is S[p, c]×(Q[p, c]/Qn). If we consider all of the coding units in the same way, the quantization step size Q which becomes the target code amount S can be obtained with proportional calculation such as shown in the following Expression (11).

$$Q=Qn\times((\Sigma S[p,c]\times(Q[p,c]/Qn))/S) \quad (11)$$

Here, Qn may be any number as long as Qn is not changed during encoding, so Qn=1 may be employed. In accordance with the convenience of the system, Qn may be employed so as to make the digits of a calculation result convenient.

According to such a feature, even in the event that the quantization step size Q is controlled in increments of coding unit without taking the statistics of the entire moving image, the rate control unit 16 can readily perform the appropriate control of the quantization step size at high speed.

Note that the rate control unit 16 can also realize the above-mentioned various types of features independently. In this case, only the advantage corresponding to each of the features can be obtained. Also, it is also possible to realize the multiple features simultaneously by combining the multiple features. That is to say, of the above-mentioned features, the rate control unit 16 can omit a part of the features as appropriate. Also, the rate control unit 16 may further include other features other than the above-mentioned features.

Note that description has been made so far assuming a configuration wherein the rate control unit 16 is included in the encoding apparatus 1, but the rate control unit 16 may have any configuration as long as the rate control unit 16 includes a part or all of the above-mentioned features. In other words, the rate control unit 16 can control the generated code amount of the encoding processing performed by another device.

Next, description will be made regarding a decoding apparatus corresponding to such an encoding apparatus 1. This decoding processing corresponds to the encoding processing shown in the flowchart in FIG. 9.

Figure 17:
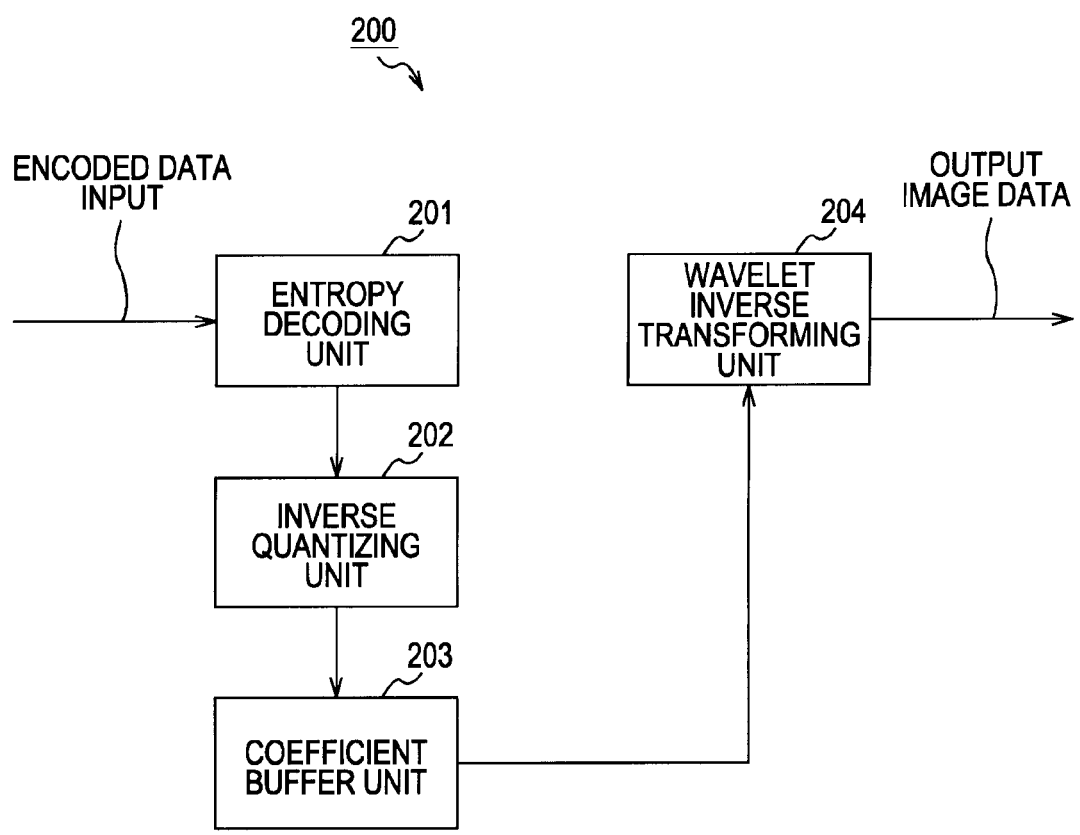
FIG. 17 is a block diagram illustrating a configuration example of a decoding apparatus corresponding to the encoding apparatus in FIG. 1.

FIG. 17 is a block diagram illustrating a configuration example of the decoding apparatus. A decoding apparatus 200 is a decoding apparatus corresponding the encoding apparatus 1, and as shown in FIG. 17, includes an entropy decoding unit 201, an inverse quantizing unit 202, a coefficient buffer unit 203, and a wavelet inverse transforming unit 204.

The packet of the encoded data output from the encoding apparatus 1 is supplied to the entropy decoding unit 201 of the decoding apparatus 200. Upon acquiring encoded data, the entropy decoding unit 201 subjects the encoded data thereof to entropy decoding for each line, and supplies the obtained coefficient data to the inverse quantizing unit 202. The inverse quantizing unit 202 performs inverse quantization as to the supplied coefficient data, supplies the obtained coefficient data to the coefficient buffer unit 203 to have this data stored. The wavelet inverse transforming unit 204 subjects the coefficient data stored in the coefficient buffer unit 203 to synthesizing filter processing by employing a synthesizing filter, and stores the result of the synthesizing filter processing in the coefficient buffer unit 203 again. The wavelet inverse transforming unit 204 repeats this processing in accordance with a division level, and obtains the decoded image data (output image data). The wavelet inverse transforming unit 204 outputs this output image data to the outside of the decoding apparatus 200.

In the case of a common wavelet inverse transforming method, the wavelet inverse transforming unit 204 first subject to all of the coefficients of a division level to be processed to horizontal synthesis filtering in the horizontal direction of the screen, and next subject to all of the coefficients of a division level to be processed to vertical synthesis filtering in the vertical direction of the screen. That is to say, each time of each of the synthesis filtering, there is a need to hold the results of the synthesis filtering thereof in the buffer, and at this time, the buffer needs to hold the synthesis filtering results of the division level at that time, and all of the coefficients of the next division level, and consequently, great memory capacity is needed (much amount of data to be held).

Also, in this case, image data output is not performed until all of the wavelet inverse transformations are completed within a picture (field in the case of the interlace method), so delay time from input to output increases.

On the other hand, in the case of the wavelet inverse transforming unit 204, the vertical synthesis filtering and the horizontal synthesis filtering are consecutively performed in increments of line block until division level 1, so as compared with an existing method, there is a little amount of data necessary for buffering at once (simultaneously), the necessary memory amount of buffer can be extremely reduced. Also, the synthesis filtering (wavelet inverse transforming processing) is performed until division level 1, whereby image data can be sequentially output before obtaining all of the image data within a picture (in increments of line block), and accordingly, delay time can be extremely reduced as compared with an existing method.

Figure 18:
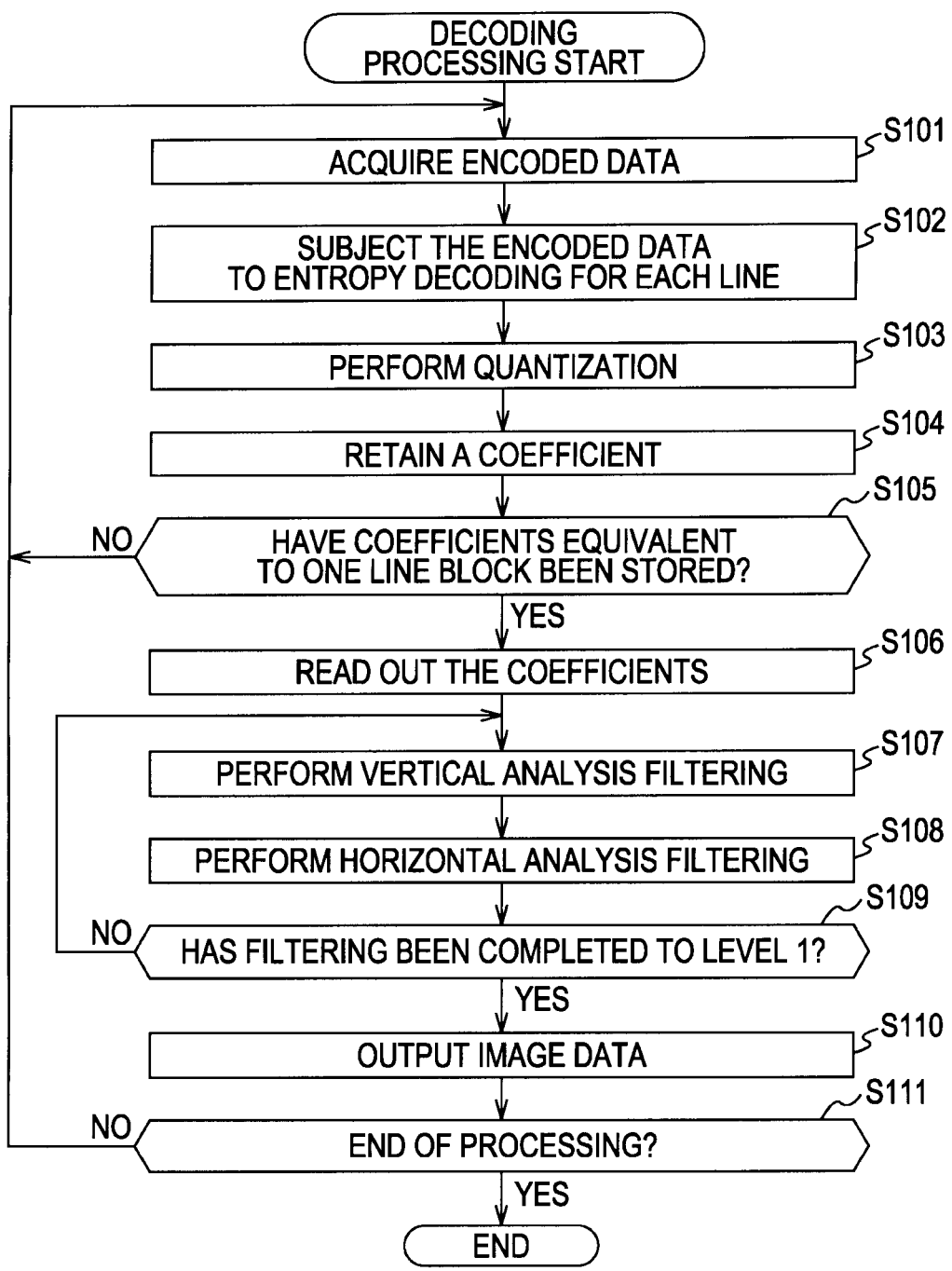
FIG. 18 is a flowchart for describing a flow example of decoding processing.

Next, description will be made regarding a flow example of the decoding processing performed by the decoding apparatus 200 with reference to the flowchart in FIG. 18.

Upon the decoding processing being started, in step S101 the entropy decoding unit 201 acquires encoded data, and in step S102 subjects the encoded data to entropy decoding for each line. In step S103, the inverse quantizing unit 202 subjects the entropy-encoded coefficient data to inverse quantization. In step S104, the coefficient buffer unit 203 holds the inverse-quantized coefficient data. In step S105, the wavelet inverse transforming unit 204 determines whether or not coefficients equivalent to one line block has been stored in the coefficient buffer unit 203.

In the event that determination is made that coefficients equivalent to one line block has not been stored in the coefficient buffer unit 203, the processing returns to step S101, and executes the subsequent steps. That is to say, the wavelet inverse transforming unit 204 stands by until coefficients equivalent to one line block is stored in the coefficient buffer unit 203. Subsequently, in step S105, in the event that determination is made that coefficients equivalent to one line block has been stored in the coefficient buffer unit 203, the processing proceeds to step S106. In step S106, the wavelet inverse transforming unit 204 reads out the coefficients equivalent to one line block held in the coefficient buffer unit 203.

Subsequently, in step S107, the wavelet inverse transforming unit 204 subjects the readout coefficients to the vertical synthesis filtering for subjecting coefficients arrayed in the vertical direction of the screen to synthesis filtering, and in step S108 subjects the readout coefficients to the horizontal synthesis filtering for subjecting coefficients arrayed in the horizontal direction of the screen to synthesis filtering, and in step S109 determines whether or not the synthesis filtering has been completed until division level 1, i.e., whether or not the inverse transformation has been performed until a state before the wavelet transformation.

In the event that determination is made that the synthesis filtering has not reached division level 1, the processing returns to step S107, and the filtering in steps S107 and S108 is repeated. Also, in step S109, in the event that determination is made that the synthesis filtering has reached division level 1, and the inverse transforming processing has been completed, the processing proceeds to step S110. In step S110, the wavelet inverse transforming unit 204 outputs the image data obtained by the inverse transforming processing to the outside of the decoding apparatus 200.

In step S111, determination is made whether to end the decoding processing, and in the event that input of encoded data continues, and determination is made that the decoding processing is not ended, the processing returns to step S101, and the subsequent processing is repeated. Also, in step S111, in the event that determination is made that the decoding processing is ended such that input of encoded data is ended, or the like, the decoding processing ends.

As described above, the wavelet inverse transforming unit 204 performs the vertical synthesis filtering and the horizontal synthesis filtering consecutively in increments of line block until division level 1, so as compared with a method for subjecting all of the coefficients to wavelet inverse transformation, there is a little amount of data necessary for buffering at once (simultaneously), and the necessary memory amount of buffer can be extremely reduced. Also, the synthesis filtering (wavelet inverse transforming processing) is performed up to division level 1, whereby image data can be output in order before the entire image data within a picture is obtained (in increments of line block), and accordingly, delay time can be extremely reduced as compared with a method for subjecting the entire screen to wavelet inverse transformation.

Figure 19:
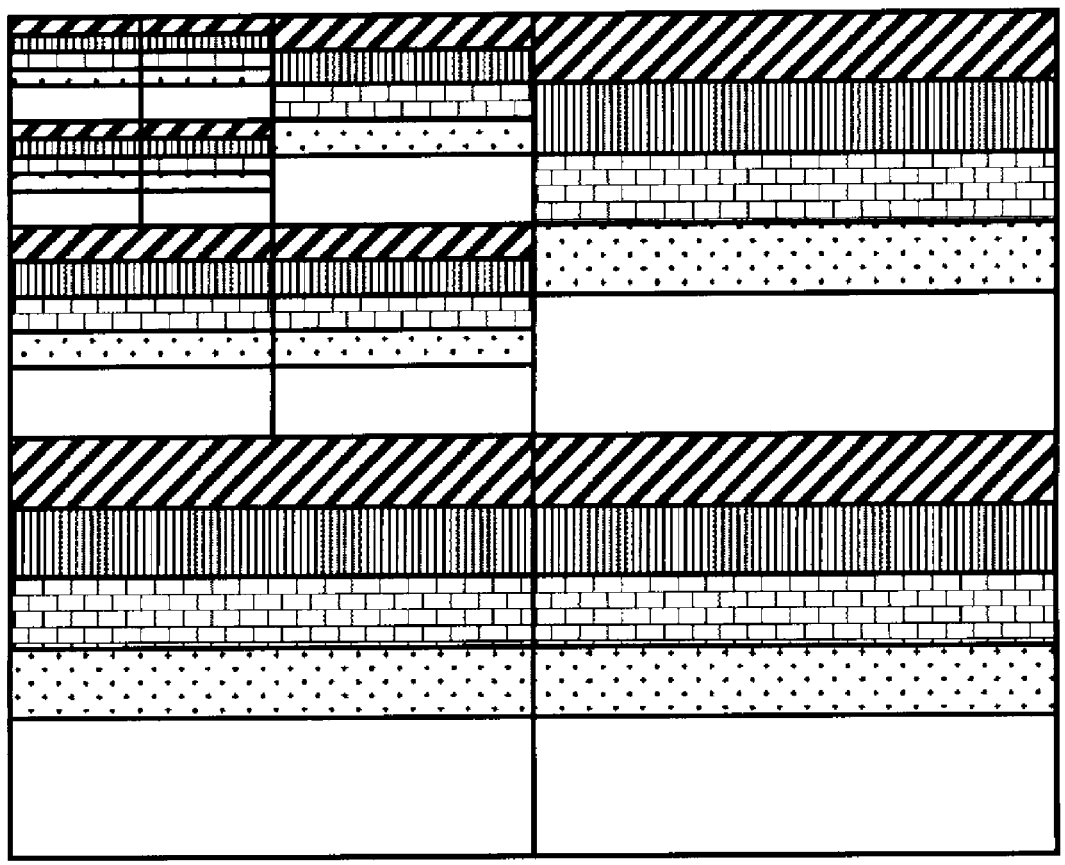
FIG. 19 is a schematic diagram illustrating an example of a coding unit.

Note that description has been made so far such that a coding unit is a line block, but a coding unit may be what kind of unit. Now, description will be made regarding an example of a coding unit. FIG. 19 is a schematic diagram illustrating an example of a coding unit, which illustrates a situation in which coefficients subjected to two-dimensional wavelet transformation are divided for each coding unit. In FIG. 19, a collection of portions which are painted with the same pattern make up one coding unit.

In FIG. 19, coefficients of which the corresponding pixels are spatially disposed at the same position are collected, thereby making up one coding unit. One coding unit is made up of one line at a time from four sub-bands at the low-frequency side each of which the size is ⅛ wide of the screen, two lines at a time from three sub-bands at the middle-frequency each of which the size is ¼ wide, and four lines at a time from three sub-bands at the high-frequency each of which the size is ½ wide. That is to say, in the case of the example in FIG. 19, a coding unit is formed of a line block. In FIG. 19, a coding unit 1 has the information of the uppermost portion of the screen (corresponds to the top line block of the screen). A coding unit 2 has the information of portions adjacent to under of the coding unit 1 (corresponds to the second line block from the top of the screen). The more the coding unit number of the subsequent coding units increases, the more it has the information at a lower position on the screen (corresponds to a line block at a lower position).

Figure 20:
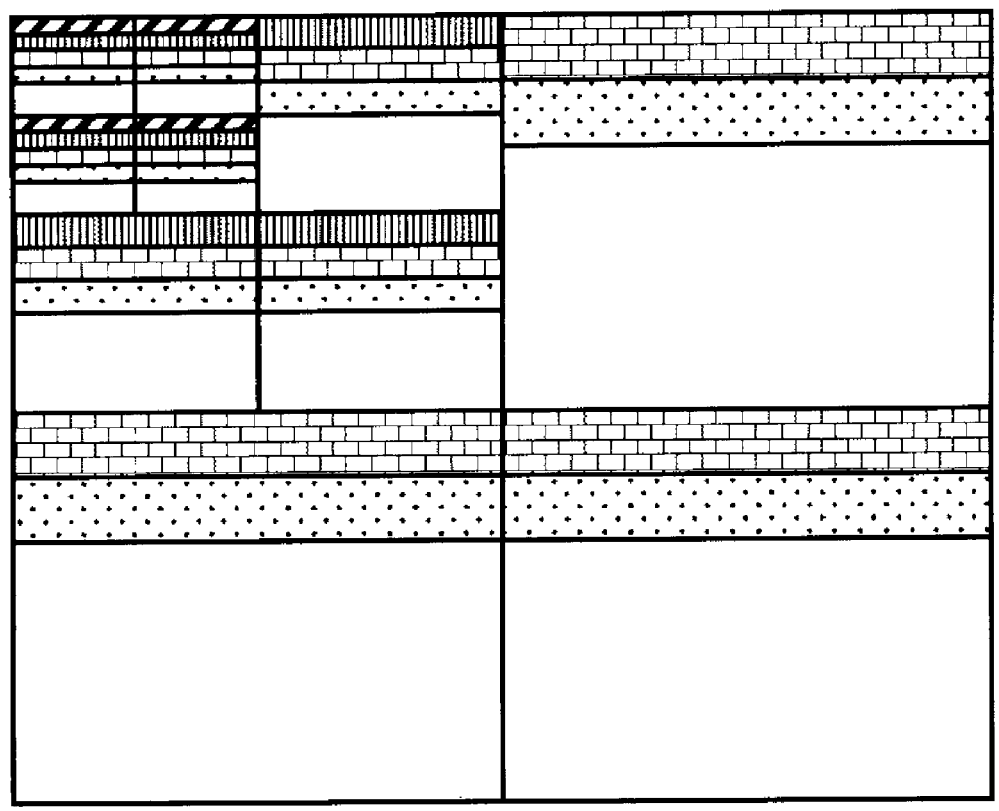
FIG. 20 is a schematic diagram illustrating another example of a coding unit.

With the wavelet inverse transforming processing, the wavelet coefficients at the low-frequency side are needed first. Accordingly, FIG. 20 illustrates an example in which a coding unit is configured so as to send the wavelet coefficients at the low-frequency side first. With the example in FIG. 20, a coding unit 1 is made up of one line at a time from four sub-bands at the low-frequency side each of which the size is ⅛ wide of the screen. These lines have the information at the low-frequency side of the uppermost portion of the screen. A coding unit 2 is made up of one line at a time from four sub-bands at the low-frequency side each of which the size is ⅛ wide of the screen, and two lines at a time from three sub-bands at the middle-frequency each of which the size is ¼ wide. With regard to data at the middle-frequency, the coding unit 1 has no data, so the coding unit 2 has the information of the uppermost portion, but in other words, the coding unit 2 has the information of the portions adjacent to under the coding unit 1.

A coding unit 3 is made up of one line at a time from four sub-bands at the low-frequency side each of which the size is ⅛ wide of the screen, two lines at a time from three sub-bands at the middle-frequency each of which the size is ¼ wide, and four lines at a time from three sub-bands at the high-frequency each of which the size is ½ wide. Data at the high-frequency is not included in the coding unit 1 nor in the coding unit 2, so the coding unit 3 has the information of the uppermost portion regarding data at the high-frequency, but in other words, the coding unit 3 has the information of the portions adjacent to under the coding unit 2. The more the coding unit number of the subsequent coding units increases, the more it has the information at a lower position on the screen.

That is to say, in the case of the example in FIG. 20, a coding unit is not identical to a line block.

The method for creating a coding unit in FIG. 19 is a method for collecting coefficients disposed spatially at the same position, but the method for creating a coding unit in FIG. 20 is a method for collecting coefficients disposed spatially at a lower position as it approaches the low-frequency side.

With regard to coding units, there are various cases other than the above-mentioned coding units. In an extreme case, only one coding unit is included in one picture, and the increment of region conversion is sometimes identical to the coding unit. In the event that the increment of region conversion is identical to the coding unit, an input image divider not shown in FIG. 1 is disposed before a region converter, thereby reducing the increment of region conversion as is often the case.

Figure 21:
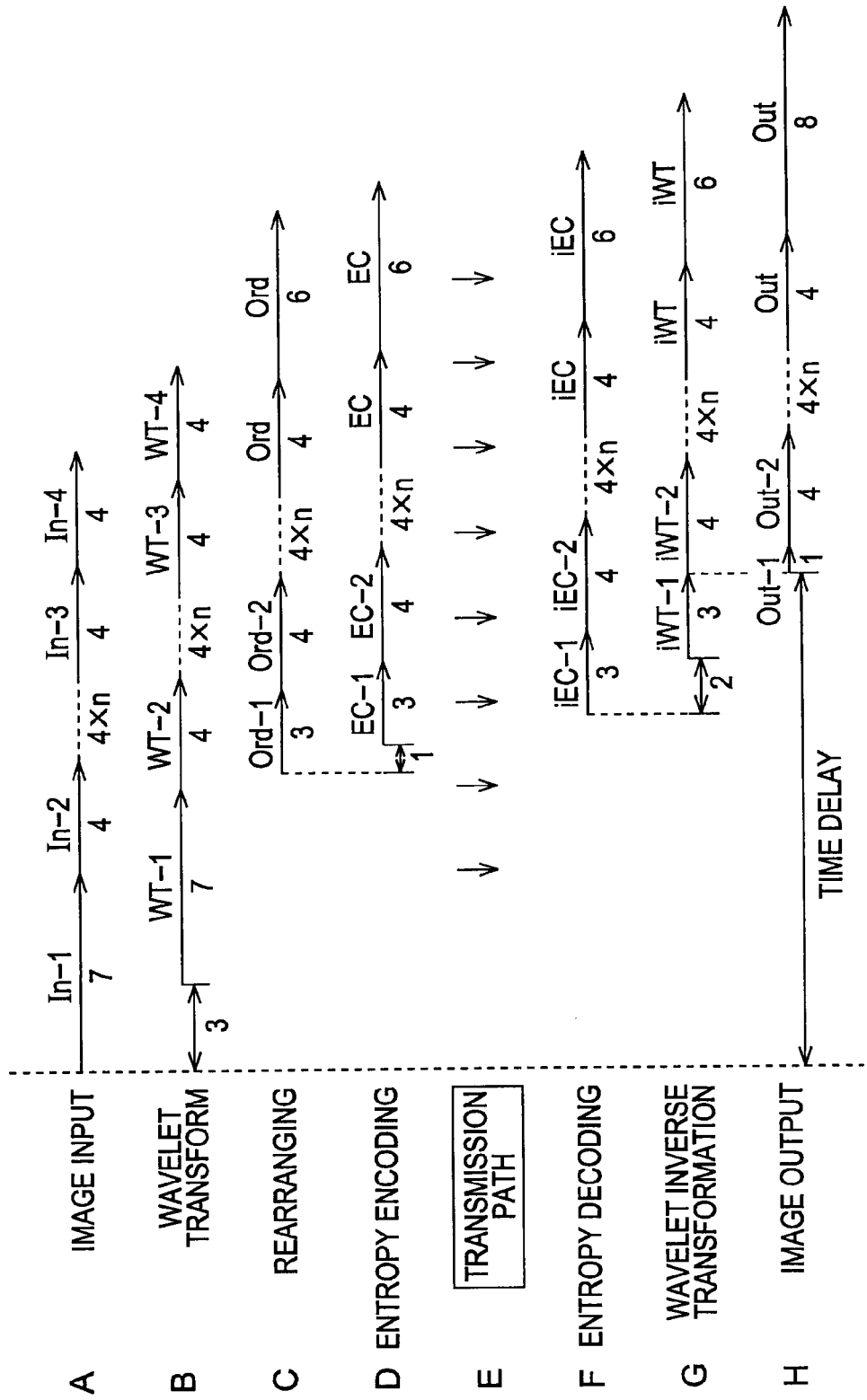
FIG. 21 is a schematic diagram illustrating an example of the situation of parallel operation performed by each component of the encoding apparatus and decoding apparatus.

Note that the above-mentioned respective processing may be executed in parallel as appropriate, as shown in FIG. 21, for example.

FIG. 21 is a diagram schematically illustrating an example of the parallel operation of each element of the processing executed by the encoding apparatus 1 in FIG. 1, and by the decoding unit 200 in FIG. 17. This FIG. 21 corresponds to the above-mentioned FIG. 5. Image data input In-1 (A in FIG. 21) is subjected to 1st wavelet transformation WT-1 (B in FIG. 21) at the wavelet transforming unit 10 (FIG. 1). As described with reference to FIG. 4, the 1st wavelet transformation WT-1 is started at the time of first three lines being input, and a coefficient C1 is generated. In other words, delay equivalent to three lines occurs from input of the image data In-1 until the wavelet transformation WT-1 being started.

The generated coefficient data is stored in the coefficient rearranging buffer unit 12 (FIG. 1). Hereafter, input image data is subjected to wavelet transformation, and upon the 1st processing being completed, the processing proceeds to the 2nd wavelet transformation WT-2 without change.

In parallel with the input of image data In-2 for the 2nd wavelet transformation WT-2, and the processing of the 2nd wavelet transformation WT-2, the coefficient rearranging unit 13 (FIG. 1) executes rearranging Ord-1 of three of coefficient C1, coefficient C4, and coefficient C5 is executed (C in FIG. 21).

Note that the delay from completion of the wavelet transformation WT-1 until the rearranging Ord-1 being started is delay based on an apparatus or system configuration, for example, such as delay associated with transmission of a control signal for instructing the coefficient rearranging unit 13 to perform rearranging processing, delay necessary for start of processing by the coefficient rearranging unit 13 as to a control signal, and delay required for program processing, which is not essential delay involved in encoding processing.

Coefficient data is read out from the coefficient rearranging buffer unit 12 in order of completion of rearranging, supplied to the entropy encoding unit 15 (FIG. 1), and subjected to entropy encoding EC-1 (D in FIG. 21). The entropy encoding EC-1 can be started without waiting for completion of all of the rearranging of the three of the coefficients C1, C4, and C5. For example, the entropy encoding as to the coefficient C5 can be started at the time of completion of the rearranging of one line according to the coefficient C5 to be output first. In this case, delay from the processing start of the rearranging Ord-1 to the processing start of the entropy encoding EC-1 is equivalent to one line.

The encoded data subjected to the entropy encoding EC-1 by the entropy encoding unit 15 is subjected to predetermined signal processing, and then transmitted to the decoding apparatus 200 via the transmission path (E in FIG. 21). AT this time, the encoded data is packetized and transmitted.

In succession to input of image data equivalent to seven lines according to the 1st processing, image data up to the lower end line on the screen is sequentially input to the encoding apparatus 1. In response to the input In-n (n is not less than 2) of image data, the encoding apparatus 1 performs wavelet transformation WT-n, rearranging Ord-n, and entropy encoding EC-n every four lines, as described above. The rearranging Ord and entropy encoding EC as to the processing of the last time at the encoding apparatus 1 are performed upon six lines. These processing are, as illustrated in A through D in FIG. 21, performed in parallel at the encoding apparatus 1.

The packet of the encoded data encoded by the entropy encoding EC-1 at the encoding apparatus 1 is transmitted to the decoding apparatus 200. The entropy decoding unit 201 subjects the supplied encoded data encoded by the entropy encoding EC-1 to decoding iEC-1 of entropy code in order to restore coefficient data (F in FIG. 21). The restored coefficient data is subjected to inverse quantization at the inverse quantizing unit 202, and then stored in the coefficient buffer unit 203 in order. Upon coefficient data being stored in the coefficient buffer unit 203 as much as wavelet inverse transformation can be performed, the wavelet inverse transforming unit 204 reads out coefficient data from the coefficient buffer unit 203, and subjects the readout coefficient data to wavelet inverse transformation iWT-1 (G in FIG. 21).

As described with reference to FIG. 4, the wavelet inverse transformation iWT-1 by the wavelet inverse transforming unit 204 can be started at the time of the coefficients C4 and C5 being stored in the coefficient buffer unit 203. Accordingly, delay from the decoding iEC-1 by the entropy decoding unit 201 being started to the wavelet inverse transformation iWT-1 by the wavelet inverse transforming unit 204 being started is equivalent to two lines.

With the wavelet inverse transforming unit 204, upon the wavelet inverse transformation iWT-1 equivalent to three lines by the 1st wavelet transformation being completed, the output Out-1 of the image data generated at the wavelet inverse transformation iWT-1 is performed (H in FIG. 21). With the output Out-1, as described with reference to FIG. 4 and FIG. 5, the image data of the 1st line is output.

In succession to input of the encoded coefficient data equivalent to three lines according to the 1st processing by the encoding apparatus 1, the coefficient data encoded by the entropy encoding EC-n (n is not less than 2) is sequentially input to the decoding apparatus 200. The decoding apparatus 200 subjects the input coefficient data to the entropy decoding iEC-n and wavelet inverse transformation iWT-n every four lines as described above, and performs the output Out-n of the image data restored by the wavelet inverse transformation iWT-n sequentially. The entropy decoding iEC and wavelet inverse transformation iWT as to the processing of the last time at the encoding apparatus 1 are performed upon six lines, and the output Out is performed upon eight lines. These processing are, as illustrated in F through H in FIG. 21, performed in parallel at the decoding apparatus 200.

Thus described above, the respective processing at the encoding apparatus 1 and decoding apparatus 200 are performed in parallel in order from the upper portion of the screen to the lower portion, whereby image compression processing and image decoding processing can be performed with little delay.

Let us calculate delay time from image input to image output in the case of performing wavelet transformation up to division level 2 by employing the 5×3 filter with reference to FIG. 21. Delay time from the image data of the 1st line being input to the encoding apparatus 1 to the image data of the 1st line being output from the decoding apparatus 200 is equivalent to the sum of the following respective elements. Note here that delay which differs depending on the configuration of the system, such as delay at the transmission path, delay associated with actual processing timing of each unit within the apparatus, and the like is eliminated.

(1) Delay D_WT from the first line input to completion of the wavelet transformation WT-1 equivalent to seven lines (2) Time D_ord associated with the rearranging Ord-1 equivalent to three lines (3) Time D_EC associated with the entropy encoding EC-1 equivalent to three lines (4) Time D_iEC associated with the entropy decoding iEC-1 equivalent to three lines (5) Time D_iWT associated with the wavelet inverse transformation iWT-1 equivalent to three lines.

Let us attempt calculation of delay due to the above-mentioned respective factors with reference to FIG. 21. The delay D_WT in (1) is time equivalent to ten lines. The time D_Ord in (2), time D_EC in (3), time D_iEC in (4), and time D_iWT in (5) are each time equivalent to three lines. Also, with the encoding apparatus 1, the entropy encoding EC-1 can be started one line after the rearranging Ord-1 is started. Similarly, with the decoding apparatus 200, the wavelet inverse transformation iWT-1 can be started two lines after the entropy decoding iEC-1 is started. Also, with the entropy decoding iEC-1, the processing can be started at the time of completion of encoding equivalent to one line at the entropy encoding EC-1.

Accordingly, with the example in FIG. 21, delay time from input of image data of the 1st line to the encoding apparatus 1 to output of the image data of the 1st line from the decoding apparatus 200 is equivalent to 10+1+1+2+3 i.e., 17 lines.

Let us consider delay time with reference to a more specific example. In the event that input image data is an interlace video signal of HDTV (High Definition Television), for example, one frame is configured of resolution of 1920 pixels×1080 lines, and one field is 1920 pixels×540 lines. Accordingly, if we say that a frame frequency is 30 Hz, 540 lines serving as one field are input to the encoding apparatus 1 during time of 16.67 msec (=1 sec/60 fields).

Accordingly, delay time associated with input of image data equivalent to seven lines is 0.216 msec (=16.67 msec× 7/540 lines), which is very short time as to updating time of one field, for example. Also, with regard to the sum of the above-mentioned delay D_WT in (1), time D_Ord in (2), time D_EC in (3), time D_IEC in (4), and time D_IWT in (5) as well, the number of lines to be processed is small, so delay time is extremely reduced. If the factor for performing each processing is realized by hardware, processing time can be further reduced.

In FIG. 1, description has been made wherein the rearranging of coefficients is performed immediately after wavelet transformation (before quantization), but the timing of rearranging may be other than immediately after wavelet transformation as long as encoded data is supplied to the wavelet inverse transforming unit 204 of the decoding apparatus 200 in order from low-frequency to high-frequency (i.e., as long as encoded data is supplied in order from the encoded data obtained by encoding the coefficient data belonging to a low-frequency sub-band to the encoded data obtained by encoding the coefficient data belonging to a high-frequency sub-band).

Figure 22:
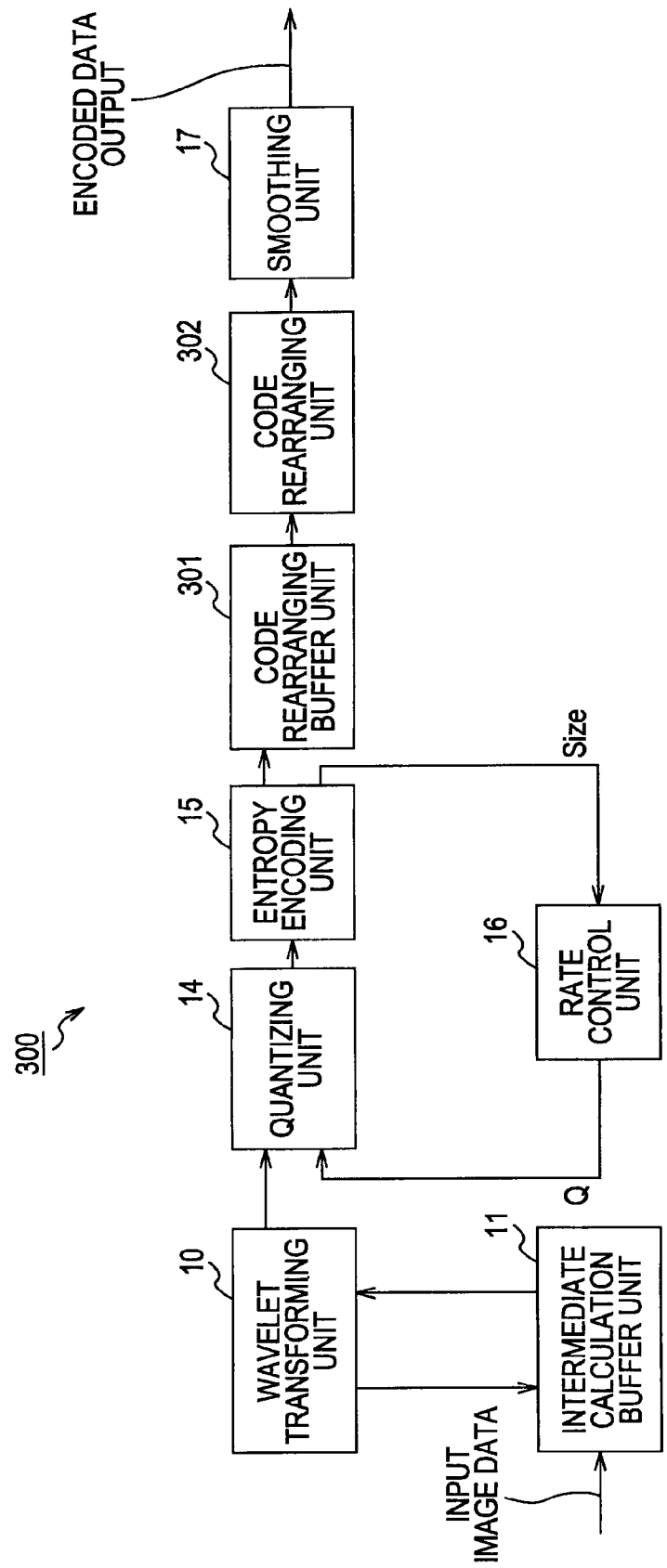
FIG. 22 is a block diagram illustrating another configuration example of the encoding apparatus to which an embodiment of the present invention is applied.

For example, the order of the encoded data obtained by entropy encoding may be rearranged. FIG. 22 is a block diagram illustrating a configuration example of an encoding apparatus in that case.

In the case of FIG. 22, an encoding apparatus 300 includes, as with the case of the encoding apparatus 1 in FIG. 1, the wavelet transforming unit 10, intermediate calculation buffer unit 11, quantizing unit 14, entropy encoding unit 15, rate control unit 16, and smoothing unit 17, but instead of the coefficient rearranging buffer unit 12 and coefficient rearranging unit 13 in FIG. 1, includes a code rearranging buffer unit 301 and a code rearranging unit 302.

The code rearranging buffer unit 301 is a buffer for rearranging the output order of the encoded data encoded at the entropy encoding unit 15, and the code rearranging unit 302 reads out the encoded data stored in the code rearranging buffer unit 301 in a predetermined order, thereby rearranging the output order of the encoded data.

That is to say, in the case of FIG. 22, the wavelet coefficient output from the wavelet transforming unit 10 is supplied to the quantizing unit 14 and quantized there. The output of the quantizing unit 14 is supplied to the entropy encoding unit 15 and encoded there. Each encoded data obtained by the encoding thereof is sequentially supplied to the code rearranging buffer unit 301 and temporarily stored there for rearranging.

The code rearranging unit 302 reads out the encoded data written in the code rearranging buffer unit 301 in a desired order, and supplies this to the smoothing unit 17.

In the case of the example in FIG. 22, the entropy encoding unit 15 subjects each coefficient data to encoding in the output order by the wavelet transforming unit 10, and writes the obtained encoded data in the code rearranging buffer unit 301. That is to say, the encoded data is stored in the code rearranging buffer unit 301 in the order corresponding to the output order of the wavelet coefficient by the wavelet transforming unit 10. In a normal case, upon two pieces of coefficient data belonging to one line block being compared, the higher frequency the sub-band coefficient data belongs to, the quicker the coefficient data is output, and the lower frequency the sub-band coefficient data belongs to, the slower the coefficient data is output, by the wavelet transforming unit 10. That is to say, with the code rearranging buffer unit 301, each encoded data is stored in order from the encoded data obtained by subjecting coefficient data belonging to a high-frequency sub-band to entropy encoding toward the encoded data obtained by subjecting coefficient data belonging to a low-frequency sub-band to entropy encoding.

On the other hand, independently from the above-mentioned order, the code rearranging unit 302 reads out each encoded data stored in the code rearranging buffer unit 301 in an arbitrary order, thereby performing rearranging of the encoded data.

For example, the code rearranging unit 302 preferentially reads out the encoded data obtained by subjecting coefficient data belonging to a lower frequency sub-band to encoding, and finally, reads out the encoded data obtained by subjecting coefficient data belonging to the highest frequency sub-band to encoding. Thus, the encoded data is read out from low-frequency toward high-frequency, whereby the code rearranging unit 302 allows the decoding apparatus 200 to decode each encoded data in an obtained order, and delay time generated by the decoding processing by the decoding apparatus 200 can be reduced.

The code rearranging unit 302 reads out the encoded data stored in the code rearranging buffer unit 301, and supplies this to the smoothing unit 17.

Note that the data encoded and output by the encoding apparatus 300 shown in FIG. 22 can be decoded by the decoding apparatus 200 described with reference to FIG. 17, as with the case of the encoded data output from the encoding apparatus 1 in FIG. 1.

Figure 23:
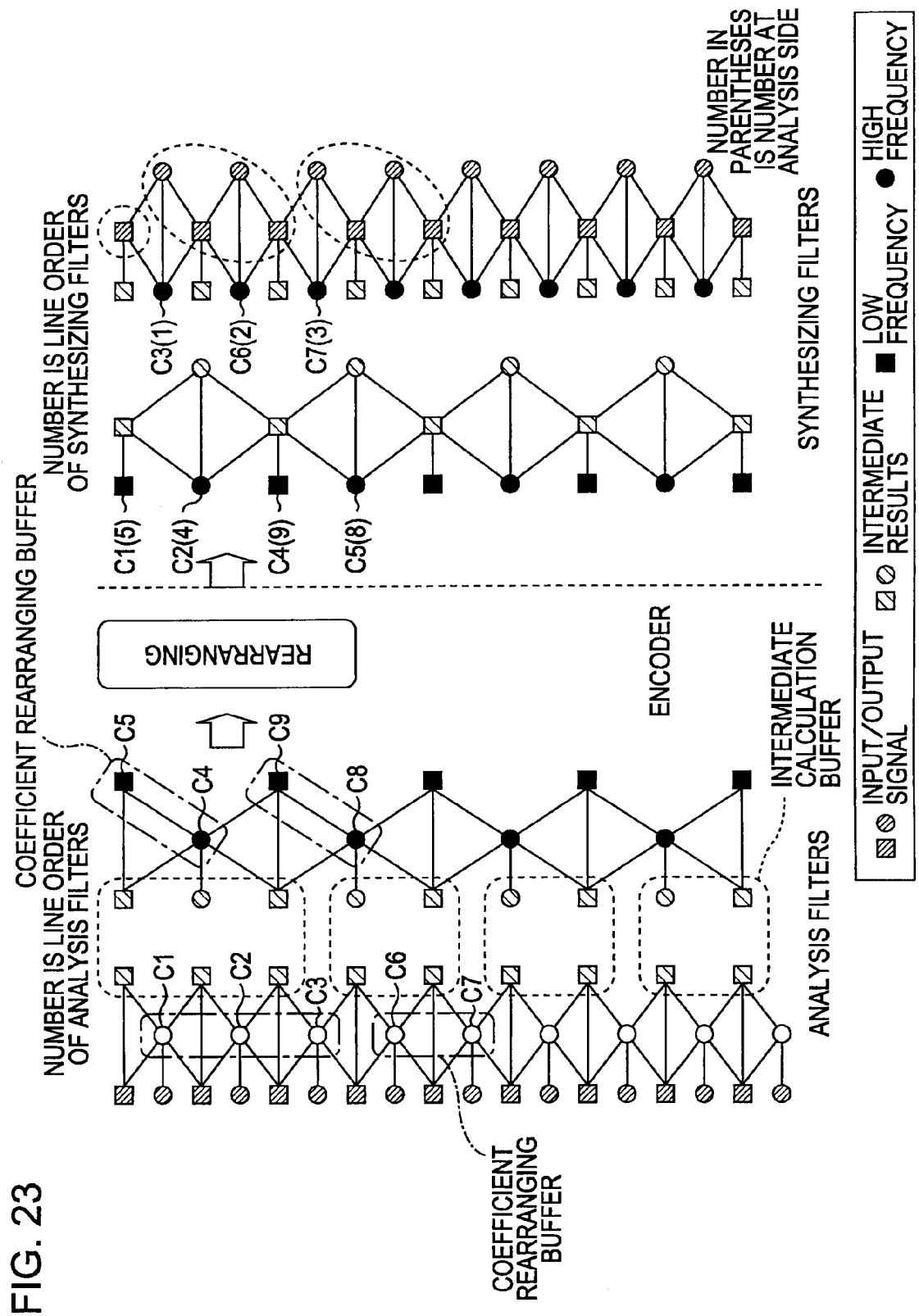
FIG. 23 is a schematic diagram for describing the flow of processing in the case of performing the rearranging processing of wavelet coefficients at the image encoding apparatus side.

Also, the timing for performing the rearranging processing may be other than the above-mentioned timing. For example, as shown in an example in FIG. 23, the rearranging processing may be performed at the encoding apparatus 1, and as shown in an example in FIG. 24, may be performed at the decoding apparatus 200.

With the processing for rearranging the coefficient data generated by wavelet transformation, a relatively large capacity is needed as the storage capacity of the coefficient rearranging buffer, and also high processing capabilities are needed for the coefficient rearranging processing itself. Even in this case, no problem occurs at all when the processing capabilities of the encoding apparatus are high to some extent.

Now, let us consider the case in which the encoding apparatus is implemented in a device of which the processing capabilities are relatively low, such as a so-called mobile terminal or the like such as a portable telephone terminal, and a PDA (Personal Digital Assistant). For example, in recent years, products to which an imaging function is added have been widely spread as to portable telephone terminals (referred to as portable telephone terminals with a camera function). It can be conceived that the image data image-captured by such a portable telephone terminal with a camera function is compressed and encoded by wavelet transformation and entropy encoding, transmitted via wireless or cable communication.

With such a mobile terminal for example, the processing capabilities of the CPU (Central Processing Unit) are restricted, and also memory capacity is limited to some extent. Therefore, processing load associated with the above-mentioned coefficient rearranging, and so forth causes a problem which cannot be disregarded.

Figure 24:
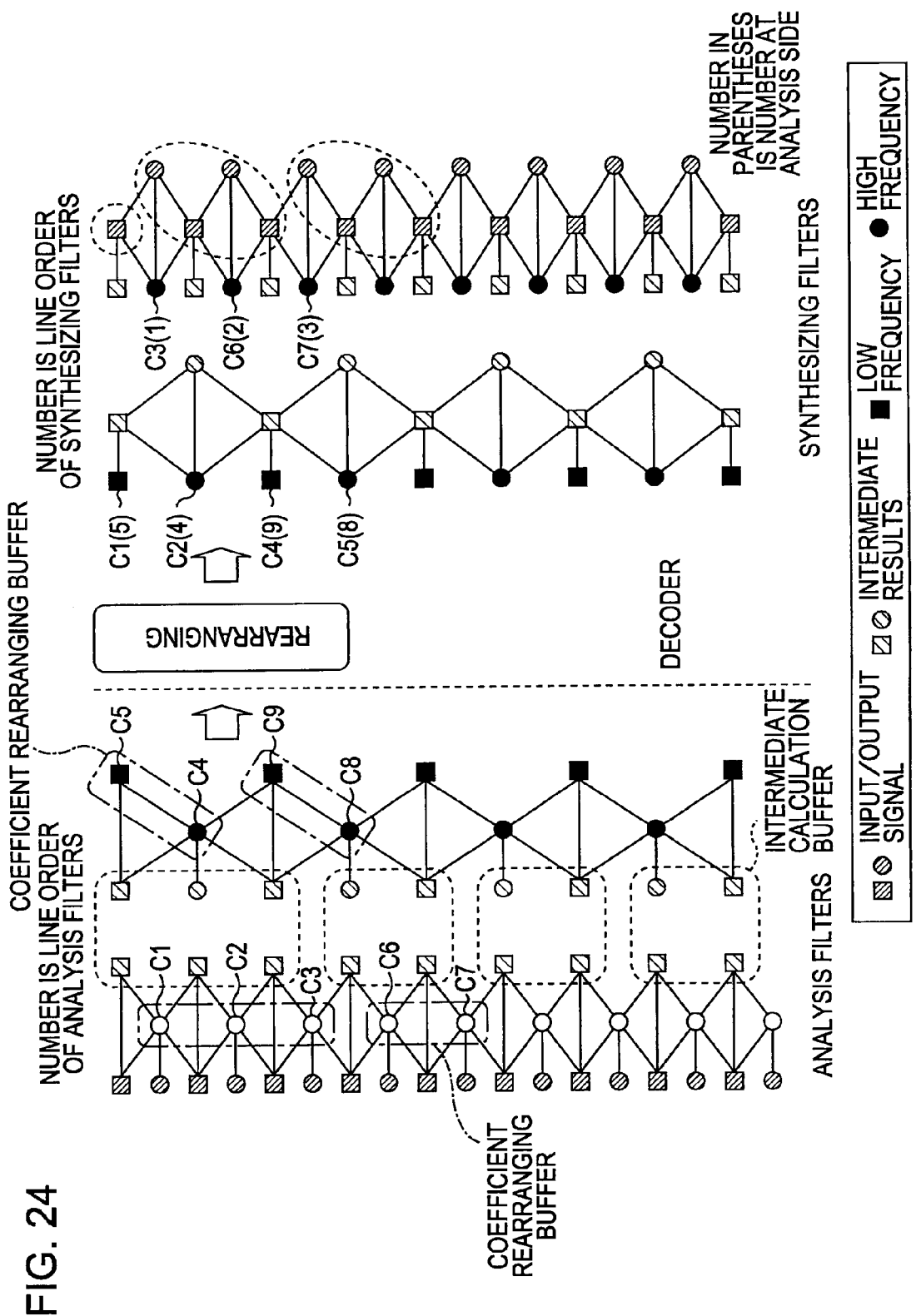
FIG. 24 is a schematic diagram for describing the flow of processing in the case of performing the rearranging processing of wavelet coefficients at the image decoding apparatus side.

Therefore, as shown in an example in FIG. 24, embedding rearranging processing in a decoding apparatus reduces the load of an encoding apparatus, and consequently, the encoding apparatus can be implemented in a device of which the processing capabilities are relatively low, such as a mobile terminal.

Figure 25:
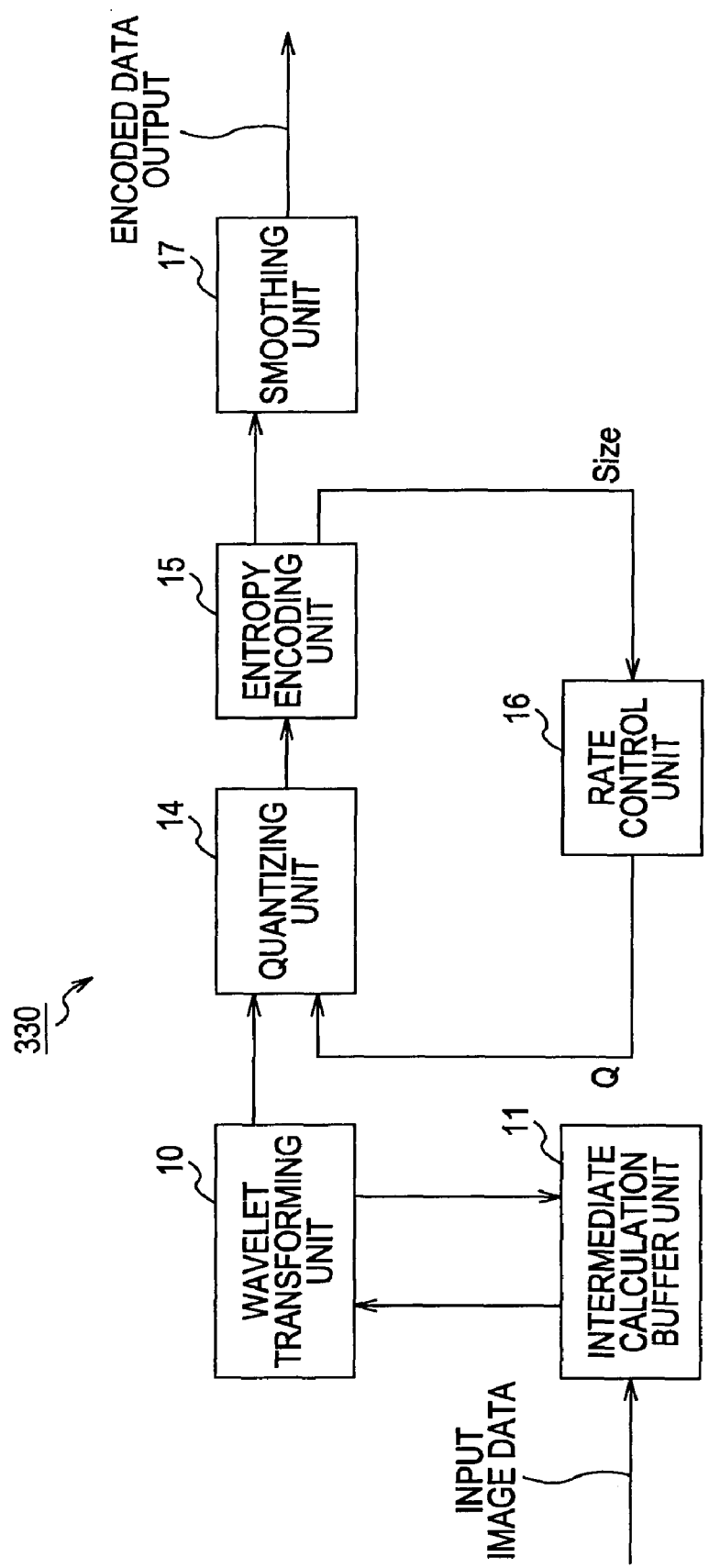
FIG. 25 is a block diagram illustrating yet another configuration example of the encoding apparatus to which an embodiment of the present invention is applied.

FIG. 25 is a block diagram illustrating a configuration example of an encoding apparatus in that case. Note that in FIG. 25, the same portions as those in FIG. 1 described above are denoted with the same reference numerals, and detailed description thereof will be omitted.

The configuration of the encoding apparatus 330 shown in this FIG. 25 is a configuration obtained by removing the coefficient rearranging unit 13 and the coefficient rearranging buffer unit 12 from the configuration of the encoding apparatus 1 shown in FIG. 1 described above. That is to say, the encoding apparatus 330 includes, as with the encoding apparatus 1, the wavelet transforming unit 10, intermediate calculation buffer unit 11, quantizing unit 14, entropy encoding unit 15, rate control unit 16, and smoothing unit 17.

Input image data is temporarily pooled in the intermediate calculation buffer unit 11. The wavelet transforming unit 10 subjects the image data pooled in the intermediate calculation buffer unit 11 to wavelet transformation, and supplies the generated coefficient data to the quantizing unit 14 sequentially in order of generating the coefficient data. The quantizing unit 14 subjects the supplied coefficient data to quantization by employing the quantization step size Q supplied from the rate control unit 16, and supplies this to the entropy encoding unit 15. That is to say, the generated coefficient data is supplied in order from high-frequency components to low-frequency components in accordance with the order of wavelet transformation. The entropy encoding unit 15 subjects the supplied coefficient to entropy encoding. The entropy encoding unit 15 supplies the encoded data obtained by entropy encoding to the smoothing unit 17. The smoothing unit 17 temporarily holds the supplied encoded data in the built-in buffer thereof, reads out the encoded data thereof so as to have a steady bit rate, and output this. At this time, the encoded data output from the smoothing unit 17 is output in the same order as the output order from the wavelet transforming unit 10, of the coefficient data corresponding to the encoded data thereof.

Figure 26:
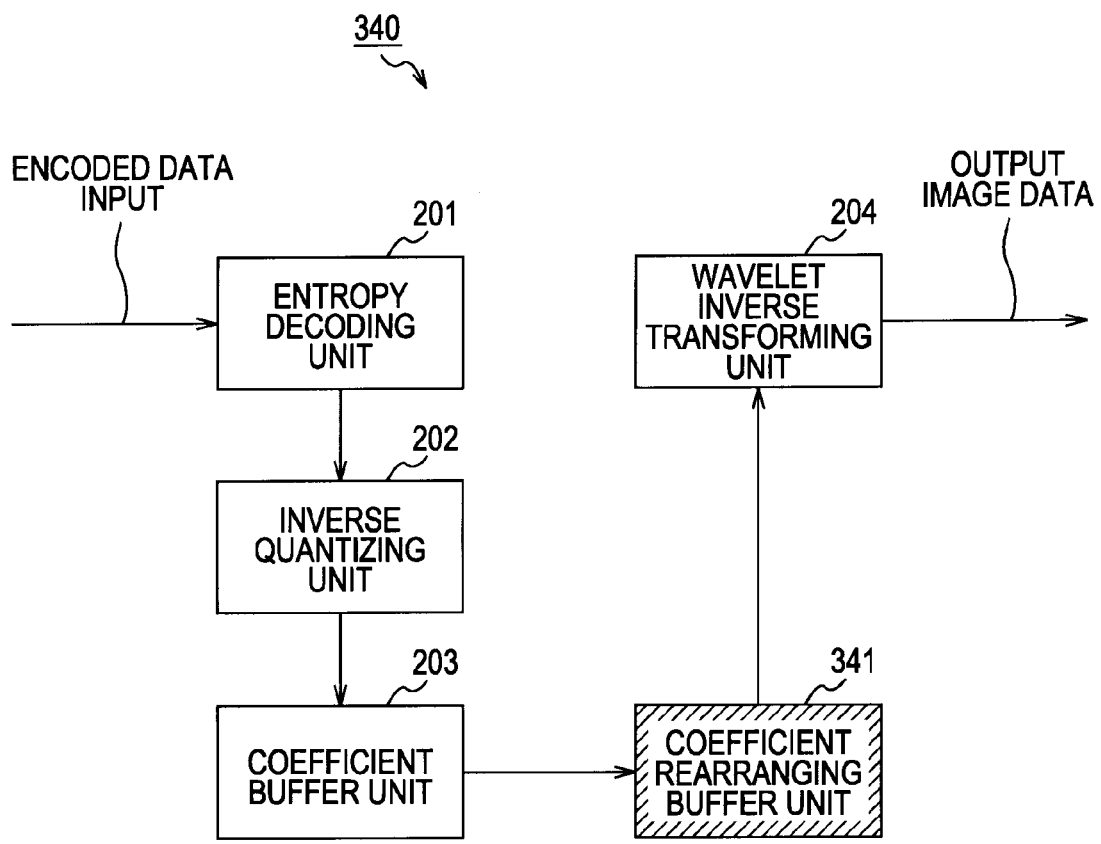
FIG. 26 is a block diagram illustrating a configuration example of a decoding apparatus corresponding to the encoding apparatus in FIG. 25.

FIG. 26 is a block diagram illustrating a configuration example of a decoding apparatus corresponding to the encoding apparatus 330. Note that the same portions as those in FIG. 17 described above are denoted with the same reference numerals, and detailed description thereof will be omitted.

As shown in FIG. 26, a decoding apparatus 340 in this case includes, as with the decoding apparatus 200 in FIG. 17, the entropy decoding unit 201, inverse quantizing unit 202, coefficient buffer unit 203, and wavelet inverse transforming unit 204, and also further includes a coefficient rearranging buffer unit 341.

The encoded data output from the entropy encoding unit 15 of the encoding apparatus 330 described in FIG. 25 is supplied to the entropy decoding unit 201 of the decoding apparatus 340 in FIG. 26, and converted into coefficient data of which entropy code is decoded. The coefficient data is subjected to quantization at the inverse quantizing unit 202, and then stored in the coefficient rearranging buffer unit 341 via the coefficient buffer unit 203. Upon the coefficient data being stored in the coefficient rearranging buffer unit 341 as much as the rearranging of the coefficient data can be performed, the wavelet inverse transforming unit 204 rearranges the coefficient data stored in the coefficient rearranging buffer unit 341 in order from low-frequency components to high-frequency components to read out this, and subjects the readout coefficient data to wavelet inverse transforming processing in the readout order. In the case of employing the 5×3 filter, the rearranging processing is performed such as shown in the above-mentioned FIG. 24.

That is to say, for example, in the case of processing from the top of one frame, at the time of the coefficients C1, C4, and C5 which have been subjected to entropy decoding being stored in the coefficient rearranging buffer unit 341, the wavelet inverse transforming unit 204 reads out the coefficient data from the coefficient rearranging buffer unit 341 to perform wavelet inverse transforming processing thereupon. The data subjected to wavelet inverse transformation at the wavelet inverse transforming unit 204 is sequentially output as output image data.

Note that in this case also, as already described with reference to FIG. 21, the processing of each component in the encoding apparatus 330, the transmission of encoded data to the transmission path, and the processing of each component in the decoding apparatus 340 are executed in parallel.

Note that with the transmission of encoded data between the encoding apparatus and the decoding apparatus, an arrangement may be made wherein the encoded data is packetized and transmitted.

Figure 27:
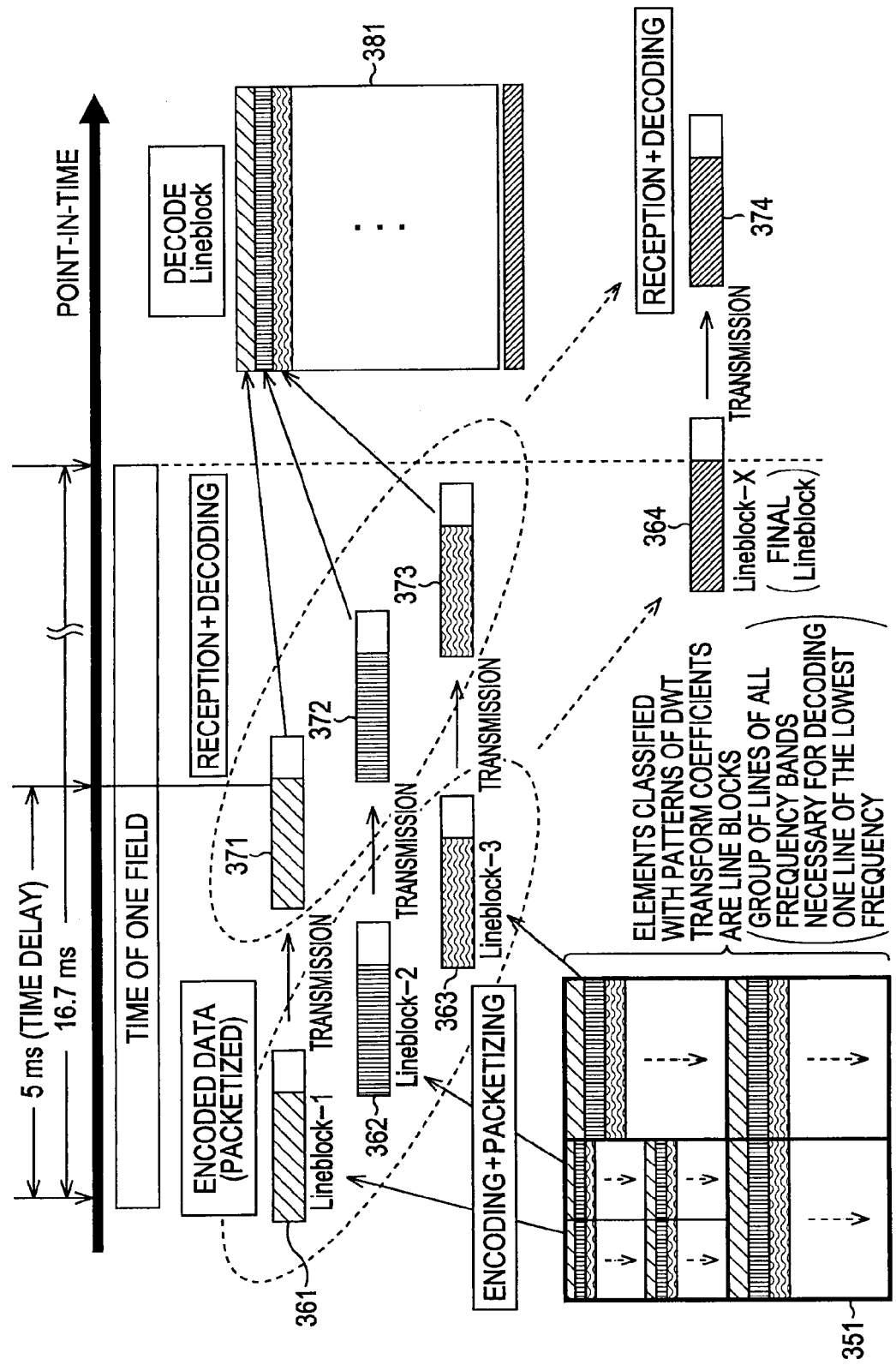
FIG. 27 is a schematic diagram describing an example of the situation of exchanging encoded data.

FIG. 27 is a schematic diagram describing an example of the state of exchange of encoded data thereof. In the case of the example shown in FIG. 27 also, as with the above-mentioned other embodiments, image data is subjected to wavelet transformation while being input by a certain number of lines for each line block (sub-band 351). Subsequently, at the time of reaching a predetermined wavelet transformation division level, coefficient lines from the lowest frequency sub-band to the highest frequency sub-band are rearranged in the opposite order from the generated order, i.e., in order from low frequency to high frequency.

With the sub-band 351 in FIG. 27, portions divided into patterns of slanting lines, vertical lines, and wavy lines are each different line blocks (as shown in arrows, the white portions of the sub-band 351 are also divided for each line block and processed in the same way). The coefficients of the line block subjected to rearranging are subjected to entropy encoding as described above, thereby generating encoded data.

Here, for example, upon the encoding apparatus transmitting encoded data without change, it becomes difficult for the decoding apparatus to identify the boundary of each line block (or complicated processing is needed) in some cases. Therefore, with the present embodiment, an arrangement is made wherein the encoding apparatus adds a header to encoded data in increments of line block for example, and transmits this as a packet made up of a header and encoded data.

That is to say, as shown in FIG. 27, when generating the encoded data of the 1st line block (Lineblock-1), the encoding apparatus packetizes this to transmit this to the decoding apparatus as a transmission packet 361. Upon receiving the packet thereof (reception packet 371), the decoding apparatus decodes the encoded data thereof.

Similarly, when generating the encoded data of the 2nd line block (Lineblock-2), the encoding apparatus packetizes this to transmit this to the decoding apparatus as a transmission packet 362. Upon receiving the packet thereof (reception packet 372), the decoding apparatus decodes the encoded data thereof. Further similarly, when generating the encoded data of the 3rd line block (Lineblock-3), the encoding apparatus packetizes this to transmit this to the decoding apparatus as a transmission packet 363. Upon receiving the packet thereof (reception packet 373), the decoding apparatus decodes the encoded data thereof.

The encoding apparatus and the decoding apparatus repeat such processing until the X'th final line block (Lineblock-X) (transmission packet 364, reception packet 374). Thus, a decoded image 381 is generated at the decoding apparatus.

Figure 28:
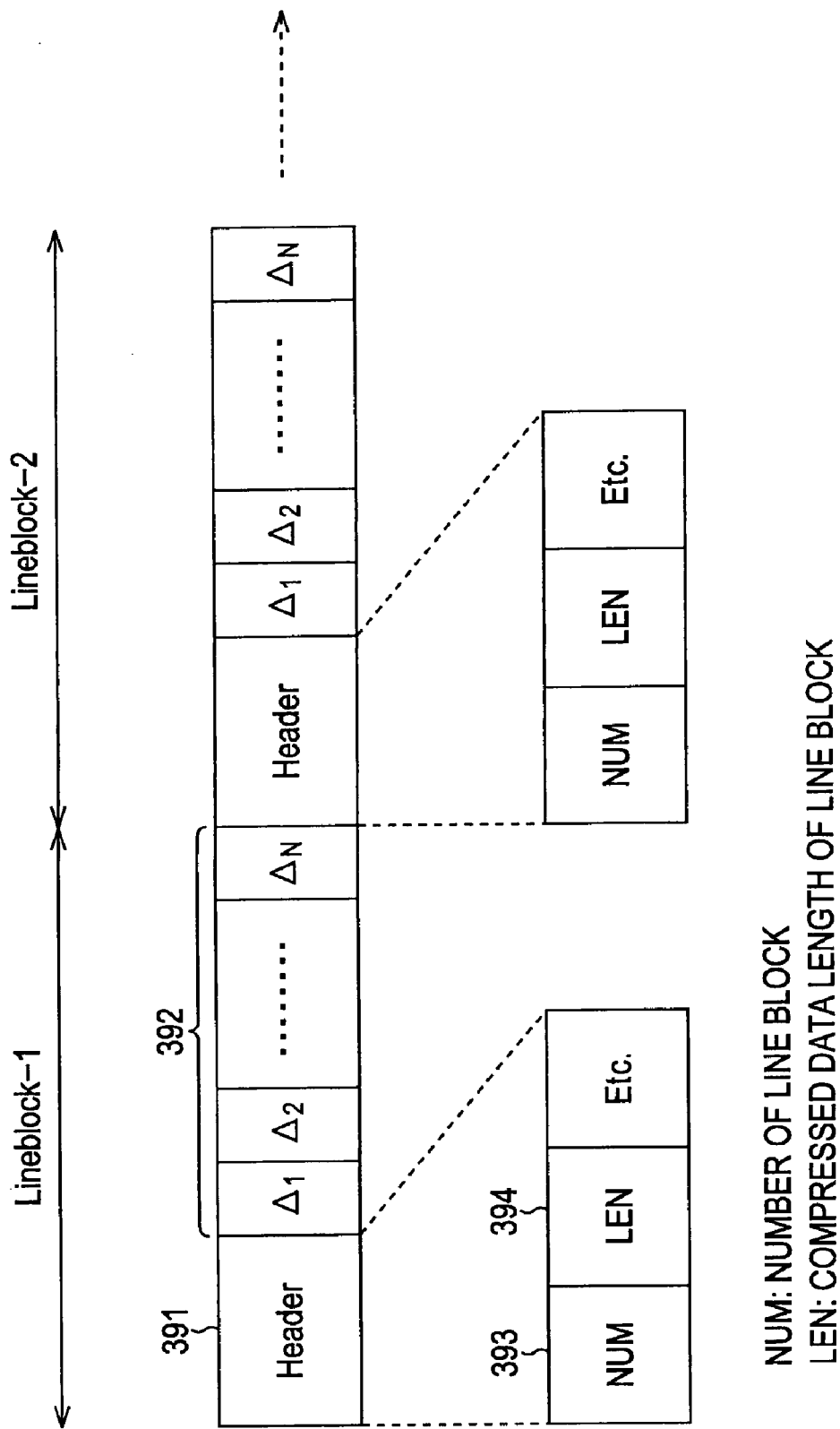
FIG. 28 is a diagram illustrating a configuration example of a packet.

A configuration example of a header is shown in FIG. 28. Though a packet is made up of a header 391 and encoded data as described above, the header 391 thereof includes descriptions of a line block number (NUM) 393, and an encoded data length (LEN) 394.

The decoding apparatus reads the information included in the a header added to the received encoded data, whereby the boundary of each line block can be readily identified, and the load of the decoding processing and processing time can be reduced.

Note that as shown in FIG. 28, further, the description of the quantization step size (Δ1 through ΔN) 392 for each sub-band making up a line block may be added to the received encoded data. Thus, the decoding apparatus can perform inverse quantization for each sub-band, and consequently can perform finer image quality control.

Also, an arrangement may be made wherein the encoding apparatus and the decoding apparatus execute each processing such as the above-mentioned encoding, packetizing, transmission/reception of packets, and decoding for each line block simultaneously in parallel (pipelining) as described above with reference to FIG. 21.

According to such an arrangement, delay time until image output can be obtained at the decoding apparatus can be extremely reduced. In FIG. 27, as an example, an operation example with interlaced video (60 field per second) is illustrated. With this example, time of one field is 1 sec/60=approx. 16.7 msec, but each processing is performed simultaneously in parallel, whereby image output can be obtained with delay time of approximately 5 msec.

Next, description will be made regarding a case in which the above-mentioned encoding apparatus and decoding apparatus are applied to a digital triax system.

A triax system is a system used in television broadcasting stations, production studios, and so forth. With such a system, at the time of recording in the studio or broadcasting live from a remote location, a single triaxial cable connecting a video camera and a camera control unit or a switcher is used to transmit multiplex signals such as picture signals, audio signals, return picture signals, synchronizing signals, and so forth, and also to supply power.

Many conventional triax systems have been arranged to transmit the above-described signals in the form of analog signals. On the other hand, in recent years, entire systems are becoming digital, and accordingly, triax systems used in television broadcasting stations are also becoming digital.

With known digital triax systems, the digital video signals transmitted over the triax cable have been uncompressed video signals. The reason for this is that the specs demanded regarding signal delay time are particularly severe with television broadcasting stations and so forth, basically, the delay time from shooting to monitor output, for example, is required to be within one field (16.67 msec) Compression encoding systems such as MPEG2 (Moving Pictures Experts Group 2) and MPEG4 which have realized high compression rates and high image quality have not been employed in triax systems since time equivalent to several frames worth is required for video signal compression and encoding, and decoding of compressed video signals, meaning that delay time is great.

The above-mentioned image encoding and image decoding methods, as described above, have an extremely short delay time for input of image data to obtaining of an output image, within one filed time, e.g., several lines to several tens of lines, and accordingly suitable application can be made to a digital triax system.

Figure 29:
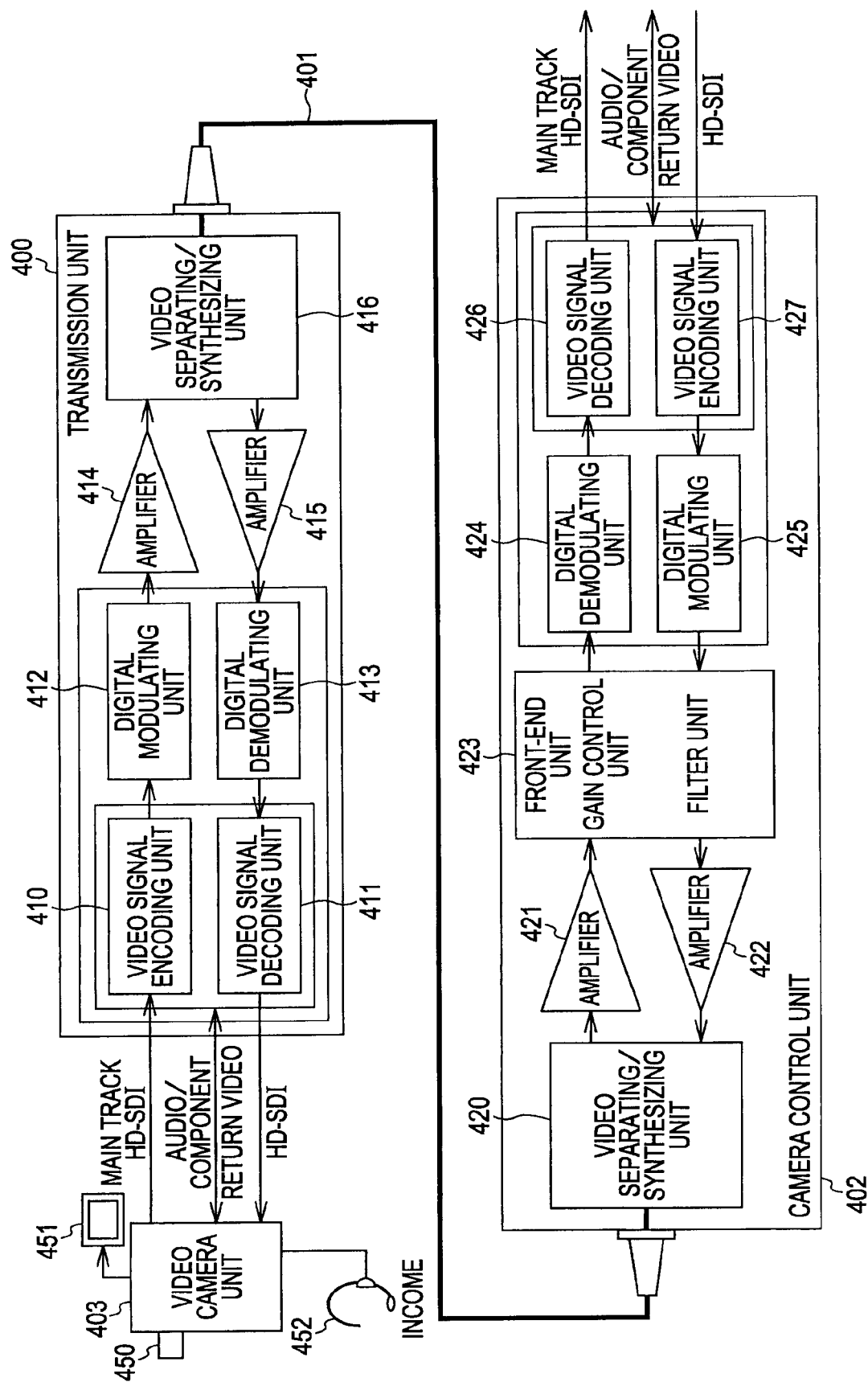
FIG. 29 is a block diagram illustrating a configuration example of a digital triax system to which an embodiment of the present invention is applied.

FIG. 29 illustrates a configuration of an example of a digital triax system applicable to the above-mentioned image encoding and image decoding method. With the digital triax system shown in FIG. 29, a transmission unit 400 and camera control unit 402 are connected via a triax cable (triaxial cable) 401. Digital video signals and digital audio signals (hereafter referred to as "main line signals") from the transmission unit 400 to the camera control unit 402 which are actually broadcast, or used as contents, and intercom audio signals and return digital video signals from the camera control unit 402 to the video camera unit 403, are transmitted over the triax cable 401.

The transmission unit 400 is built into an unshown video camera device, for example. Of course, other arrangements may be made, such as the transmission unit 400 being connected to the video camera device as an external device of the video camera device by a predetermined method. The camera control unit 402 may be a device commonly called a CCU (Camera Control Unit), for example.

Digital audio signals have little bearing on the essence of the present invention, so description thereof will be omitted for the sake of simplicity in description.

The video camera unit 403 is configured within an unshown video camera device for example, and performs photoreception with an unshown image-taking device such as a CCD (Charge Coupled Device), of light from a subject that has been taken in via an optical system 450 including a lens, focusing mechanism, zooming mechanism, iris adjusting mechanism, and so forth. The image-taking device converts the received light into electrical signals by photoelectric conversion, and further performs predetermined signals processing, so as to output as baseband digital video signals. These digital video signals are mapped to an HD-SDI (High Definition Serial Data Interface) format for example, and output.

Also connected to the video camera unit 403 are a display unit 451 used as a monitor, and an intercom 452 used for exchanging audio externally.

The transmission unit 400 has a video signal encoding unit 410 and video signal decoding unit 411, digital modulation unit 412 and digital demodulation unit 413, amplifiers 414 and 415, and a video splitting/synthesizing unit 416.

Baseband digital video signals mapped to the HD-SDI format for example, are supplied from the video camera unit 403 to the transmission unit 400. The digital video signals are compressed and encoded at the video signal encoding unit 410 so as to become an encoded stream, which is supplied to the digital modulation unit 412. The digital modulation unit 412 modulates the supplied encoded stream into signals of a format suitable for transmission over the triax cable 401, and outputs. The signals output from the digital modulation unit 412 are supplied to the video splitting/synthesizing unit 416 via an amplifier 414. The video splitting/synthesizing unit 416 sends the supplied signals to the triax cable 401. These signals are received at the camera control unit 402 via the triax cable 401.

The signals output from the camera control unit 402 are received at the transmission unit 400 via the triax cable 401. The received signals are supplied to the video splitting/synthesizing unit 416, and the portion of digital video signals and the portion of other signals are separated. Of the received signals, the portion of the digital video signals is supplied via an amplifier 415 to the digital demodulation unit 413, the signals modulated into signals of a format suitable of transmission over the triax cable 401 are demodulated at the camera control unit 402 side, and the encoded stream is restored.

The encoded stream is supplied to the video signal decoding unit 411, the compression code is decoded, and the baseband digital video signals are obtained. The decoded digital video signals are mapped to the HD-SDI format and output, and supplied to the video camera unit 403 as return digital video signals. The return digital video signals are supplied to the display unit 451 connected to the video camera unit 403, and used for monitoring by the camera operator.

The cameral control unit 402 has a video splitting/synthesizing unit 420, amplifiers 421 and 422, a front-end unit 423, a digital demodulation unit 424 and digital modulation unit 425, and a video signal decoding unit 426 and video signal encoding unit 427.

The signals output from the transmission unit 400 are received at the camera control unit 402 via the triax cable 401. The received signals are supplied to the video splitting/synthesizing unit 420. The video splitting/synthesizing unit 420 supplies the signals supplied thereto to the digital demodulation unit 424 via the amplifier 421 and front end unit 423. Note that the front end unit 423 has a gain control unit for adjusting gain of input signals, a filter unit for performing predetermined filtering on input signals, and so forth.

The digital demodulation unit 424 demodulates the signals modulated into signals of a format suitable of transmission over the triax cable 401 at the transmission unit 400 side, and restores the encoded stream. The encoded stream is supplied to the video signal decoding unit 426 where compression code is decoded, so as to obtain the baseband digital video signals. The decoded digital video signals are mapped to the HD-SDI format and output, and externally output as main line signals.

The return digital video signals and digital audio signals are supplied externally to the camera control unit 402. The digital audio signals are supplied to the intercom 452 of the camera operator for example, to be used for transmitting external audio instructions to the camera operator.

The return digital video signals are supplied to the video signal encoding unit 427 and compression encoded, and supplied to the digital modulation unit 425. The digital modulation unit 425 modulates the supplied encoded stream into signals of a format suitable for transmission over the triax cable 401, and outputs. The signals output from the digital modulation unit 425 are supplied to the video splitting/synthesizing unit 420 via the front end unit 423 and amplifier 422. The video splitting/synthesizing unit 420 multiplexes these signals with other signals, and sends out to the triax cable 401. The signals are received at the transmission unit 400 via the triax cable 401, and then supplied to the video camera unit 403.

The above-mentioned encoding apparatus can be applied to the video signal encoding unit 410 and the video signal encoding unit 427 of such a digital triax system, and further, the above-mentioned decoding apparatus can be applied to the video signal decoding unit 411 and the video signal decoding unit 426.

Also, as described with reference to FIG. 21, an arrangement has been made wherein the processing of each component of the encoding apparatus and the decoding apparatus is performed in parallel, whereby delay at the time of the pictures taken with the video camera unit 403 being output from the camera control unit 402, and delay of the return digital video signals externally supplied and transmitted from the camera control unit 402 to the video camera unit 403 can be suppressed to a low level.

Also, in the case of the system shown in FIG. 29, the signal processing capabilities and memory capacity can be set as appropriate at each of the transmission unit 400 and camera control unit 402, so the position at which the coefficient data rearranging processing is performed may be at either the transmission unit 400 side or camera control unit 402 side, and the position for performing entropy encoding may, in the same way, be either before or after the rearranging processing.

Now, there are many cases wherein it is permissible for the return digital video signals to be of a lower image quality than the digital video signals of the main line signals. In this case, the bit rate at the time of encoding at the video signal encoding unit 427 can be lowered. For example, the video signal encoding unit 427 performs control with the rate control unit 16 such that the bit rate of entropy encoding processing at the entropy encoding unit 15 is lower. Also, an arrangement can be conceived, wherein, for example, at the camera control unit 402 side, transformation processing is performed to a higher division level with the wavelet transforming unit 10 at the video signal encoding unit 427, and at the transmission unit 400 side, the wavelet inverse transformation at the wavelet inverse transforming unit 204 at the video signals encoding unit 411 is stopped at a lower division level. Processing at the video signal encoding unit 427 of the camera control unit 402 side is not restricted to this example, and various other types of processing can be conceived, such as keeping the division level for wavelet transformation low so as to alleviate the load of transformation processing.

In the case of applying to such a digital triax system also, the rate control unit 16 can readily and appropriately perform control of a generated code amount at the encoding processing as described above.

Also, the encoding apparatus to which an embodiment of the present invention is applied can be applied to a system other than a digital triax system. For example, transmission between the encoding apparatus and the decoding apparatus may be performed with cable communication or may be performed with wireless communication.

Figure 30:
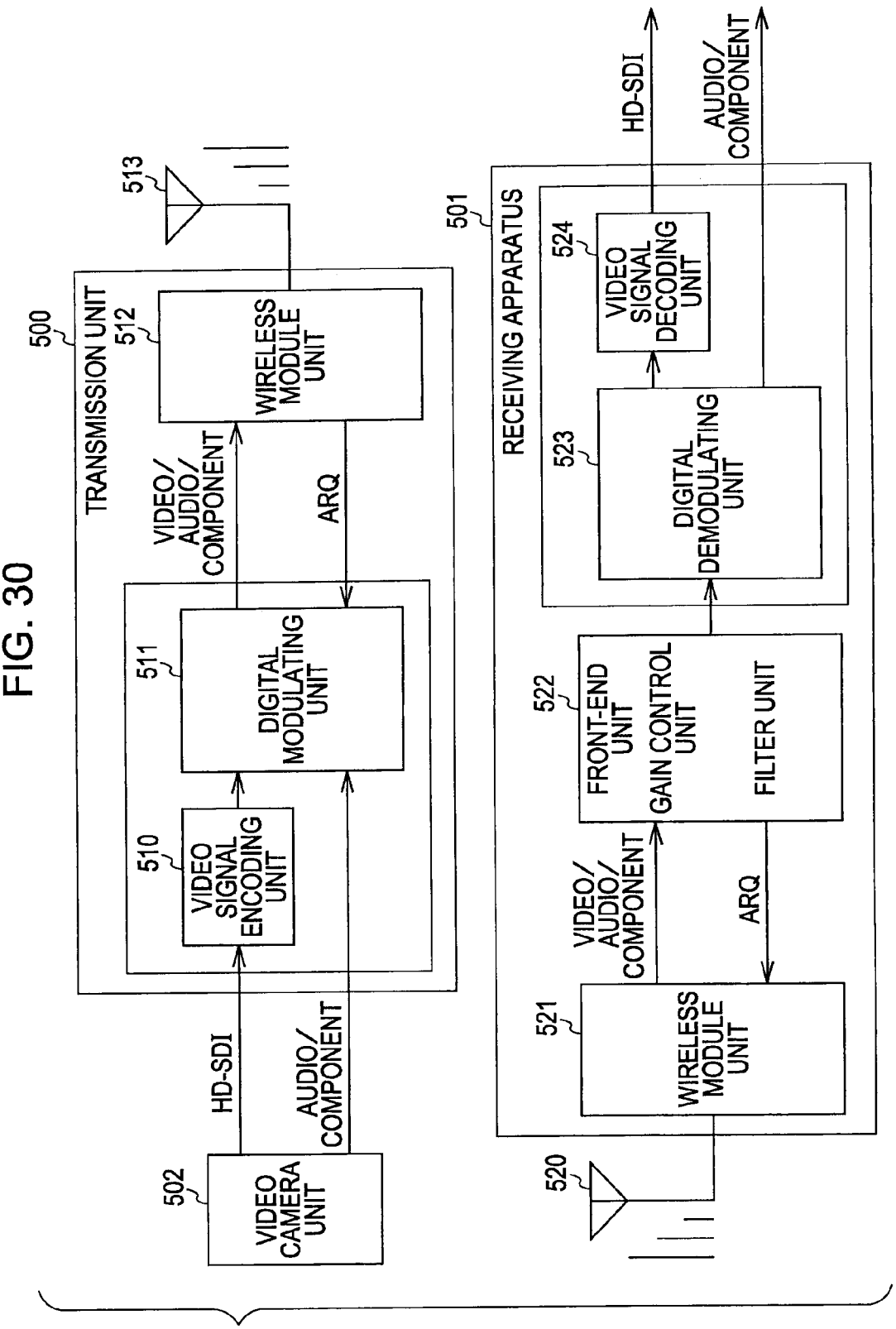
FIG. 30 is a block diagram illustrating a configuration example of a wireless transmission system to which an embodiment of the present invention is applied.

FIG. 30 is a block diagram illustrating a configuration example of a wireless transmission system wherein transmission of information exchanged between the encoding apparatus and the decoding apparatus is performed with wireless communication. Note that in the example in FIG. 30, video signals are transmitted unidirectionally from the video camera unit 502 or transmission unit 500 (hereafter abbreviated as "transmission unit 500") side to the reception device 501 side. Bidirectional communication between the transmission unit 500 and reception device 501 can be performed for audio signals and other signals.

The transmission unit 500 is built into an unshown video camera device having a video camera unit 502, for example. Of course, other arrangements may be made, such as the transmission unit 500 being connected to the video camera device as an external device of the video camera device having the video camera unit 502.

The video camera unit 502 has a predetermined optical system, an image-taking device such as a CCD, and a signal processing unit for outputting signals output from the image-taking device as digital video signals, for example. These digital video signals are mapped to an HD-SDI format for example, and output from the video camera unit 502, for example. Of course, the digital video signals output from the video camera unit 502 are not restricted to this example, and may be of other formats as well.

The transmission unit 500 has a video signal encoding unit 510, digital modulation unit 511, and a wireless module unit 512. At the transmission unit 500, the baseband digital video signals are mapped to the HD-SDI format for example, and output from the video camera unit 502. The digital video signals are subjected to compression encoding by wavelet transformation and entropy encoding according to the compression encoding method of the present invention at the video signal encoding unit 510, so as to become an encode stream which is supplied to the digital modulation unit 511. The digital modulation unit 511 performs digital modulation of the supplied encoded stream into signals of a format suitable for wireless communication, and outputs.

Also, digital audio signals and other signals, such as predetermined commands and data for example, are also supplied to the digital modulation unit 511. For example, the video camera unit 502 has a microphone whereby collected sound is converted into audio signals, and further the audio signals are subjected to A/D conversion and output as digital audio signals. Further, the video cameral unit 502 is capable of outputting certain commands and data. The commands and data may be generated within the video camera unit 502, or an operation unit may be provided to the video camera unit 502 with the commands and data being generated in response to user operations made at the operating unit. Also, an arrangement may be made wherein an input device, for inputting commands and data, is connected to the video camera unit 502.

The digital modulation unit 511 performs digital modulation of these digital audio signals and other signals, and outputs. The digital modulated signals output from the digital modulation unit 511 are supplied to the wireless module unit 512 and wirelessly transmitted from an antenna 513 as airwaves.

Upon receiving an ARQ (Auto Repeat Request) from the reception device 501 side, the wireless module unit 512 makes notification of this ARQ to the digital modulation unit 511, so as to request a data resend.

The airwaves transmitted from the antenna 513 are received at an antenna 520 of the reception device 501 side, and supplied to a wireless module unit 521. The wireless module unit 521 supplies digital modulated signals based on the received airwaves to the front end unit 522. The front end unit 522 performs predetermined signal processing such as gain control to the supplied digital modulated signals, for example, and supplies to the digital demodulation unit 523. The digital demodulation unit 523 demodulates the supplied digital modulated signals, and restores the encoded stream.

The encoded stream restored at the digital demodulation unit 523 is supplied to the video signal decoding unit 524, the compressed code is decoded with the decoding method according to the present invention, and the baseband digital video signals are obtained. The decoded digital video signals are mapped to the HD-SDI format for example, and output.

The digital demodulation unit 523 is also supplied with the digital audio signals and other signals subjected to digital modulation at the transmission unit 500 side and transmitted. The digital demodulation unit 523 demodulates the signals wherein these digital audio signals and other signals have been subjected to digital modulation, and restores and outputs the digital audio signals and other signals.

Also, the front end unit 522 performs error detection according to a predetermined method regarding the received signals supplied from the wireless module unit 521, and in the event that an error is detected such as an erroneous frame having been received for example, outputs an ARQ. The ARQ is supplied to the wireless module unit 521, and transmitted from the antenna 520.

With such a configuration, the transmission unit 500 is built into a relatively small-sized video camera device having a video camera unit 502 for example, a monitor device is connected to the reception device 501, and the digital video signals output from the video signal decoding unit 524 are supplied to the monitor device. As long as the reception device 501 is within the airwave range of the airwaves transmitted from the wireless module unit 512 from the video camera device having the built-in transmission unit 500, the pictures taken with the video camera device can be watched on the monitor device with little delay, e.g., with a delay within one field or one frame.

Note that in the example in FIG. 30, communication between the transmission unit 500 and the reception device 501 is performed using wireless communication, so as to transmit video signals via wireless communication, but this arrangement is not restricted to this example. For example, the transmission unit 500 and the reception device 501 may be connected via a network such as the Internet. In this case, the wireless module unit 512 at the transmission unit 500 side and the wireless module unit 521 at the reception device 501 side are each communication interfaces capable of communication using IP (Internet Protocol).

Various applications can be conceived for such a system. For example, such a system can be applied to a videoconferencing system. An example of an arrangement would be to connect a simple video camera device capable of USB (Universal Serial Bus) connection to a computer device such as a personal computer, with the computer device side implementing the video signal encoding unit 510 and video signal decoding unit 524. The video signal encoding unit 510 and video signal decoding unit 524 implemented at the computer device may be a hardware configuration, or may be realized by software running on the computer device.

For example, each of the members participating in the videoconference would be provided with a computer device and a video camera device to be connected to the computer device, with the computer device being connected to a server device for providing the videoconference system service, by either cable or wireless network. Video signals output from the video camera device are supplied to the computer device via USB cable, and the encoding processing according to the present invention is performed at the video signal encoding unit 510 within the computer device. The computer device transmits the encoded steam wherein the videos signals have been encoded, to the server device or the like, via the network.

The server device transmits the received encoded stream to the computer device of each of the participating members, via the network. This encoded stream is received at the computer device of each of the participating members, and is subjected to the decoding processing according to the present invention at the video signal decoding unit 524 within the computer device. The image data output from the video signal decoding unit 524 is displayed on the display unit of the computer device as a picture.

That is to say, video pictures taken by the video camera devices of the other participating members are displayed on the display units of the computer devices of each of the participating members. Accordingly, with such a system being employed, the delay time from encoding video signals taken with a video camera device to decoding thereof at the computer device of other participating members is short, so the unnatural sensation of the pictures of other participating members being displayed on the display units of the computer devices of the participating members being delayed, can be reduced.

Further, an arrangement can be conceived wherein the video signal encoding unit 510 is installed at the video camera device side. For example, the transmission unit 500 is built into a video camera device. Such a configuration does away with the need for the video camera device to be connected to another device such as a computer device or the like.

In the case of applying to such a videoconferencing system also, the rate control unit 16 can readily and appropriately perform control of a generated code amount at the encoding processing, as described above.

Such a system made up of the video camera device with the transmission unit 500 built in, and the reception device 501, can be applied to various applications other than the above-described videoconferencing system. For example, as schematically shown in FIG. 31, this system can be applied to a home gaming console. In FIG. 31, the transmission unit 500 in FIG. 30 is built into a video camera device 600.

In the main unit 601 of the home gaming console, a bus for example connects a CPU, RAM (Random Access Memory), ROM (Read Only Memory), a disk drive device compatible with CD-ROMs (Compact Disc Read Only Memory) and DVD-ROMs (Digital Versatile Disc-ROM), a graphics control unit for converting display control signals generated by the CPU into video signals and outputting, an audio playback unit for playing audio signals, and so forth, i.e., having a configuration generally like that of a computer device. The main unit 601 of the home gaming console is controlled overall by the CPU, following programs stored in the ROM beforehand, or programs recorded in a CD-ROM or DVD-ROM mounted to the disk drive device. The RAM is used as work memory for the CPU. The main unit 601 of the home gaming console has built in the reception device 501 shown in FIG. 30. Digital video signals output from the reception device 501, and other signals, are supplied to the CPU via the bus, for example.

Let us say that with such a system, e.g., the main unit 601 of the home gaming console, game software is running which can take images in the form of digital video signals supplied externally, as images within the game. For example, this game software is capable of using images in the form of digital video signals supplied externally as images within the game, and also recognizes the movements of persons (players) within the image, and performs operations corresponding to the recognized motions.

The video camera device 600 encodes the shot digital video signals with the above-mentioned encoding method at the video signal encoding unit 510 within the built-in transmission unit 500, modulates the encoded stream at the digital modulation unit 511 and supplies to the wireless module unit 512, so as to be transmitted from the antenna 513. The transmitted airwaves are received at the antenna 520 of the reception device 501 built into the main unit 601 of the home gaming console, and the received signals are supplied to the digital demodulation unit 523 via the wireless module unit 521 and the front end unit 522. The received signals are demodulated at the digital demodulation unit 523 into an encoded stream, and supplied to the video signal decoding unit 524. The video signal decoding unit 524 decodes the supplied encoded stream with the above-mentioned decoding method, and outputs the baseband digital video signals.

The baseband digital video signals output from the video signals decoding unit 524 are sent over the bus in the main unit 601 of the home gaming console, and temporarily stored in the RAM, for example. Upon the digital video signals stored in the RAM being read out following a predetermined program, the CPU can detect movement of persons within the image provided by the digital video signals, and use the image within the game.

Due to the delay time, from the images being shot with the video camera device 600 and the obtained digital video signals being encoded to the encoded stream being decoded at the main unit 601 of the home gaming console and the images being obtained thereat, being short, responsivity of the game software running on the main unit 601 of the home gaming console as to the movement of the player improves, thereby improving operability of the game.

Note that such a video camera device 600 used with a home gaming console often has a simple configuration due to restrictions on price, size, and so forth, and assumptions must be made that a CPU with high processing capabilities and large-capacity memory such as a computer device may not be implementable.

That is to say, generally, the video camera device 600 is a peripheral device of the main unit 601 of the home gaming console, which is necessary only for playing games using the video camera device 600, and is not a device necessary to play games on the main unit 601 of the home gaming console. In such a case, the video camera device 600 is often sold separately from the main unit 601 of the home gaming console (a so-called option sold separately). In this case, installing a high-capability CPU and memory with a large storage capacity in the video camera device 600 so as to be sold at a high price generally may lead to reduced numbers of units sold. In this case, this may reduce the number sold of the games using the video camera device 600, which may lead to lower revenue. Also, with home games in particular, ownership rate often strongly affects the number of units sold, so a low ownership rate of the video camera device 600 may lead to an even lower number of units sold.

On the other hand, selling a great number of the video camera device 600 at low prices to improve the ownership rate can improve the number of home games sold using the video camera device 600 and improve the popularity thereof, and this can be further anticipated to lead to further purchase incentives for the main unit 601 of the home gaming console. From this perspective as well, the video camera device 600 is often preferably of a simple configuration.

In this case, an arrangement may be conceived wherein wavelet transformation is performed at the video signal encoding unit 510 of the transmission unit 500 built into the video camera device 600, at a low division level. This reduces the need for memory capacity to be used with the coefficient rearranging buffer unit.

Further, rearranging of coefficients is performed at the decoding apparatus side as described above does away with the need to perform rearranging processing of the wavelet transformation coefficient data at the video signal encoding unit 510 side, so the load at the video camera device 600 side can be further reduced, which is desirable.

Note that the video camera device 600 and the main unit 601 of the home gaming console have been described above as being connected by wireless communication, but this arrangement is not restricted to this example. That is to say, the video camera device 600 and the main unit 601 of the home gaming console may be connected by cable, via interfaces such as USB, IEEE 1394, or the like.

In the case of applying to such a home game console system also, the rate control unit 16 can readily and appropriately perform control of a generated code amount at the encoding processing.

As described above, another great advantage of the present invention is that it can be applied to various forms, and can easily be applied to a wide variety of usages (i.e., highly versatile).

The series of above-described processing can be realized by hardware or can be realized by software. In the case of realizing the series of processing by software, a program making up the software is installed in a computer which has dedicated hardware built in, or installed in a general-purpose computer, or an information processing device of an information processing system made up of multiple devices, capable of executing various functions by various types of programs being installed therein, from a program recording medium.

Figure 32:
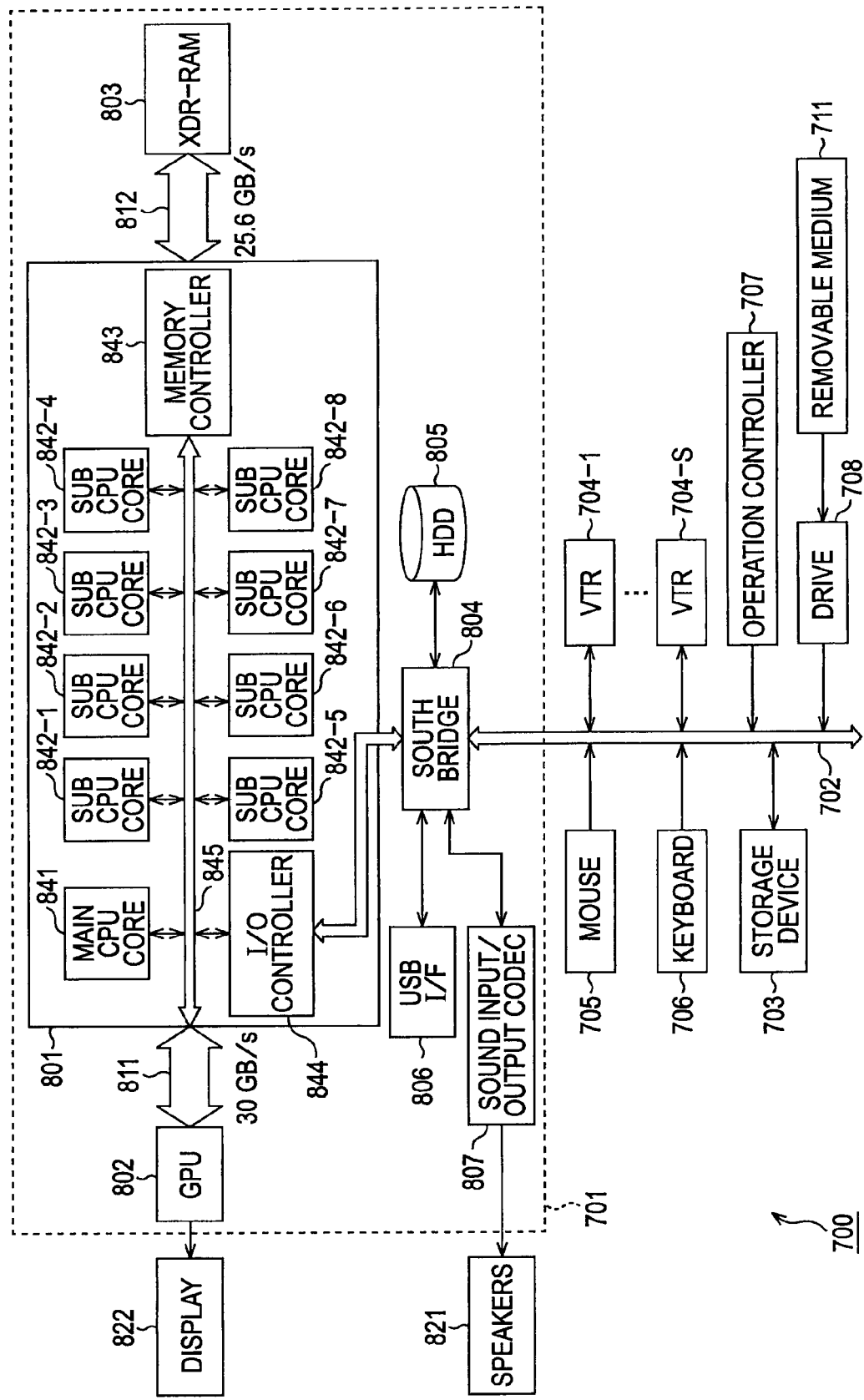
FIG. 32 is a block diagram illustrating an information processing system to which an embodiment of the present invention is applied.

FIG. 32 is a block diagram illustrating an example of the configuration of an information processing system for executing the above-described series of processing with a program.

As shown in FIG. 32, the information processing system 700 is a system configured of an information processing device 701, a storage device 703 connected with the information processing device 701 by a PCI bus 702, VTR 704-1 through VTR 704-S which are multiple video tape recorders (VRT), and a mouse 705, keyboard 706, and operation controller 707 for a user to perform operation input of these, and is a system which performs image encoding processing and image decoding processing and the like as described above, by an installed program.

The information processing device 701 of the information processing system 700, for example, can encode moving image contents stored in the large-capacity storage device 703 configured of RAID (Redundant Arrays of Independent Disks), store the obtained encoded data in the storage device 703, decode the encoded data stored in the storage device 703, store the obtained decoded image data (moving image contents) in the storage device 703, and record the encoded data or decoded image data on video tape by way of the VTR 704-1 through VTR 704-S, and so forth. Also, the information processing device 701 is arranged to capture moving image contents recorded in video tapes mounted in the VTR 704-1 through VTR 704-S into the storage device 703. At this time, an arrangement may be made wherein the information processing device 701 encodes the moving image contents.

The information processing unit 701 has a microprocessor 801, GPU (Graphics Processing Unit) 802, XDR (Extreme Data Rate)-RAM 803, south bridge 804, HDD (Hard Disk Drive) 805, USB interface (USB I/F) 806, and sound input/output codec 807.

The GPU 802 is connected to the microprocessor 801 via a dedicated bus 811. The XDR-RAM 803 is connected to the microprocessor 801 via a dedicated bus 812. The south bridge 804 is connected to an I/O controller 844 of the microprocessor 801 via a dedicated bus. Also connected to the south bridge 804 are the HDD 805, USB interface 806, and sound input/output codec 807. A speaker 821 is connected to the sound input/output codec 807. Also, a display 822 is connected to the GPU 802.

Also connected to the south bridge 804 are the mouse 705, keyboard 706, VTR 704-1 through 704-S, storage device 703, and operating controller 707, via the PCI bus 702.

The mouse 705 and keyboard 706 receive operating input from the user, and supply to the microprocessor 801 signals indicating the contents of the operation input from the user, via the PCI bus 702 and the south bridge 804. The storage device 703 and VTR 704-1 through VTR 704-S can record and play predetermined data.

A drive 708 is further connected to the PCI bus 702 as necessary, to which a removable medium 711 such as a magnetic disk, optical disk, magneto-optical disk, or semiconductor memory, etc., is mounted as appropriate, with a computer program read out therefrom being installed in the HDD 805 as necessary.

The microprocessor 801 is a multi-core configuration wherein a general-purpose main CPU core 841 for executing basic programs such as an OS (Operating System) or the like, sub-CPU core 842-1 through sub-CPU core 842-8 which are multiple (eight in this case) RISC (Reduced Instruction Set Computer) type signal processing processors connected to the main CPU core 841 via an internal bus 845, a memory controller 843 for performing memory control of the XDR-RAM 803 having capacity of 256 [MByte] for example, and an I/O (In/Out) controller 844 for managing input and output of data with the south bridge 804, integrated on a single chip, realizing an operation frequency of 4 [GHz], for example.

At the time of startup, the microprocessor 801 reads out necessary application programs stored in the HDD 805 based on the control program stored in the HDD 805 and renders to the XDR-RAM 803, and subsequently executes control processing necessary based on the application programs and operator operations.

Also, by executing software, the microprocessor 801 can realize the above-mentioned encoding processing and decoding processing, supplying encoded streams obtained as the result of encoding to the HDD 805 for storage via the south bridge 804, perform data transmission of playing pictures of moving image contents obtained as a result of decoding to the GPU 802 for display on the display 822, and so forth, for example.

While how to use the CPU cores within the microprocessor 801 is optional, an arrangement may be made wherein, for example, the main CPU core 841 performs processing relating to control of image encoding processing and image decoding processing, and controls the eight sub-CPU core 842-1 through sub-CPU core 842-8 to perform various types of processing such as wavelet transformation, coefficient rearranging, entropy encoding, entropy decoding, wavelet inverse transformation, quantization, inverse quantization, and so forth, simultaneously and in parallel as described with reference to FIG. 21, for example. At this time, an arrangement wherein the main CPU core 841 assigns processing to each of the eight sub-CPU core 842-1 through sub-CPU core 842-8 in increments of line blocks (precincts), thereby executing the image encoding processing and image decoding processing simultaneously in parallel, in increments of line blocks, is implemented in the same way as with the case described with reference to FIG. 21. That is to say, the efficiency of encoding processing and decoding processing can be improved, the delay time of the overall processing reduced, and further, the load, processing time, and memory capacity necessary for processing, can be reduced. Of course, each processing can be performed with other methods, as well.

For example, an arrangement may be made wherein a part of the eight sub-CPU core 842-1 through sub-CPU core 842-8 of the microprocessor 801 perform encoding processing, and the rest performs decoding processing, simultaneously, in parallel.

Also, for example, in the event that an independent encoder or decoder, or codec processing device is connected to the PCI bus 702, the eight sub-CPU core 842-1 through sub-CPU core 842-8 of the microprocessor 801 may control the processing executed by these devices, via the south bridge 804 and PCI bus 702. Further, in the event that multiple such devices are connected, or in the event that these devices include multiple decoders or encoders, the eight sub-CPU core 842-1 through sub-CPU core 842-8 of the microprocessor 801 may effect control so that the multiple decoders or encoders share the processing.

At this time, the main CPU core 841 manages the actions of the eight sub-CPU core 842-1 through sub-CPU core 842-8, assigning processing to each sub-CPU core, retrieving processing results, and so forth. Further, the main CPU core 841 also performs processing other than that which these sub-CPU cores perform. For example, the main CPU core 841 accepts commands supplied from the mouse 705, keyboard 706, or operating controller 707, via the south bridge 804, and executes various types of processing corresponding to the commands.

The GPU 802 performs final rendering processing regarding pasting textures and so for playing the playing picture of moving image contents to be displayed on the display 822, and also governs functions for performing coordinate transformation calculations when displaying multiple playing pictures of the moving image contents and still images of still image contents on the display 822 at once, processing for enlarging/reducing playing pictures of the moving image contents and still images of still image contents, and so forth, whereby the processing load on the microprocessor 801 can be alleviated.

The GPU 802, under the control of the micro processor 801, subjects the supplied picture data of the moving image contents and image data of still image contents to predetermined signal processing, sends the picture data and image data obtained as a result thereof to the display 822, and displays image signals on the display 822.

Now, the playing pictures of multiple moving image contents decoded simultaneously in parallel by the eight sub-CPU core 842-1 through sub-CPU core 842-8 of the microprocessor 801 is subjected to data transmission to the GPU 802 via the bus 811, the transmission speed thereof being up to 30 [Gbyte/sec] for example, so that even complex picture images with special effects can be displayed smoothly at high speeds.

On the other hand, the microprocessor 801 subjects the audio data, of the picture data and audio data of the moving image contents, to audio mixing processing, and sends the edited audio data obtained as a result thereof to the speaker 821 via the south bridge 804 and sound input/output codec 807, so as to output audio based on the audio signals from the speaker 821.

In the case of realizing the above-described series of processing by software, a program making up the software is installed from a network or recording medium.

This recording medium includes, as shown in FIG. 32, not only the removable media 711 storing the program, such as magnetic disks (including flexible disks), optical disks (including CD-ROM and DVD), magneto-optical disks (including MD), semiconductor memory, etc., distributed separately from the device main unit so as to distribute the program to the user, but also the HDD 805, storage device 703, where programs are stored, etc., to be distributed to the user in a state of being assembled into the device main unit. Of course, storage media may be semiconductor memory such as ROM or flash memory or the like, as well.

In the above, description has been made that the microprocessor 801 is configured of eight sub-CPU cores, but the invention is not restricted to this, and the number of sub-CPU cores is optional. Also, as for the microprocessor 801, an arrangement may be made wherein a CPU is used which is configured of a single-core (one core) instead of being configured of a main CPU core and multiple sub-CPU cores. Also, multiple CPUs may be used instead of the microprocessor 801, multiple information processing devices may be used (i.e., a program for executing the processing of the present invention is executed at multiple devices which operate mutually in conjunction).

The steps describing the program stored in the recording medium in the present Specification may of course be performed in the time-sequence described, but are not restricted to this time-sequence, and may be executed in parallel, or individually.

Further, system as used in the present Description refers to the entirety of equipment configured of multiple devices (devices).

Note that in the above, configurations described as being a single device may be divided so as to be configured of multiple devices. Conversely, in the above, configurations described as being multiple devices may be consolidated so as to be configured of a single device. Also, the configurations of the devices may have added thereto configurations other than those described above. Further, a part of the configuration of one device may be included in the configuration of another device, as long as the configuration and operations of the overall system is substantially the same.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus configured to encode image data, comprising:
    rearranging means configured to rearrange coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components;
    control means configured to calculate a new quantization step size at the time of encoding said image data for each coding unit which is the processing increment of said encoding using the ratio between the generated code amount at the time of encoding with a known quantization step size and a target code amount at the time of encoding said image data; and
    encoding means configured to encode the coefficient data rearranged by said rearranging means for each coding unit to generate encoded data using the quantization step size calculated by said control means.

2. The information processing apparatus according to claim 1, wherein said control means further comprising:
    calculating means configured to multiply said known quantization step size by the ratio between said generated code amount and said target code amount; and
    setting means configured to set said multiplication result calculated by said calculating means as said new quantization step size.

3. The information processing apparatus according to claim 2, wherein said calculating means calculate said multiplication result in increments of pictures.

4. The information processing apparatus according to claim 3, wherein said setting means set said multiplication result as said new quantization step size, in the event that the correlation between the pictures of said image data is higher than a predetermined reference, and also the data occupied ratio of a buffer for storing said encoded data is lower than a predetermined reference.

5. The information processing apparatus according to claim 1, wherein said known quantization step size is a quantization step size which has been employed for encoding of the picture which is one picture ahead of said image data;
    and wherein said generated code amount is a code amount generated at the encoding of said picture.

6. The information processing apparatus according to claim 1, wherein said coding unit is said line block.

7. The information processing apparatus according to claim 1, wherein said rearranging means rearrange said coefficient data in order from low frequency components to high frequency components for each line block.

8. The information processing apparatus according to claim 1, wherein said control means perform control so as to operate each of said rearranging means and said encoding means in parallel for each line block.

9. The information processing apparatus according to claim 1, wherein said rearranging means and said encoding means perform each processing in parallel.

10. An information processing method for encoding image data, comprising the steps of:
rearranging coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components;
calculating a new quantization step size at the time of encoding said image data for each coding unit which is the processing increment of said encoding using the ratio between the generated code amount at the time of encoding with a known quantization step size and a target code amount at the time of encoding said image data; and
encoding the coefficient data rearranged in said rearranging step for each coding unit to generate encoded data using the quantization step size calculated in said calculating step.

11. An information processing apparatus configured to encode image data, comprising:
rearranging means configured to rearrange coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components;
control means configured to calculate a quantization step size at the time of encoding said image data for each coding unit which is the processing increment of encoding using the correlation within the current picture, in the event that the image correlation between the current picture and the picture which is one picture ahead of said image data is low; and
encoding means configured to encode the coefficient data rearranged by said rearranging means for each coding unit to generate encoded data using the quantization step size calculated by said control means.

12. The information processing apparatus according to claim 11, further comprising:
determining means configured to determine the height of the correlation between the pictures of said image data;
wherein said control means calculate said quantization step size using the correlation within the current picture, in the event of said determining means determining that said correlation is low.

13. The information processing apparatus according to claim 12, wherein said determining means determine that said correlation is low, in the event that the normalization code amount obtained by normalizing the code amount generated at the current coding unit is greater than the normalization code amount of the coding unit at the same position as the picture which is one picture ahead, and also the difference thereof is greater than the value obtained by multiplying a target code amount per coding unit by a half of the quantization step size which is currently set.

14. The information processing apparatus according to claim 13, wherein said calculating means calculate a new quantization step size by dividing the normalization code amount of the past coding unit within the current picture by a target code amount per coding unit, in the event that said determining means have determined that said correlation is low.

15. The information processing apparatus according to claim 12, wherein said calculating means calculate said quantization step size using the correlation between the current picture and the picture which is one picture ahead, in the event that said determining means have determined that said correlation is high.

16. The information processing apparatus according to claim 11, wherein said coding unit is said line block.

17. The information processing apparatus according to claim 11, wherein said rearranging means rearrange said coefficient data in order from low frequency components to high frequency components for each line block.

18. The information processing apparatus according to claim 11, wherein said control means perform control so as to operate each of said rearranging means and said encoding means in parallel for each line block.

19. The information processing apparatus according to claim 11, wherein said rearranging means and said encoding means perform each processing in parallel.

20. An information processing method for encoding image data, comprising the steps of:
rearranging coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components;
calculating a quantization step size at the time of encoding said image data for each coding unit which is the processing increment of encoding using the correlation within the current picture, in the event that the image correlation between the current picture and the picture which is one picture ahead of said image data is low; and
encoding the coefficient data rearranged in said rearranging step for each coding unit to generate encoded data using the quantization step size calculated in said control step.

21. An information processing apparatus configured to encode image data to generate encoded data, comprising:
rearranging means configured to rearrange coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components;
determining means configured to determine the data occupied amount of a buffer for storing said encoded data based on the value obtained by dividing the code amount of the encoded data stored in said buffer by a target code amount per coding unit which is the processing increment of encoding;
control means configured to calculate a quantization step size at the time of encoding said image data by dividing the code amount generated at the coding unit of the same position as the picture which is one picture ahead by said target code amount per coding unit, in the event that said determining means have determined that the code amount of the encoded data stored in said buffer is great; and encoding means configured to encode the coefficient data rearranged by said rearranging means for each coding unit to generate encoded data using the quantization step size calculated by said control means.

22. The information processing apparatus according to claim 21, wherein said control means calculate said quantization step size by dividing the normalization code amount obtained by normalizing the code amount generated at the coding unit of the same position as the picture which is one picture ahead by said target code amount per coding unit.

23. The information processing apparatus according to claim 21, further comprising:

correcting means configured to perform correction to further increase the value of said quantization step size calculated by said calculating means so as to reduce the code amount generated at said encoding as much as the code amount of the encoded data stored in said buffer is.

24. The information processing apparatus according to claim 23, wherein said correcting means perform correction by dividing the value of said quantization step size calculated at said calculating means by any smaller value of the value obtained by subtracting the value obtained by dividing a half of the code amount of the encoded data stored in said buffer by said target code amount per coding unit from a value "4", and a value "1".

25. An information processing method for encoding image data to generate encoded data, comprising the steps of:

rearranging coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components;

determining the data occupied amount of a buffer for storing said encoded data based on the value obtained by dividing the code amount of the encoded data stored in said buffer by a target code amount per coding unit which is the processing increment of encoding;

calculating a quantization step size at the time of encoding said image data by dividing the code amount generated at the coding unit of the same position as the picture which is one picture ahead by said target code amount per coding unit, in the event that determination is made in said determining step that the code amount of the encoded data stored in said buffer is great; and encoding the coefficient data rearranged in said rearranging step for each coding unit to generate encoded data using the quantization step size calculated in said calculating step.

26. An information processing apparatus configured to encode image data, comprising:

a rearranging unit configured to rearrange coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components;

a control unit configured to calculate a new quantization step size at the time of encoding said image data for each coding unit which is the processing increment of said encoding using the ratio between the generated code amount at the time of encoding with a known quantization step size and a target code amount at the time of encoding said image data; and an encoding unit configured to encode the coefficient data rearranged by said rearranging unit for each coding unit to generate encoded data using the quantization step size calculated by said control unit.

27. An information processing apparatus configured to encode image data, comprising:

a rearranging unit configured to rearrange coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components;

a control unit configured to calculate a quantization step size at the time of encoding said image data for each coding unit which is the processing increment of encoding using the correlation within the current picture, in the event that the image correlation between the current picture and the picture which is one picture ahead of said image data is low; and an encoding unit configured to encode the coefficient data rearranged by said rearranging unit for each coding unit to generate encoded data using the quantization step size calculated by said control unit.

28. An information processing apparatus configured to encode image data to generate encoded data, comprising:

a rearranging unit configured to rearrange coefficient data divided for each frequency band in order of executing synthesis processing for synthesizing the coefficient data of a plurality of sub-bands divided into frequency bands to generate image data for each line block including image data equivalent to the number of lines necessary for generating coefficient data equivalent to one line of the sub-band of the lowest frequency components;

a determining unit configured to determine the data occupied amount of a buffer for storing said encoded data based on the value obtained by dividing the code amount of the encoded data stored in said buffer by a target code amount per coding unit which is the processing increment of encoding;

a control unit configured to calculate a quantization step size at the time of encoding said image data by dividing the code amount generated at the coding unit of the same position as the picture which is one picture ahead by said target code amount per coding unit, in the event that said determining unit has determined that the code amount of the encoded data stored in said buffer is great; and an encoding unit configured to encode the coefficient data rearranged by said rearranging unit for each coding unit to generate encoded data using the quantization step size calculated by said control unit.

* * * * *